(12) United States Patent
Kondiles

(10) Patent No.: US 11,755,589 B2
(45) Date of Patent: *Sep. 12, 2023

(54) DELAYING SEGMENT GENERATION IN DATABASE SYSTEMS

(71) Applicant: Ocient Holdings LLC, Chicago, IL (US)

(72) Inventor: George Kondiles, Chicago, IL (US)

(73) Assignee: Ocient Holdings LLC, Chicago, IL (US)

(*) Notice: Subject to any disclaimer, the term of this patent is extended or adjusted under 35 U.S.C. 154(b) by 348 days.

This patent is subject to a terminal disclaimer.

(21) Appl. No.: 16/985,723

(22) Filed: Aug. 5, 2020

(65) Prior Publication Data
US 2022/0043755 A1   Feb. 10, 2022

(51) Int. Cl.
*G06F 16/22* (2019.01)
*G06F 16/2457* (2019.01)
*G06F 16/2455* (2019.01)

(52) U.S. Cl.
CPC ...... *G06F 16/24573* (2019.01); *G06F 16/221* (2019.01); *G06F 16/2455* (2019.01)

(58) Field of Classification Search
CPC ............ G06F 16/221; G06F 12/1009; G06F 16/24573; G06F 5/00–06
USPC .................................................. 707/713
See application file for complete search history.

(56) References Cited

U.S. PATENT DOCUMENTS

| | | | | |
|---|---|---|---|---|
| 5,509,131 A | * | 4/1996 | Smith | G06F 12/1036 711/206 |
| 5,548,770 A | | 8/1996 | Bridges | |
| 5,628,023 A | * | 5/1997 | Bryant | G06F 12/145 711/209 |
| 5,921,582 A | * | 7/1999 | Gusack | B42D 12/00 283/67 |
| 6,195,661 B1 | * | 2/2001 | Filepp | H04L 67/535 707/999.102 |
| 6,230,200 B1 | | 5/2001 | Forecast et al. | |
| 6,473,847 B1 | * | 10/2002 | Kamiya | G06F 12/1081 711/171 |
| 6,633,772 B2 | | 10/2003 | Ford et al. | |
| 6,816,280 B1 | * | 11/2004 | Davenport | G06K 15/02 358/1.15 |

(Continued)

OTHER PUBLICATIONS

A new high performance fabric for HPC, Michael Feldman, May 2016, Intersect360 Research.

(Continued)

*Primary Examiner* — Hanh B Thai
(74) *Attorney, Agent, or Firm* — GARLICK & MARKISON; Katherine C. Stuckman; Bruce E. Stuckman

(57) ABSTRACT

A method for execution by a record processing and storage system includes receiving a plurality of records and generating a plurality of pages that include the plurality of records in accordance with a row-based format. The plurality of pages is stored via a page storage system. Segment generation determination data is generated based on storage utilization data of the page storage system. A plurality of segments is generated from the plurality of pages that include the plurality of records in a column-based format based on the segment generation determination data indicating segments be generated. The plurality of segments is stored via a segment storage system.

20 Claims, 47 Drawing Sheets

(56) References Cited

U.S. PATENT DOCUMENTS

| | | | |
|---|---|---|---|
| 6,816,957 B1* | 11/2004 | Halladay | G06F 12/08 |
| | | | 711/170 |
| 7,499,907 B2 | 3/2009 | Brown et al. | |
| 7,783,858 B2* | 8/2010 | Chiang | G06F 12/1018 |
| | | | 711/170 |
| 7,908,242 B1 | 3/2011 | Achanta | |
| 8,880,695 B2* | 11/2014 | Sakai | G06F 13/387 |
| | | | 709/225 |
| 9,547,435 B2* | 1/2017 | Kim | G01C 21/3664 |
| 10,354,423 B2* | 7/2019 | Ozawa | G06T 11/206 |
| 2001/0051949 A1 | 12/2001 | Carey et al. | |
| 2002/0032676 A1 | 3/2002 | Reiner et al. | |
| 2002/0116417 A1* | 8/2002 | Weinberg | G06F 40/174 |
| | | | 707/E17.058 |
| 2004/0162853 A1 | 8/2004 | Brodersen et al. | |
| 2004/0215919 A1* | 10/2004 | Emmes | G06F 12/1036 |
| | | | 711/208 |
| 2006/0212944 A1* | 9/2006 | Hara | G06F 21/10 |
| | | | 726/26 |
| 2008/0133456 A1 | 6/2008 | Richards et al. | |
| 2008/0204806 A1* | 8/2008 | Tao | G06K 15/02 |
| | | | 358/1.16 |
| 2009/0063893 A1 | 3/2009 | Bagepalli et al. | |
| 2009/0183167 A1 | 7/2009 | Kupferschmidt et al. | |
| 2010/0082577 A1 | 4/2010 | Mirchandani et al. | |
| 2010/0115172 A1* | 5/2010 | Gillingham | G06F 13/4059 |
| | | | 710/310 |
| 2010/0241646 A1 | 9/2010 | Friedman et al. | |
| 2010/0274983 A1 | 10/2010 | Murphy et al. | |
| 2010/0312756 A1 | 12/2010 | Zhang et al. | |
| 2011/0219169 A1 | 9/2011 | Zhang et al. | |
| 2012/0109888 A1 | 5/2012 | Zhang et al. | |
| 2012/0150008 A1* | 6/2012 | Kaib | A61N 1/046 |
| | | | 600/372 |
| 2012/0151118 A1* | 6/2012 | Flynn | G06F 3/0619 |
| | | | 711/170 |
| 2012/0185866 A1 | 7/2012 | Couvee et al. | |
| 2012/0210095 A1* | 8/2012 | Nellans | G06F 12/1072 |
| | | | 711/E12.059 |
| 2012/0254252 A1 | 10/2012 | Jin et al. | |
| 2012/0311246 A1 | 12/2012 | McWilliams et al. | |
| 2013/0166690 A1* | 6/2013 | Shatzkamer | H04N 21/812 |
| | | | 709/219 |
| 2013/0332484 A1 | 12/2013 | Gajic | |
| 2014/0047095 A1 | 2/2014 | Breternitz et al. | |
| 2014/0136510 A1 | 5/2014 | Parkkinen et al. | |
| 2014/0188841 A1 | 7/2014 | Sun et al. | |
| 2014/0201351 A1* | 7/2014 | Fransen | H04L 67/535 |
| | | | 709/224 |
| 2015/0205607 A1 | 7/2015 | Lindholm | |
| 2015/0244804 A1 | 8/2015 | Warfield et al. | |
| 2015/0248366 A1 | 9/2015 | Bergsten et al. | |
| 2015/0293966 A1 | 10/2015 | Cai et al. | |
| 2015/0301952 A1* | 10/2015 | McKinley | G06F 12/023 |
| | | | 711/208 |
| 2015/0310045 A1* | 10/2015 | Konik | G06F 16/2228 |
| | | | 707/741 |
| 2016/0034547 A1 | 2/2016 | Lerios et al. | |
| 2016/0062805 A1* | 3/2016 | Kumar | G06F 12/1009 |
| | | | 711/160 |
| 2017/0330596 A1* | 11/2017 | Segal | H04N 5/2222 |
| 2018/0089867 A1* | 3/2018 | Ozawa | G06T 11/206 |
| 2018/0198842 A1* | 7/2018 | Chandran | G06F 12/109 |
| 2019/0297143 A1* | 9/2019 | Anadon | H04L 67/146 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguideTi . . . .

* cited by examiner database system 10 computing device 18 computing device 18 computing device 18 node 37 node 37 node 37 data set

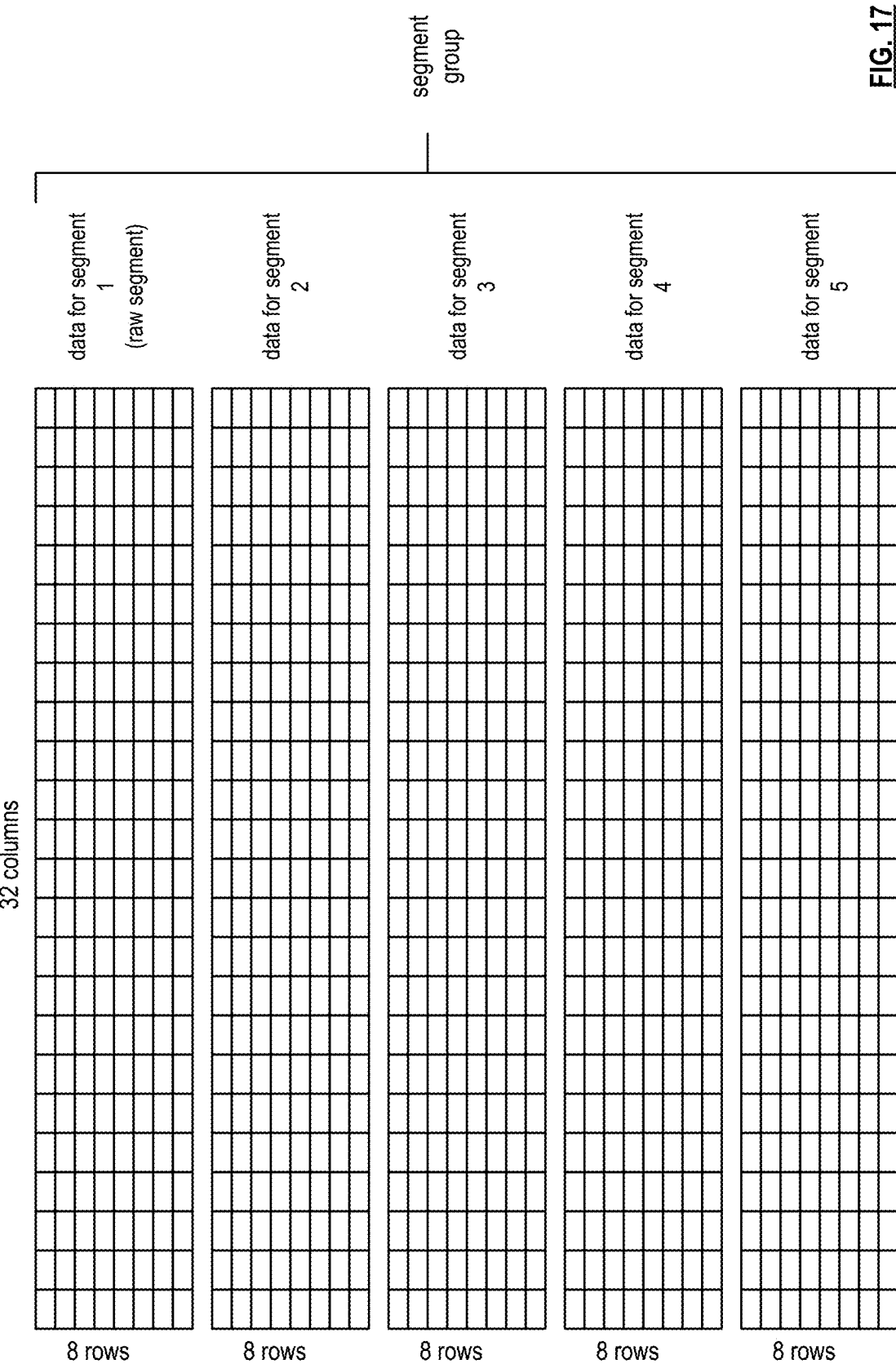

FIG. 18 data for segment 1 (raw segment)

primary organization column (e.g., time stamp)

selected key column (e.g., engine on or off)

| | | | | |
|---|---|---|---|---|
| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a |

FIG. 19 divide segment by columns into data slabs

| 1 | a | on | 101 | a2c |
| 2 | b | off | 112 | a1k |
| 3 | c | off | 211 | d5s |
| 4 | d | on | 074 | c4l |
| 5 | e | on | 364 | b5e |
| 6 | f | off | 489 | c4q |
| 7 | g | on | 015 | e8f |
| 8 | h | off | 611 | a1a |

← data slab

FIG. 20 sort data slabs based on key column(s)

| 1 | a | on | 101 | a2c |
| 4 | d | on | 074 | c4l |
| 5 | e | on | 364 | b5e |
| 7 | g | on | 015 | e8f |
| 2 | b | off | 112 | a1k |
| 3 | c | off | 211 | d5s |
| 6 | f | off | 489 | c4q |
| 8 | h | off | 611 | a1a |

← sorted data slab database system 10 record processing and storage system 2505 record processing and storage system 2505 segment generator 2517

2505

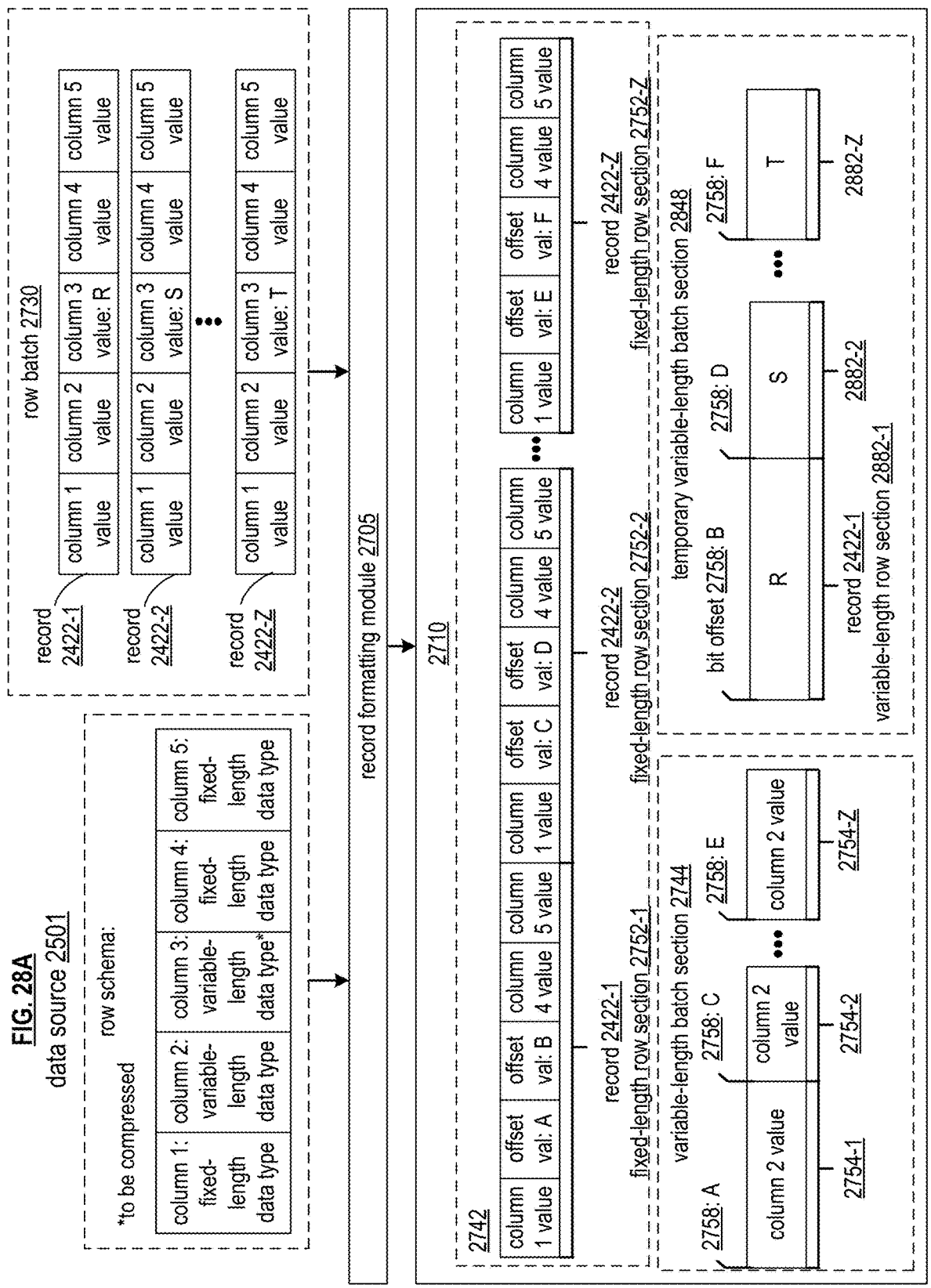

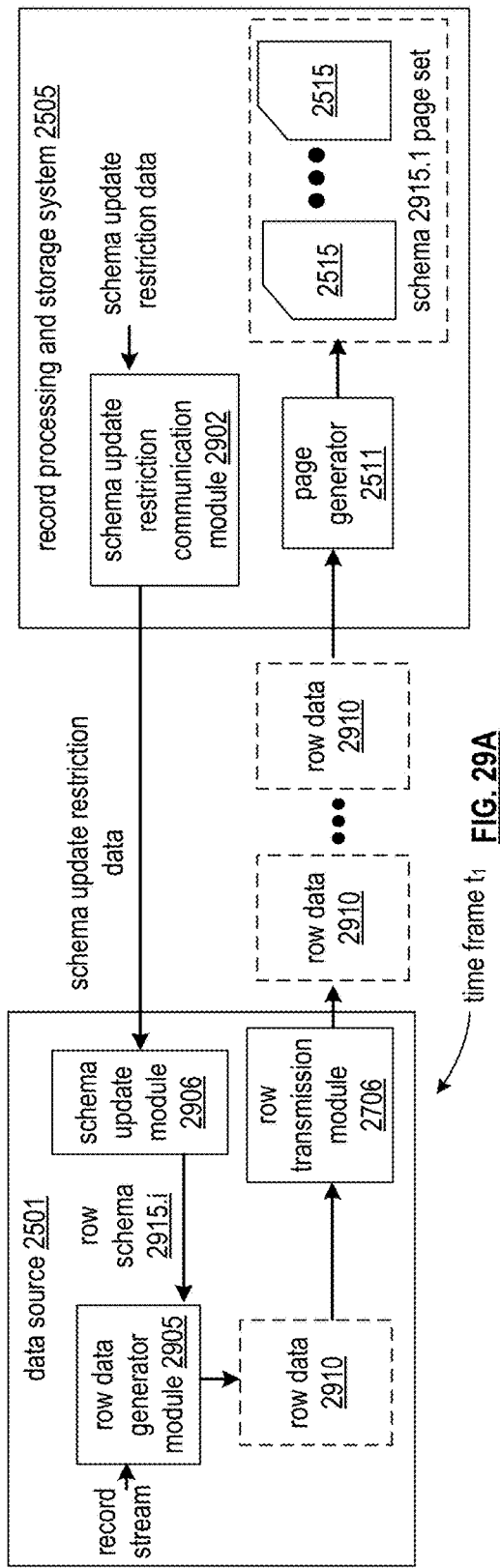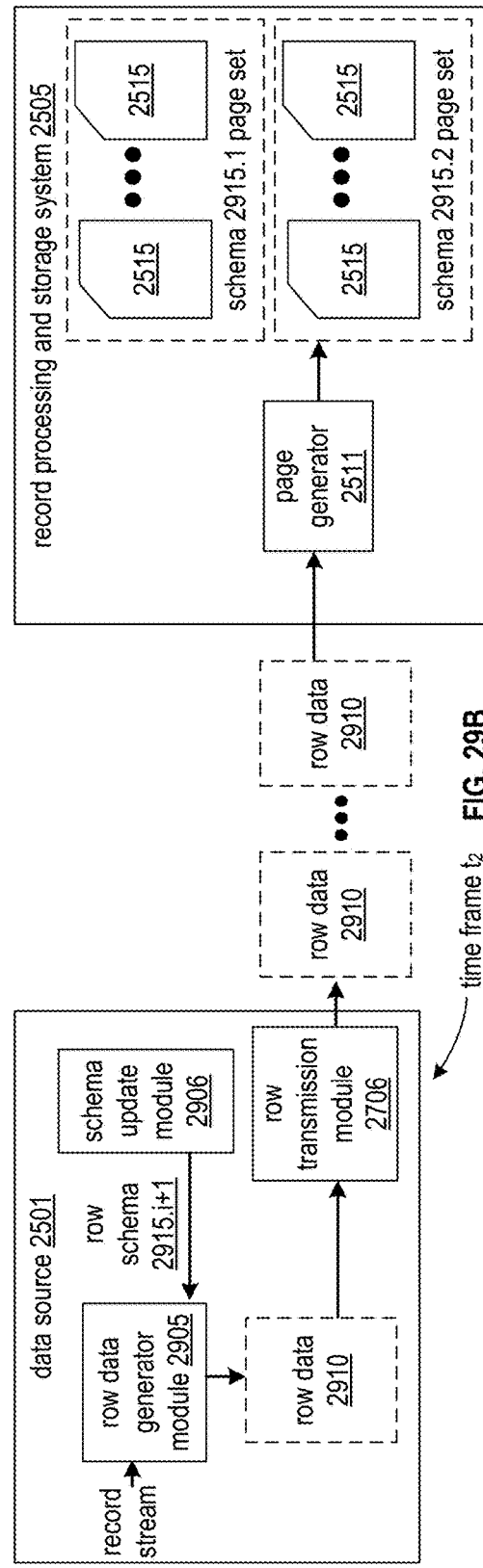
FIG. 29A
FIG. 29B

ID
DELAYING SEGMENT GENERATION IN DATABASE SYSTEMS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

Figure 28B:
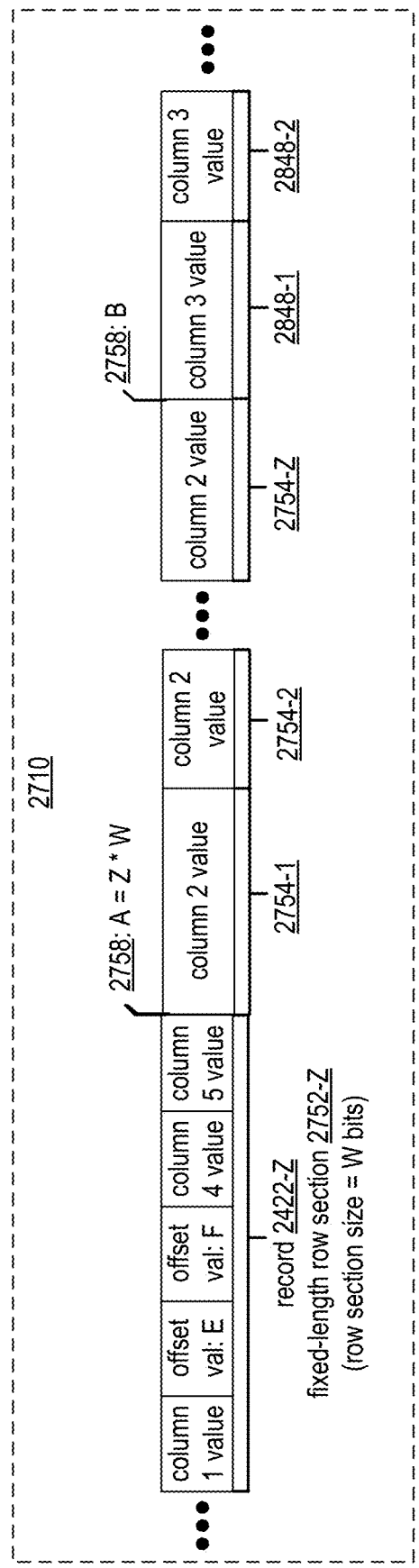
Figure 28C:
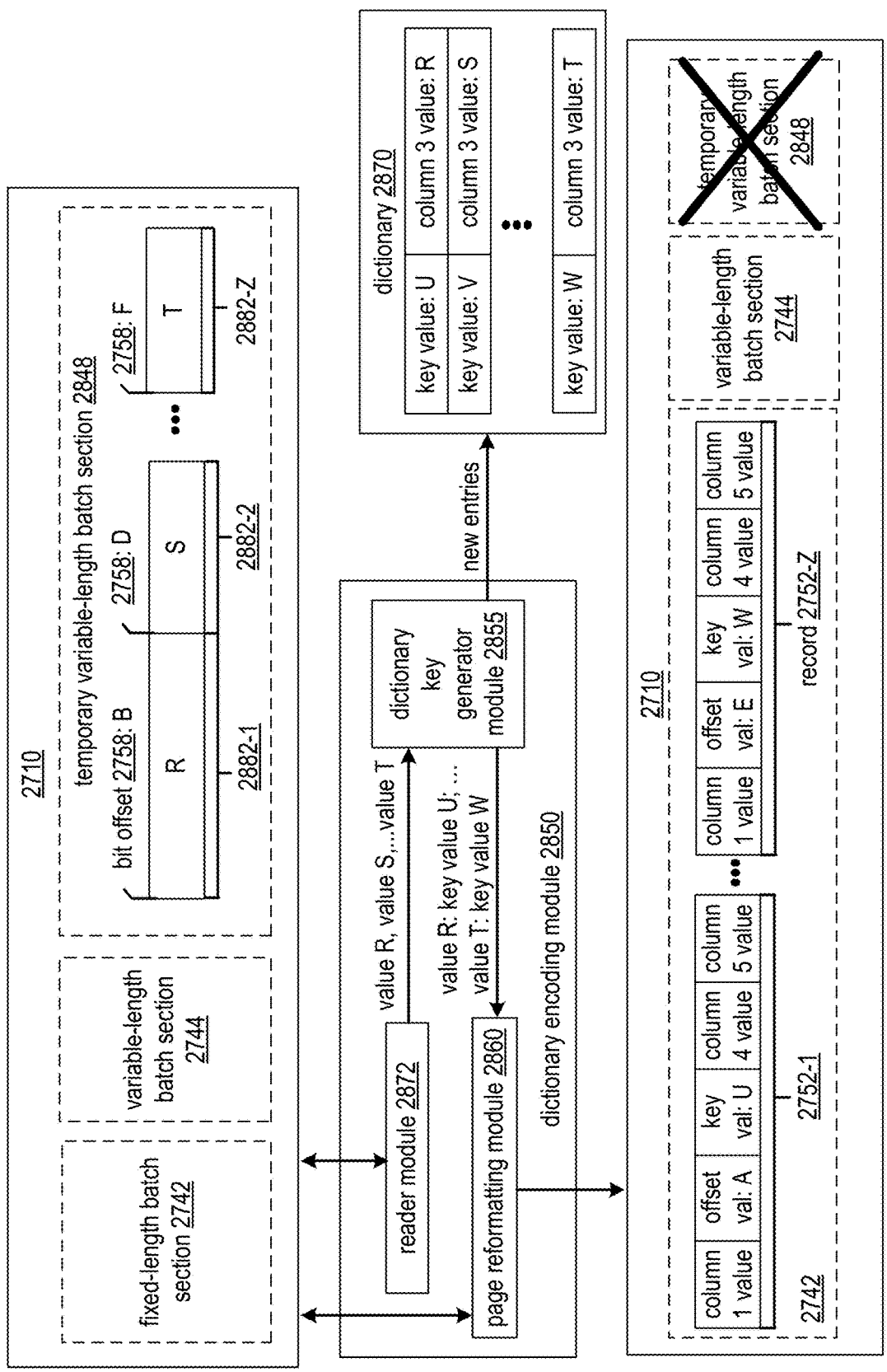
Figure 28D:
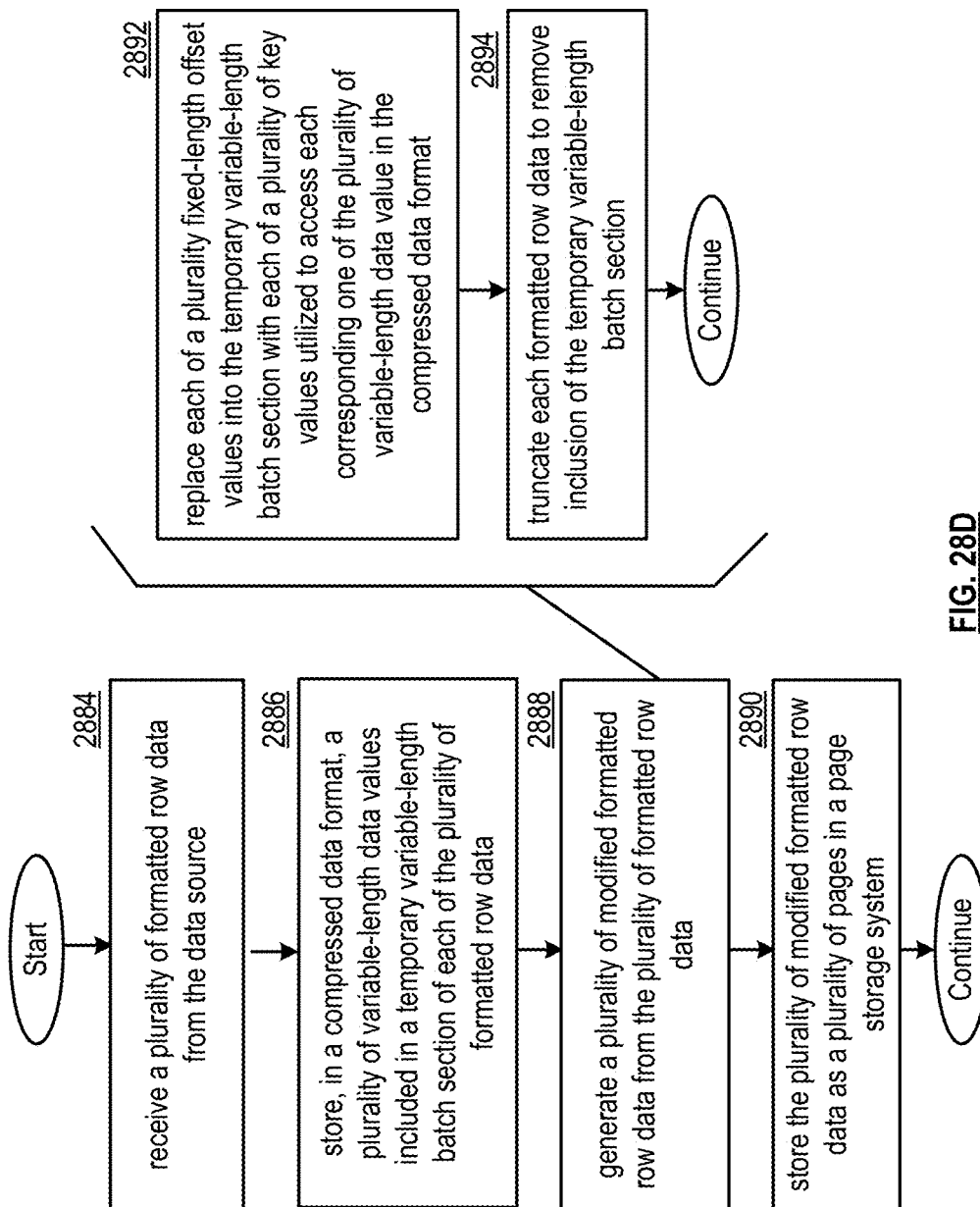
Figure 29C:
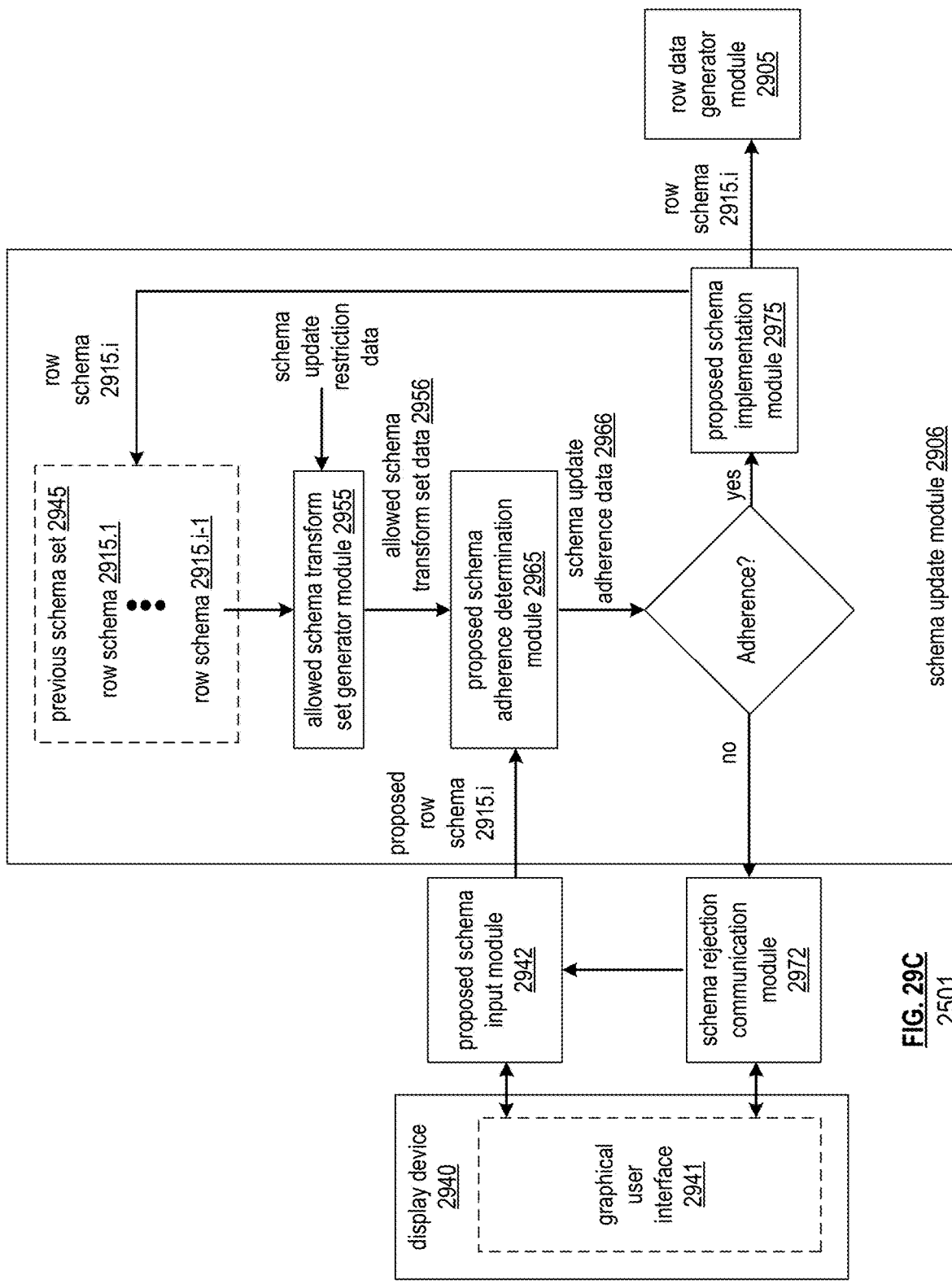
Figure 29D:
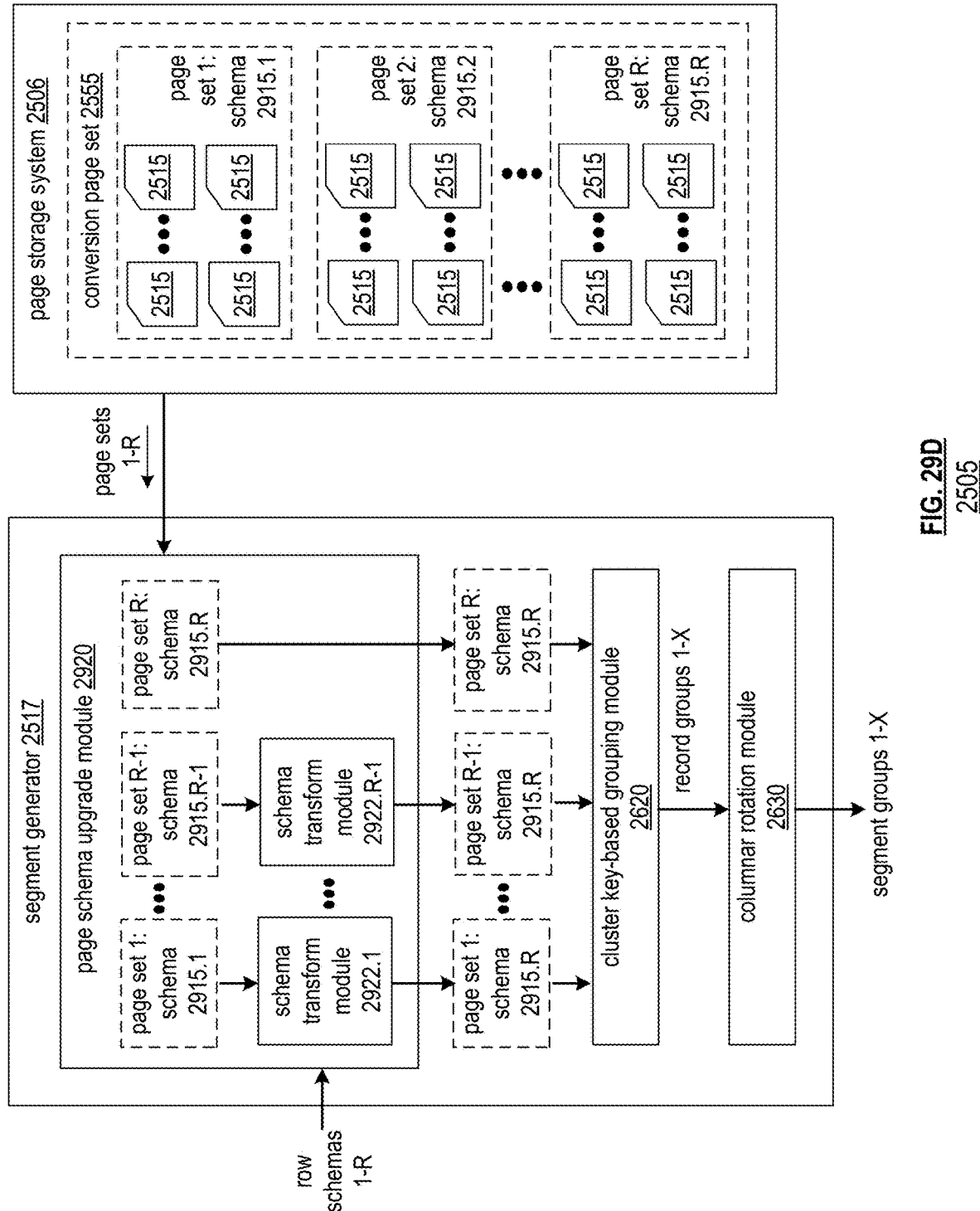
Figure 29E:
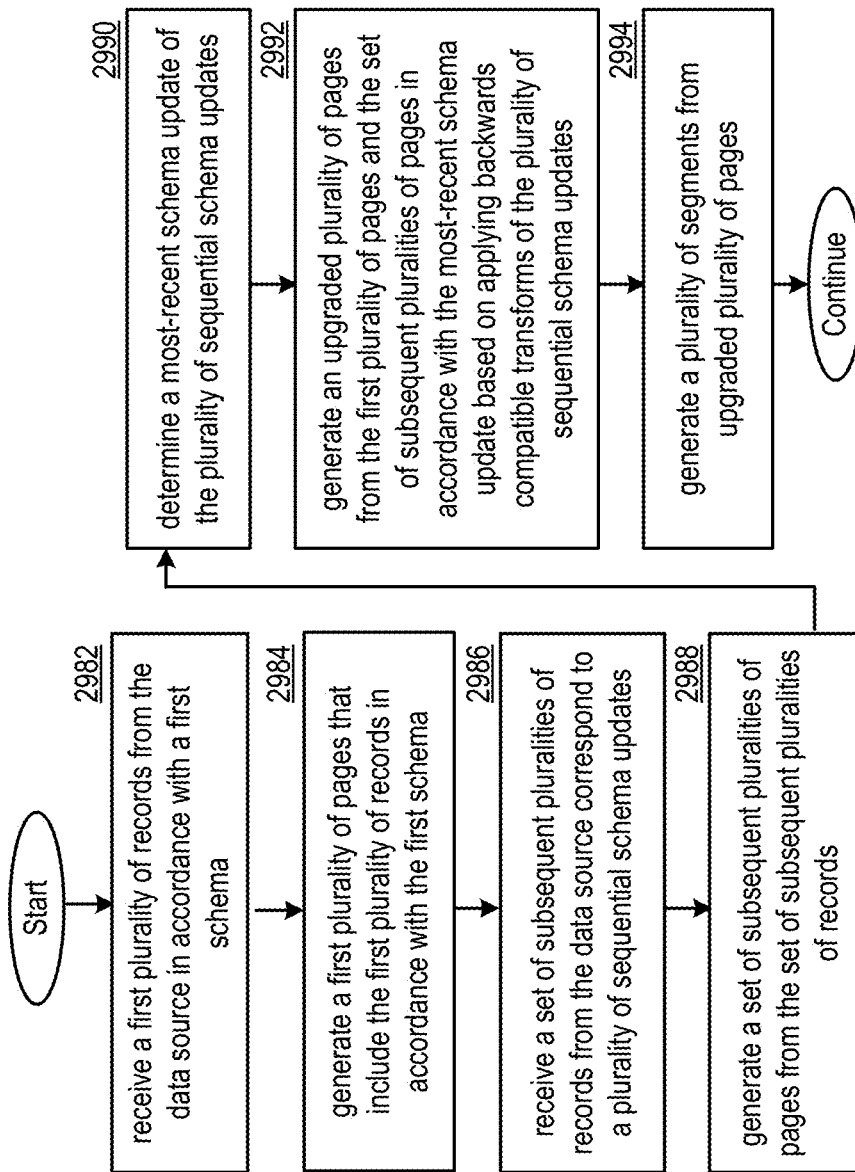

FIG. 28A a schematic block diagram illustrating a record formatting module of a data source in accordance with various embodiments of the present invention;

FIG. 28B is a schematic block diagram illustrating an embodiment of formatted row data in accordance with various embodiments of the present invention;

FIG. 28C is a schematic block diagram illustrating an embodiment of a record processing and storage system that implements a dictionary encoding module in accordance with various embodiments of the present invention;

FIG. 28D is a logic diagram illustrating a method of compressing record fields of formatted row data in accordance with various embodiments of the present invention;

FIGS. 29A-29B are schematic block diagrams illustrating an embodiment of a record processing and storage system that receives row data under different schemas in accordance with various embodiments of the present invention;

FIG. 29C is a schematic block diagram illustrating an embodiment of a schema update module in accordance with various embodiments of the present invention;

FIG. 29D is a schematic block diagram illustrating an embodiment of a record processing and storage system that implements a schema updating module in accordance with various embodiments of the present invention; and FIG. 29E is a logic diagram illustrating a method of updating row schema in accordance with various embodiments of the present invention.

DETAILED DESCRIPTION OF THE INVENTION

Figure 1:
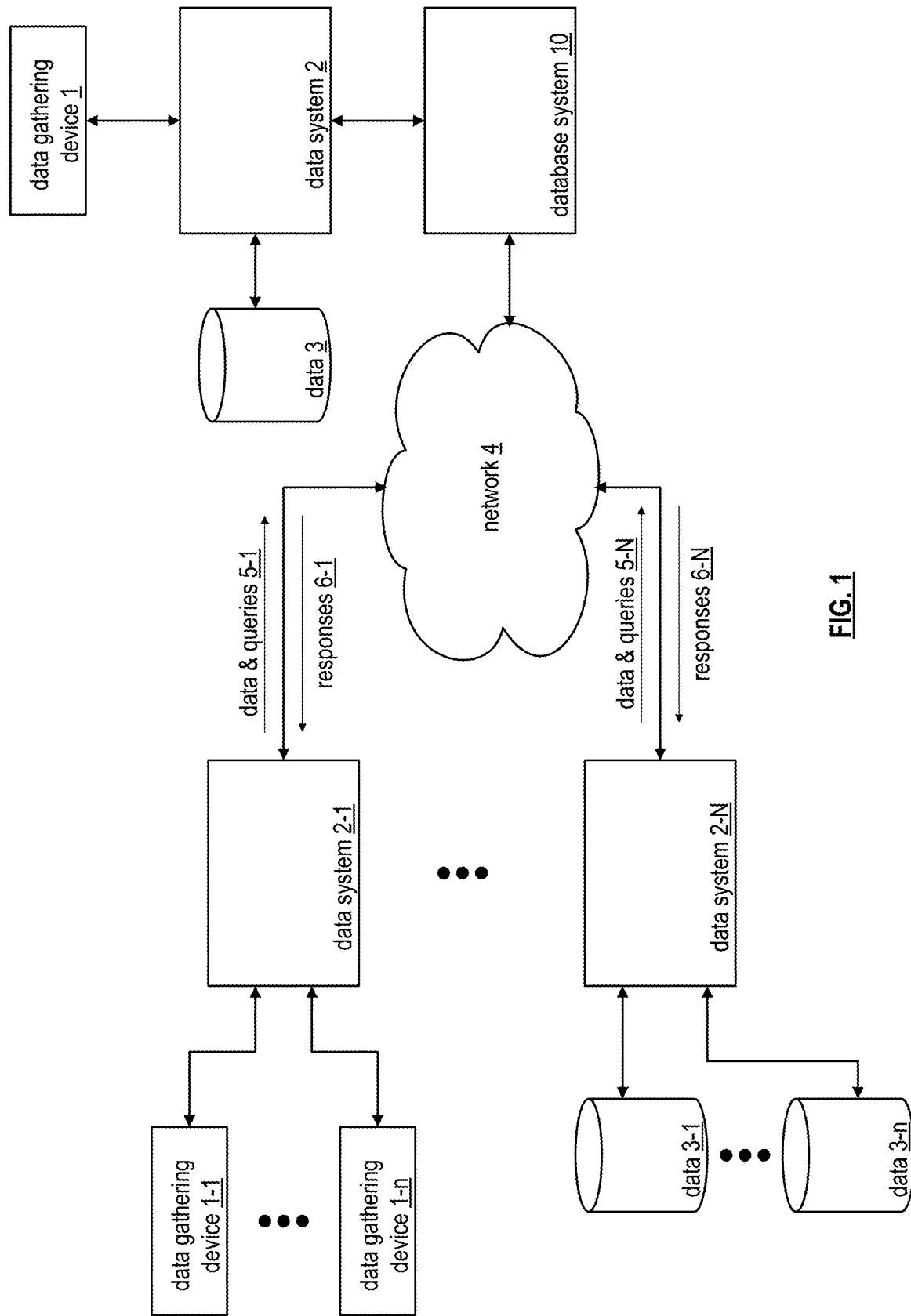
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
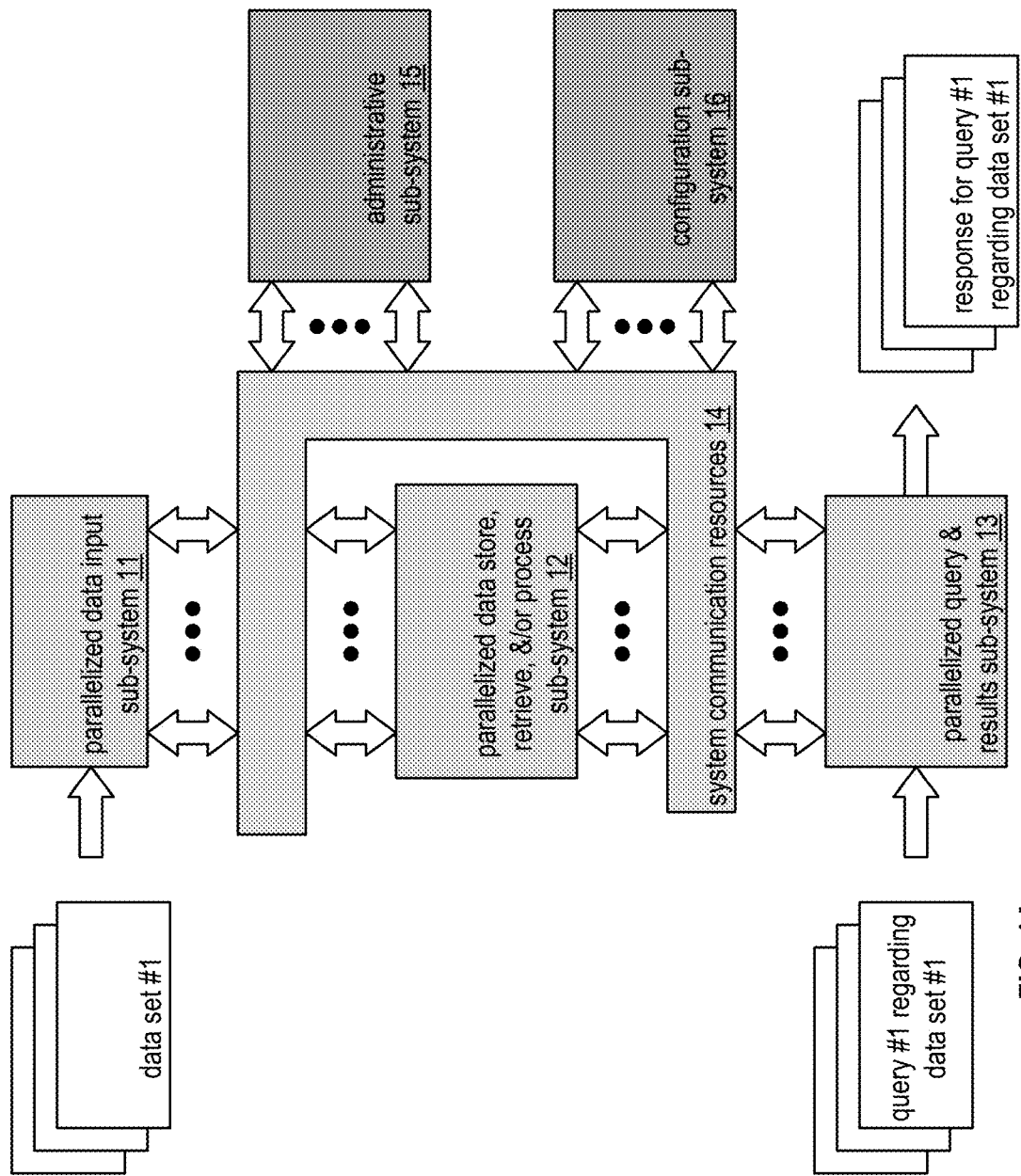
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may be also be referred to as a data input sub-system, the parallelized data store, retrieve, and/or process sub-system may be also be referred to as a data storage and processing sub-system, and the parallelized query and response sub-system 13 may be also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no.

1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
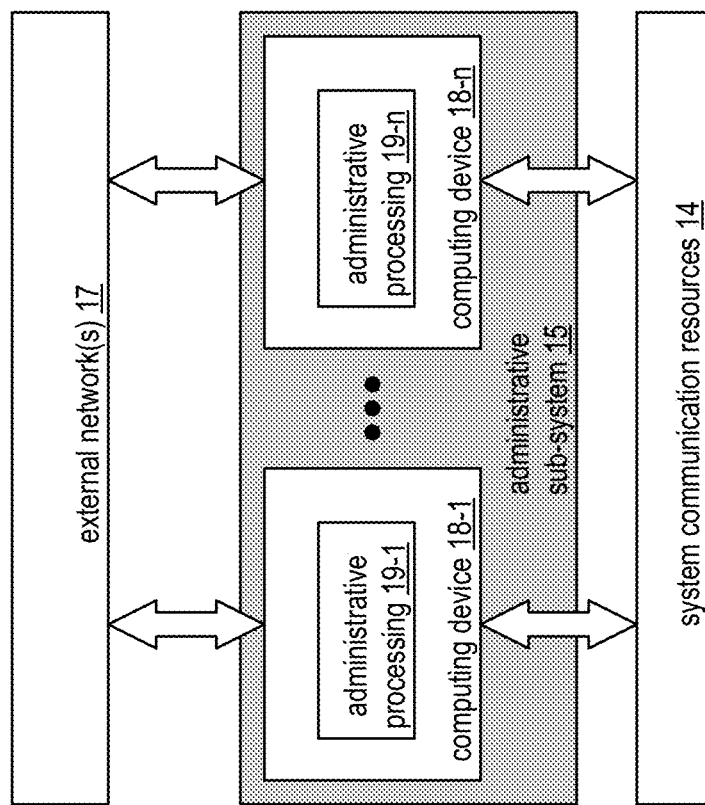
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
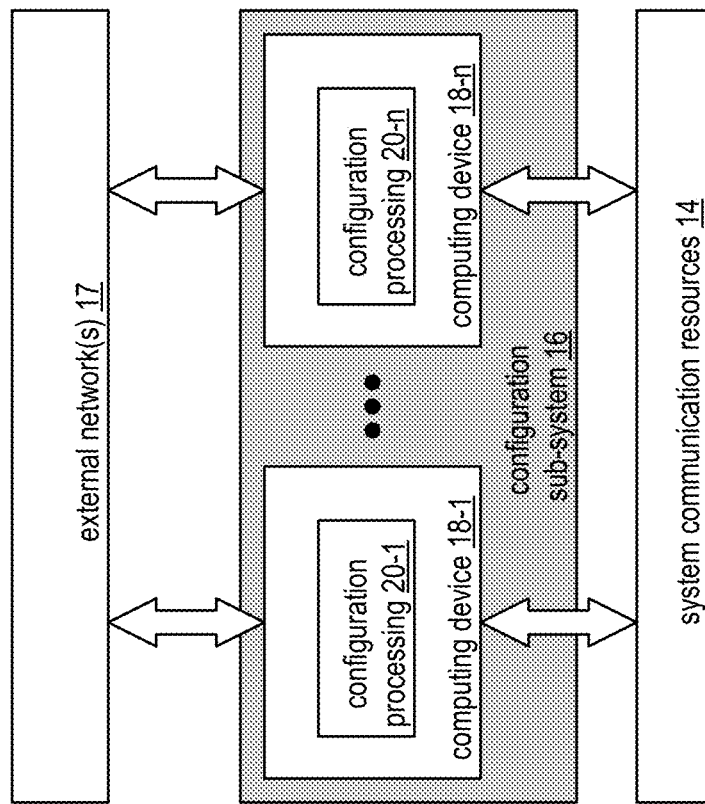
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
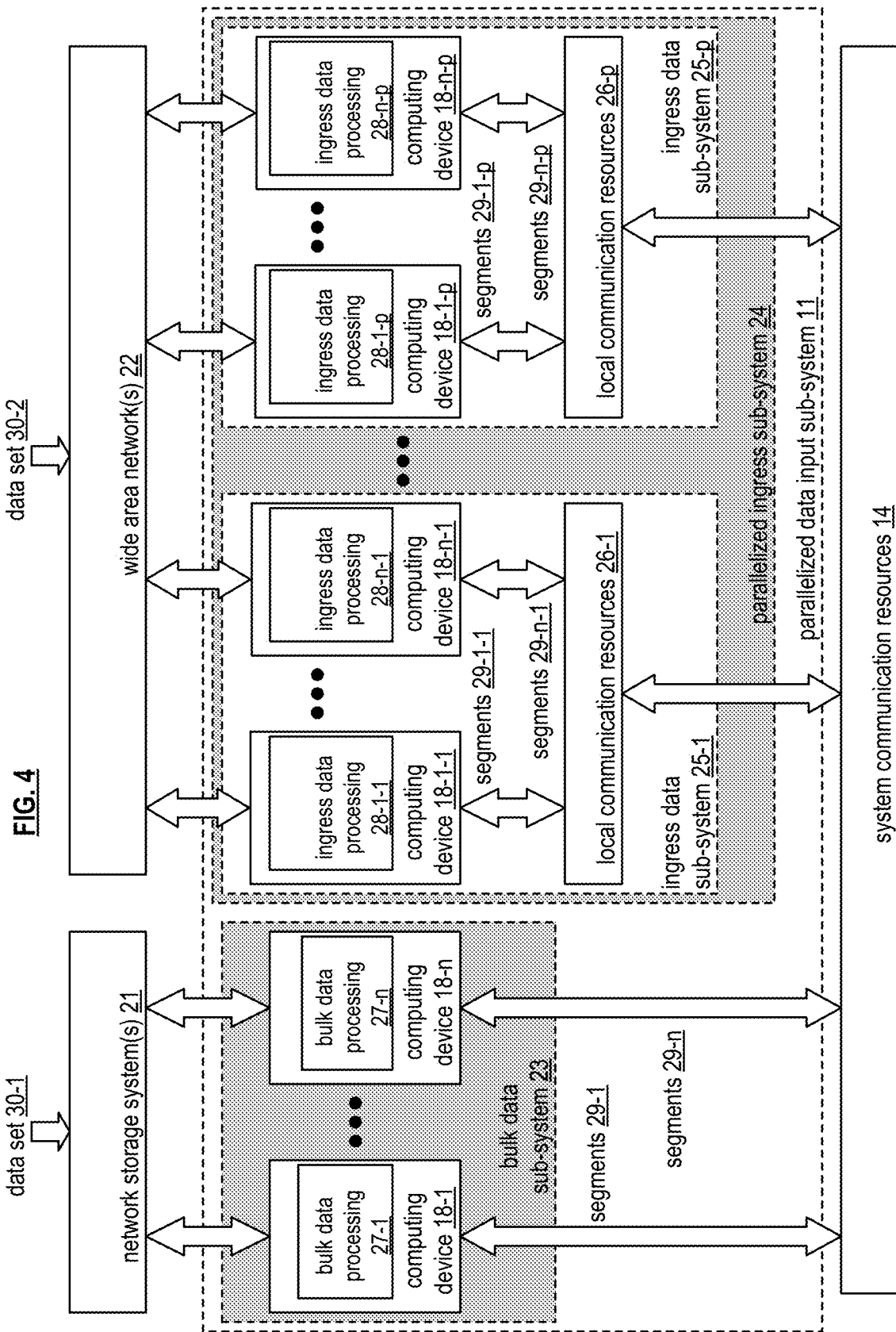
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
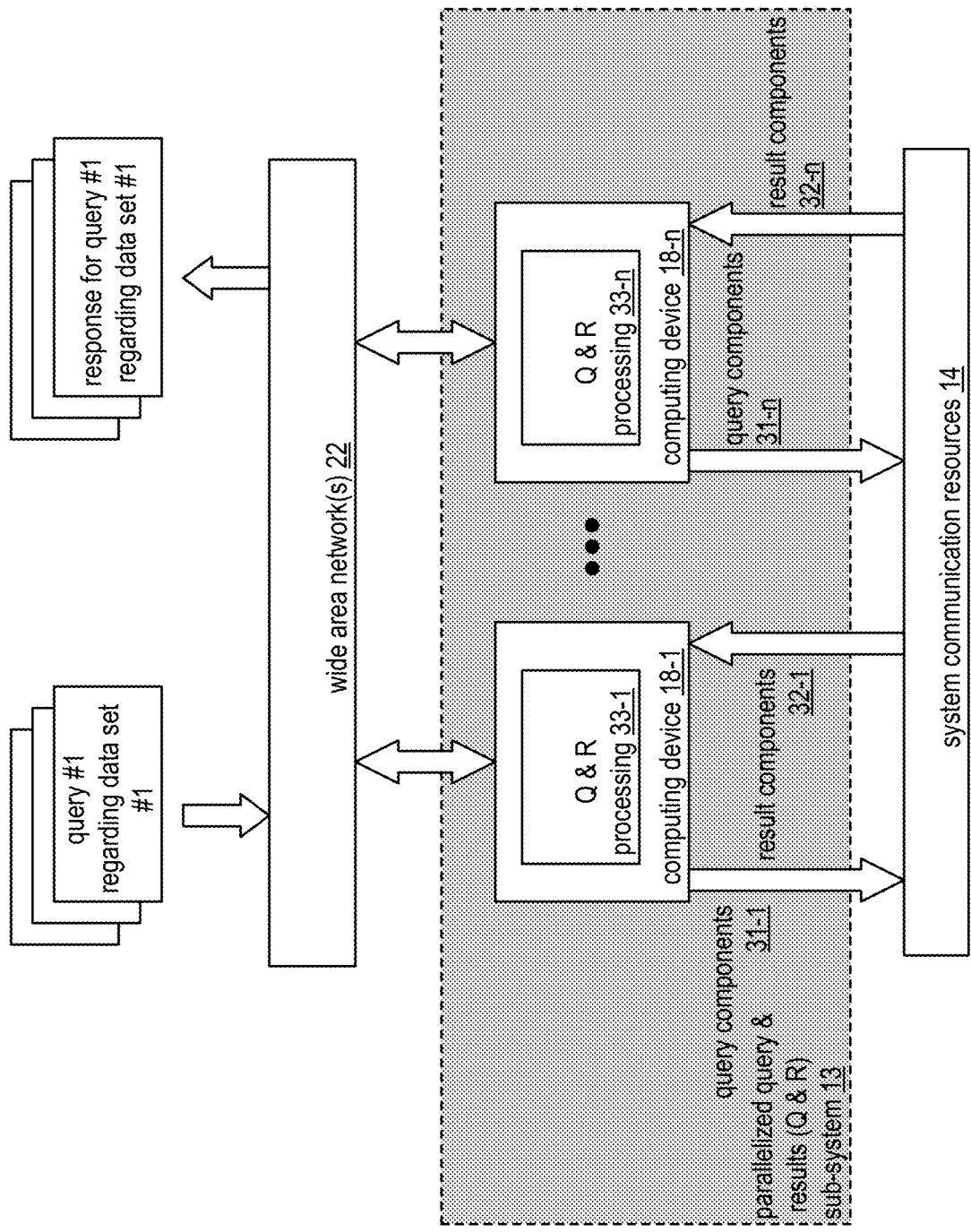
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
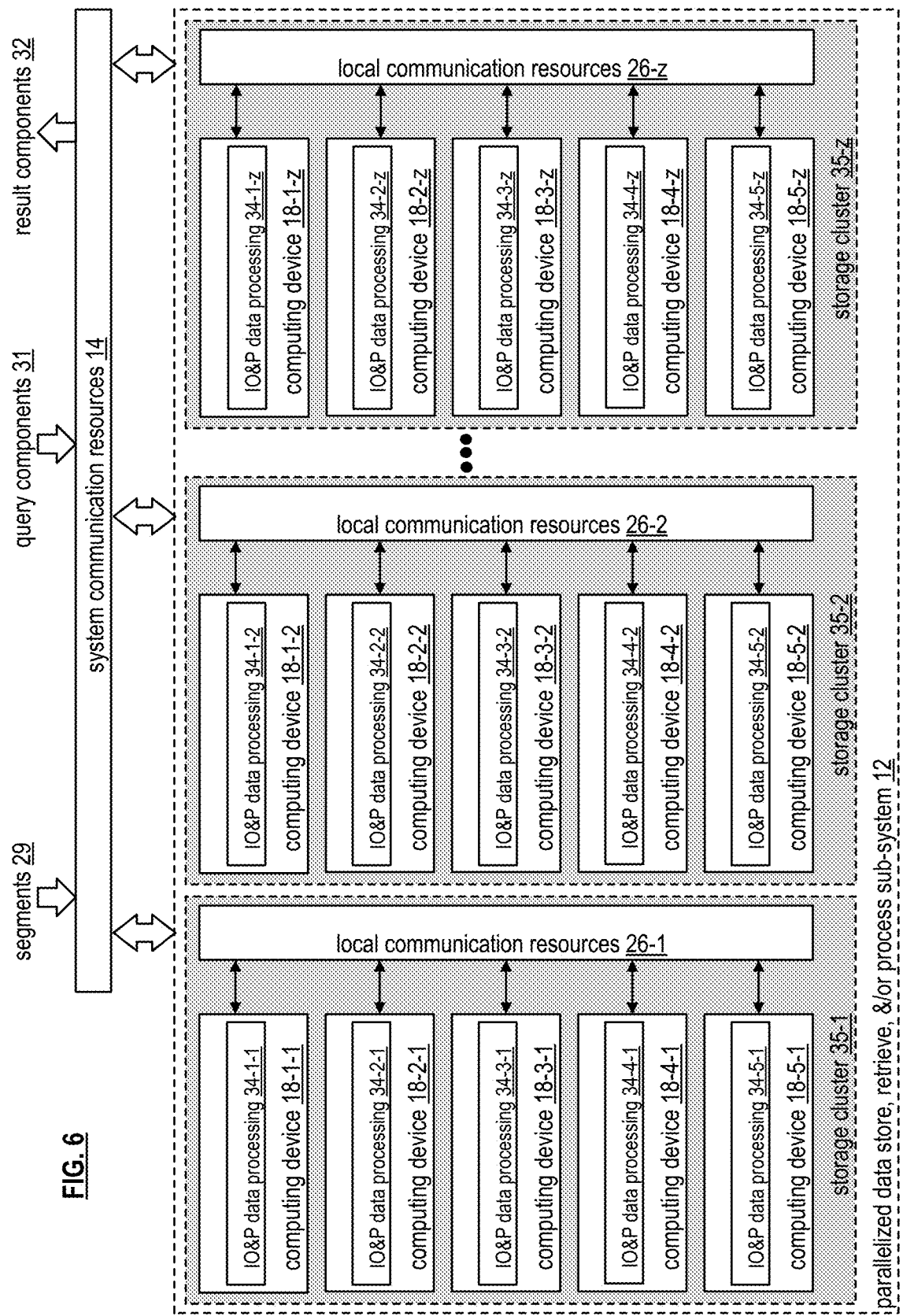
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
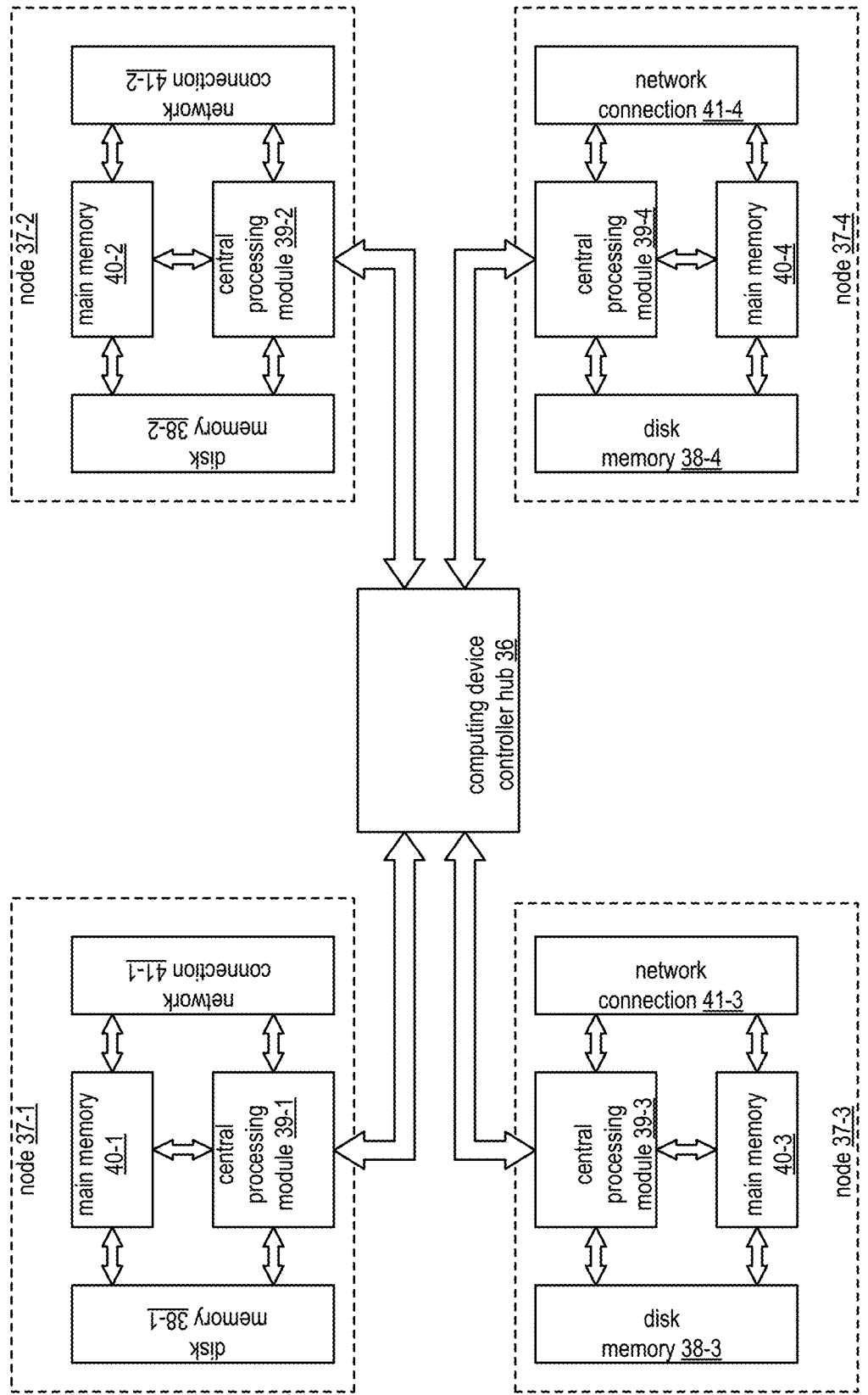
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
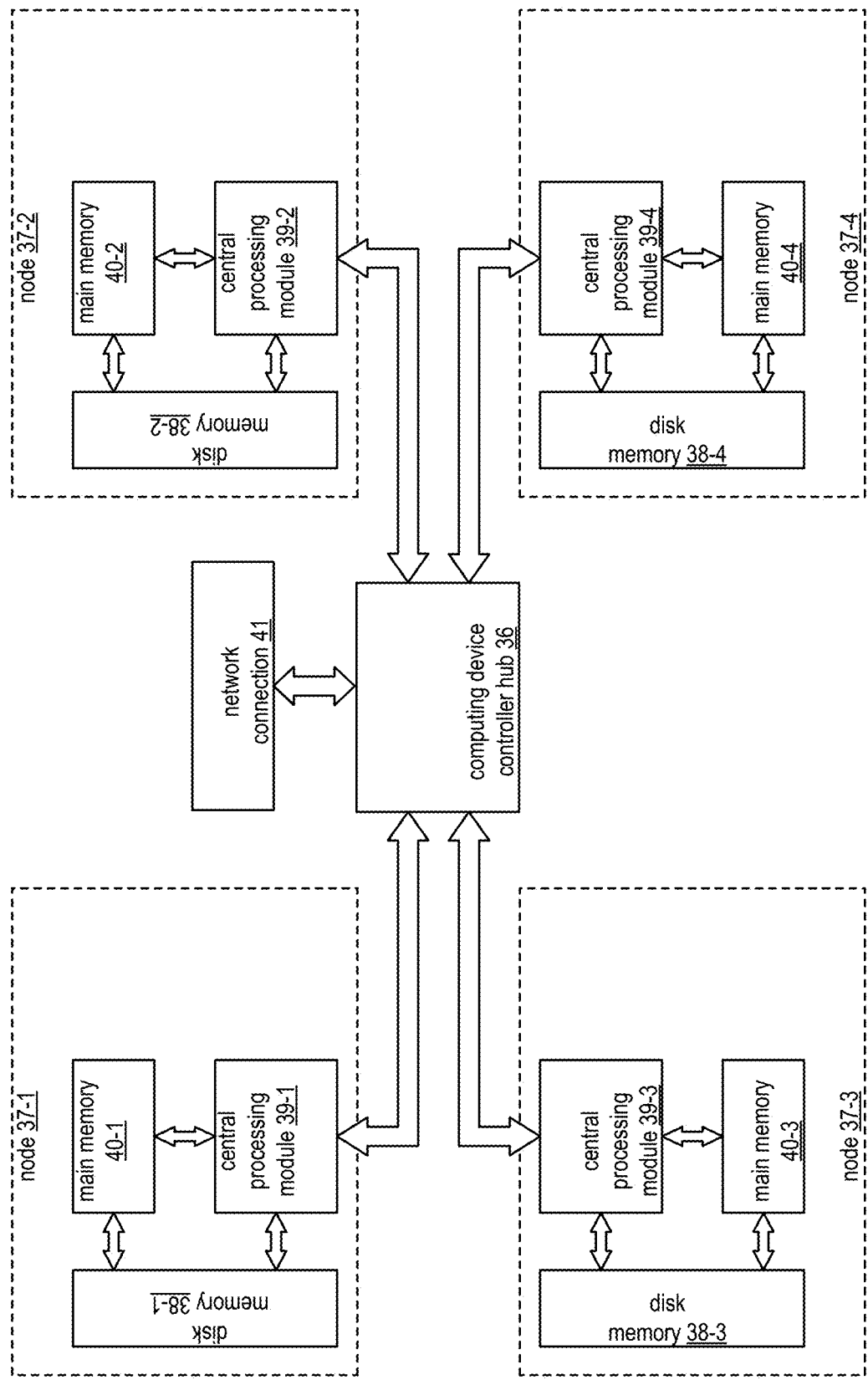
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
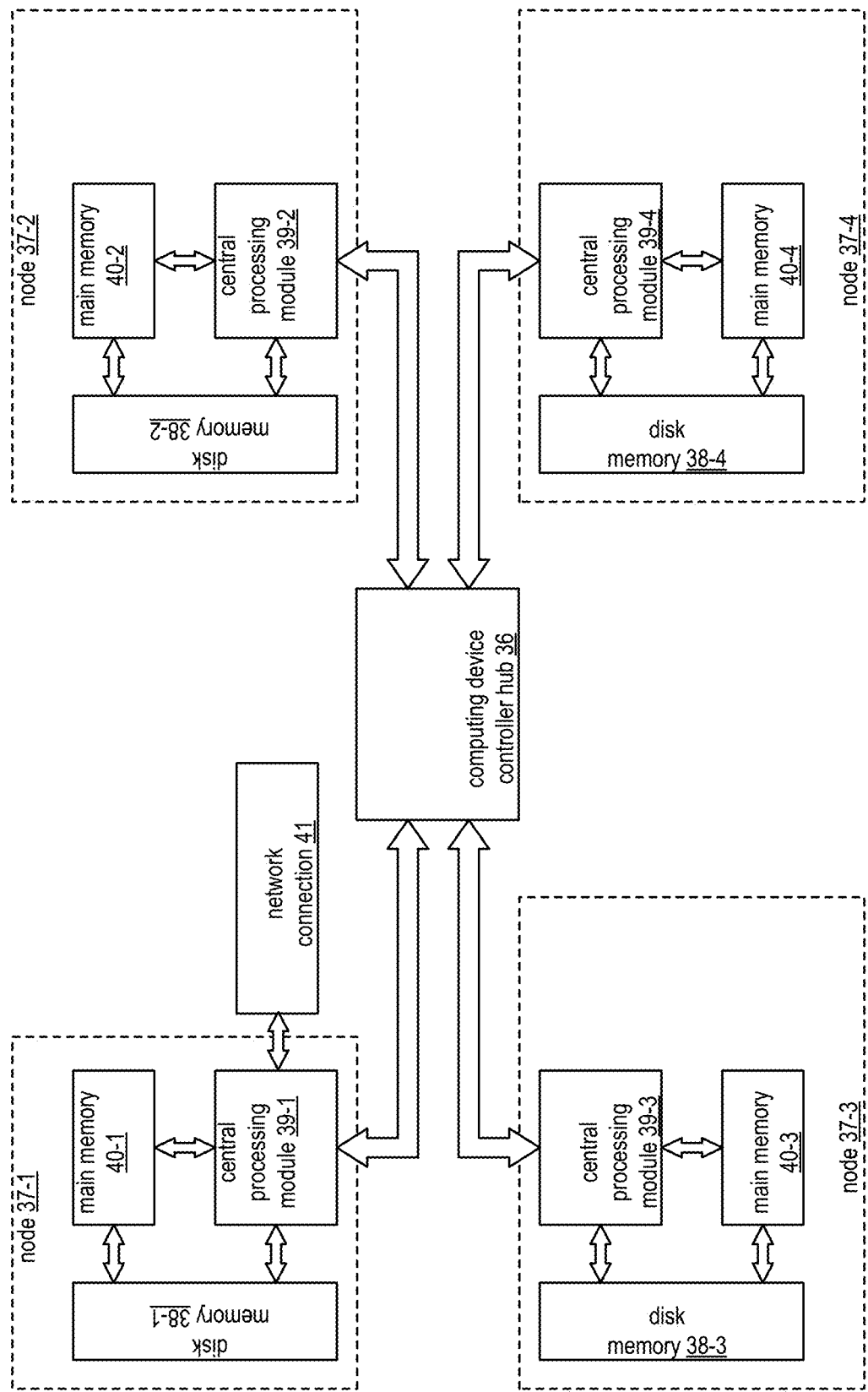
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
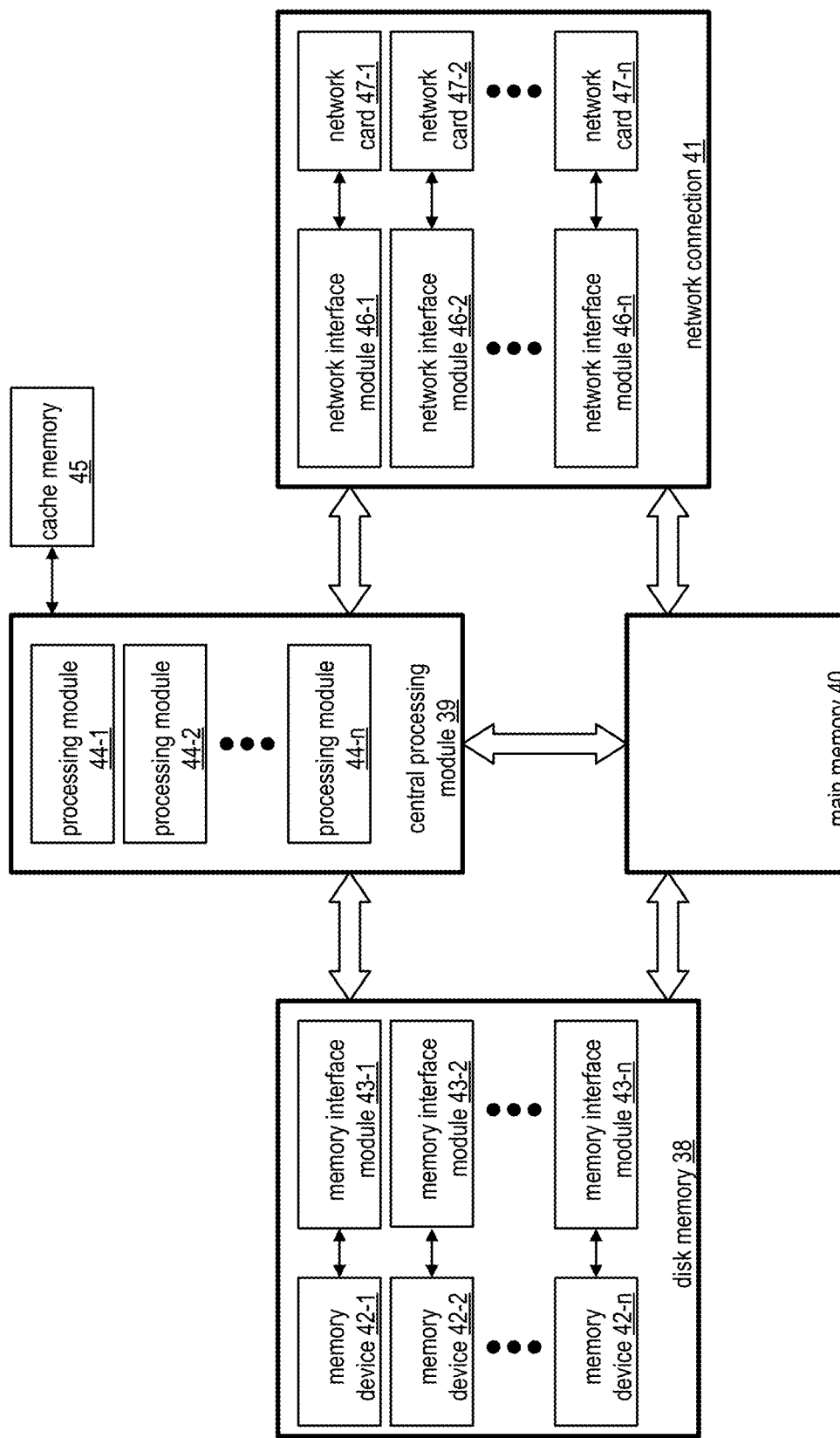
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
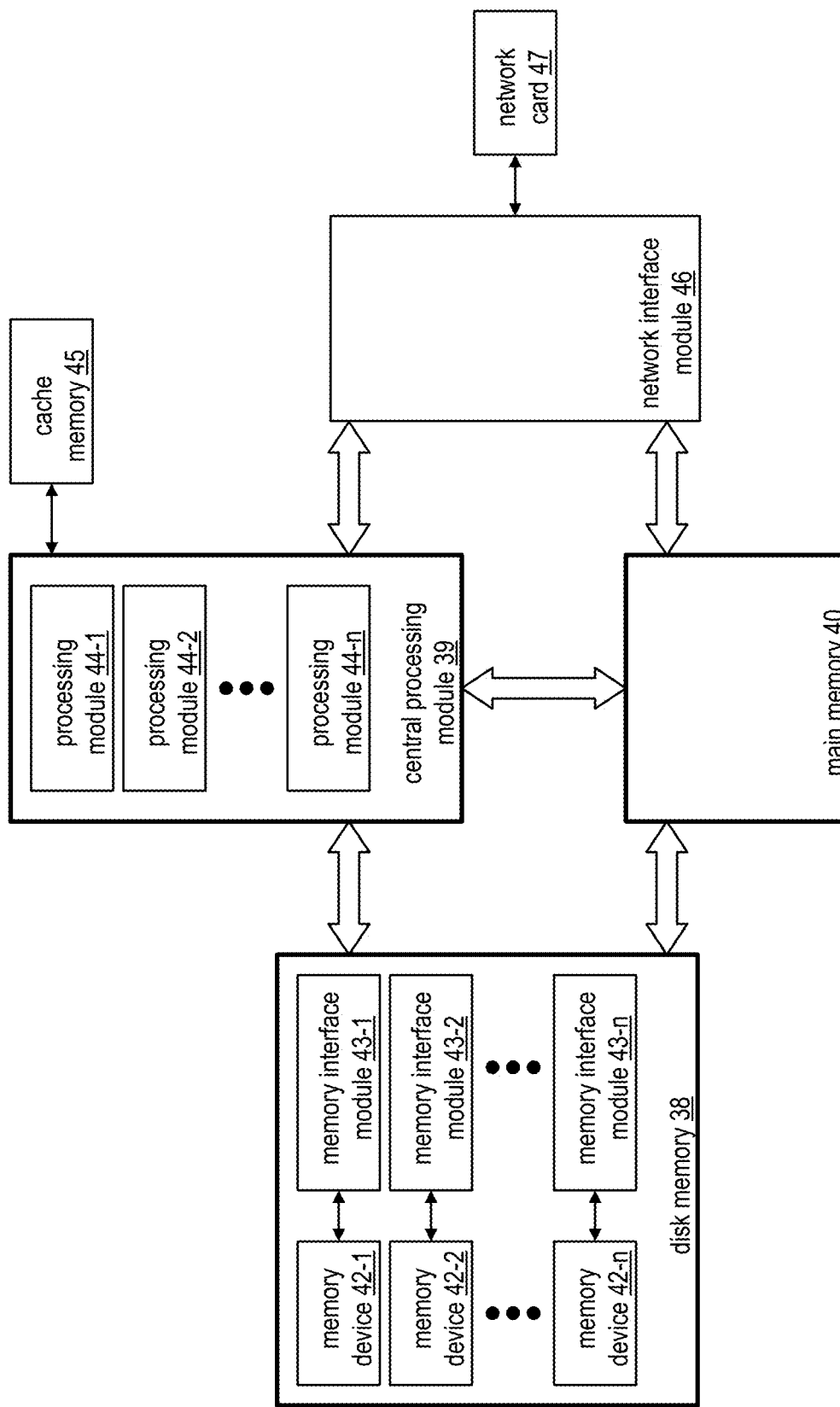
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
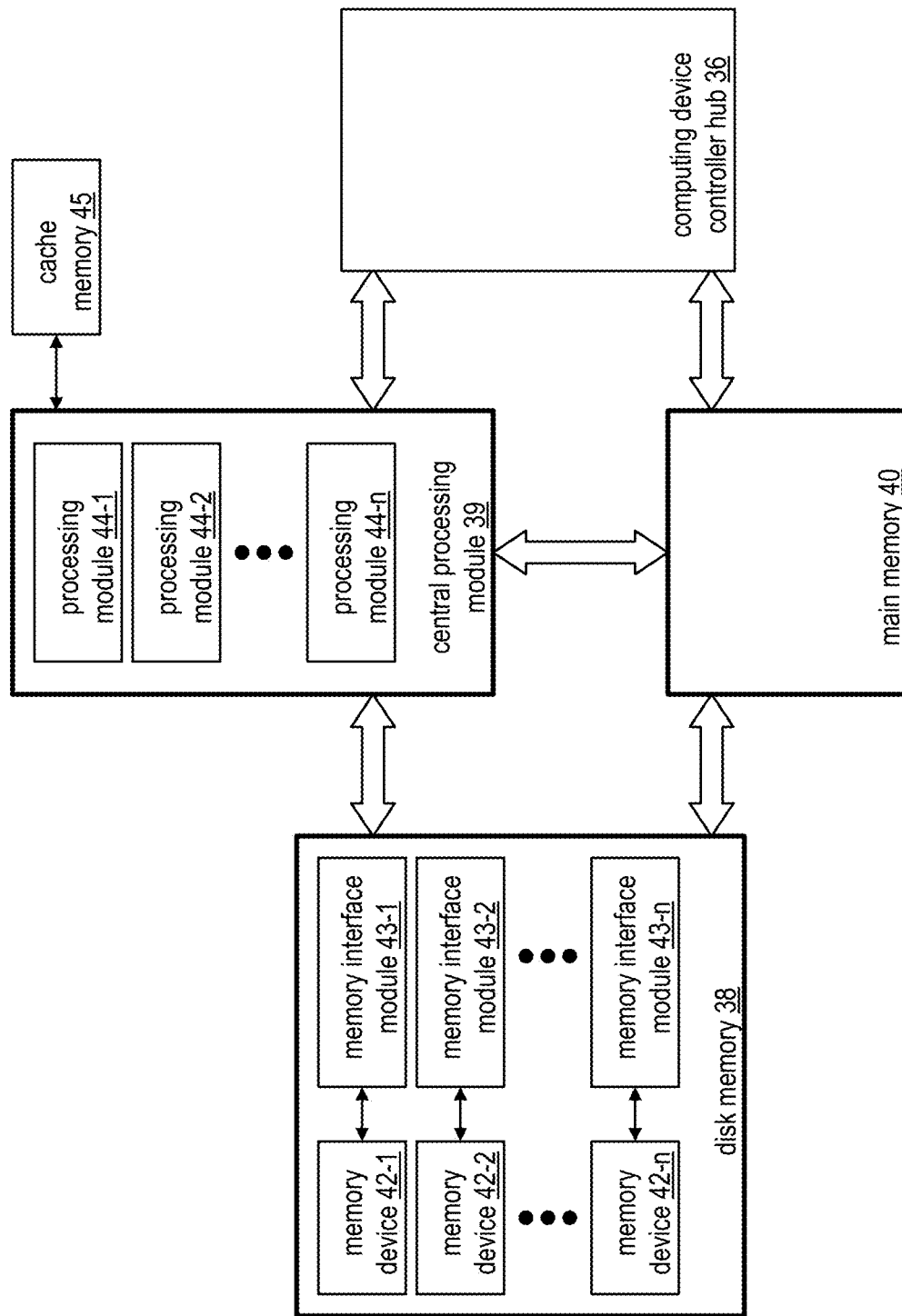
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
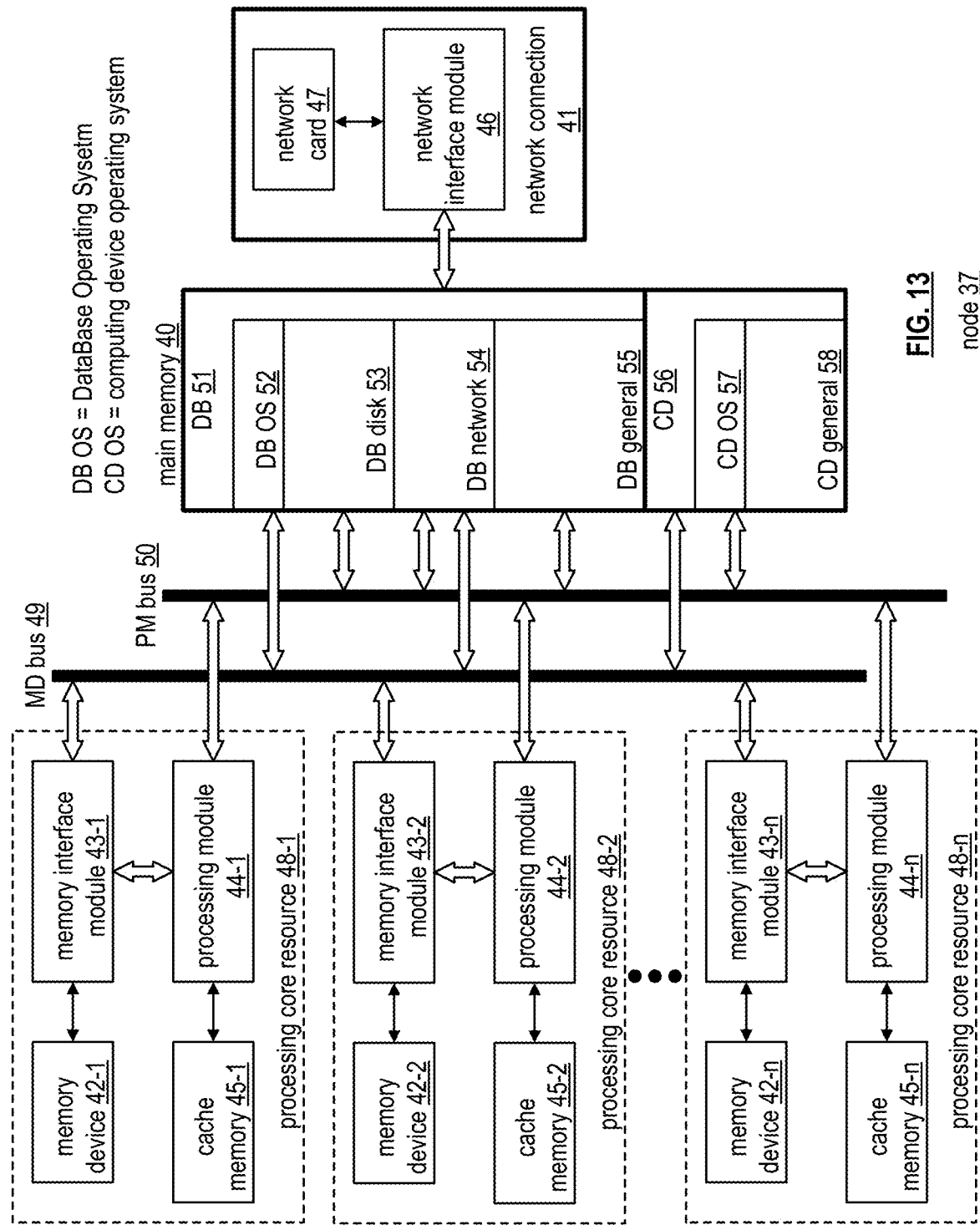
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
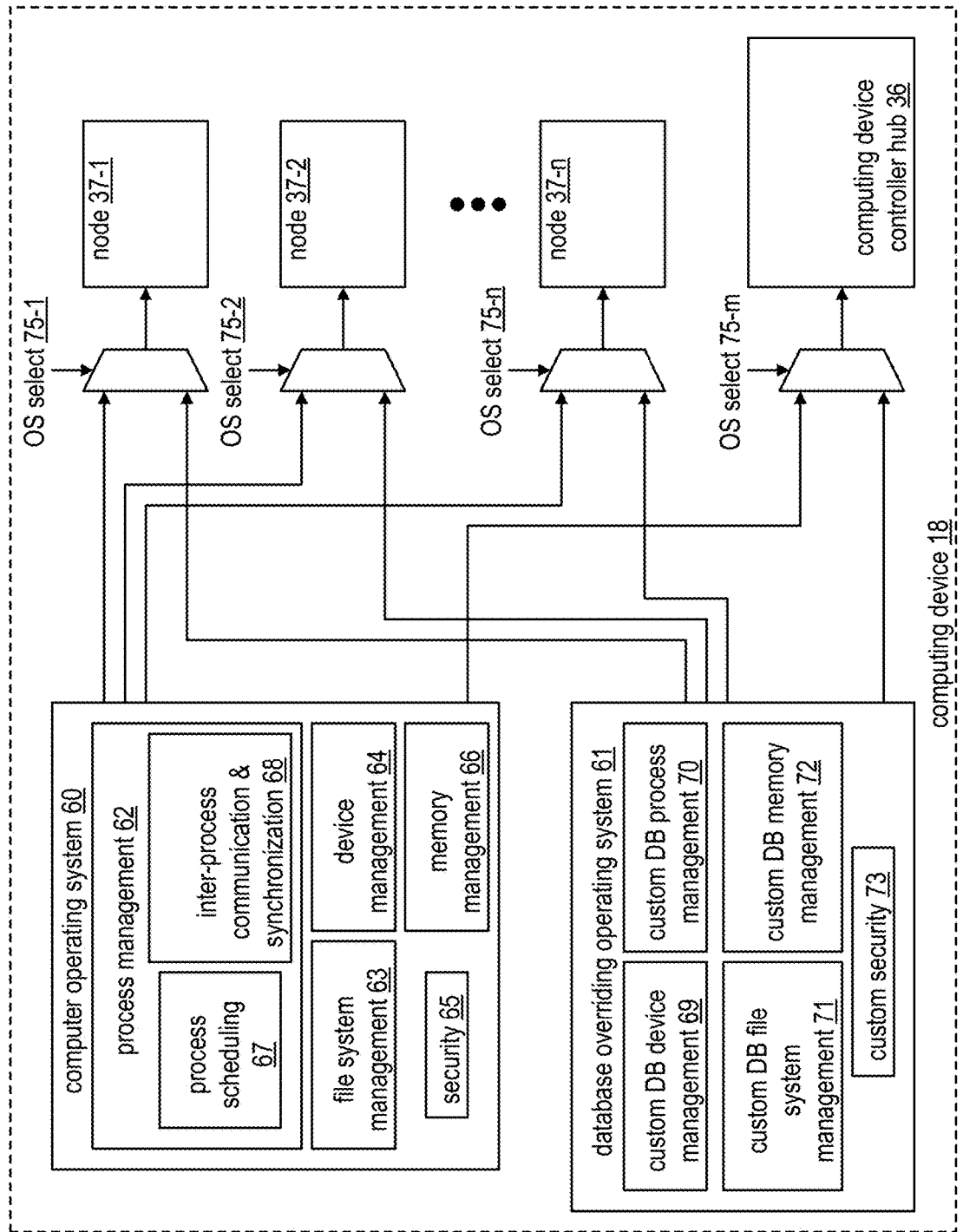
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
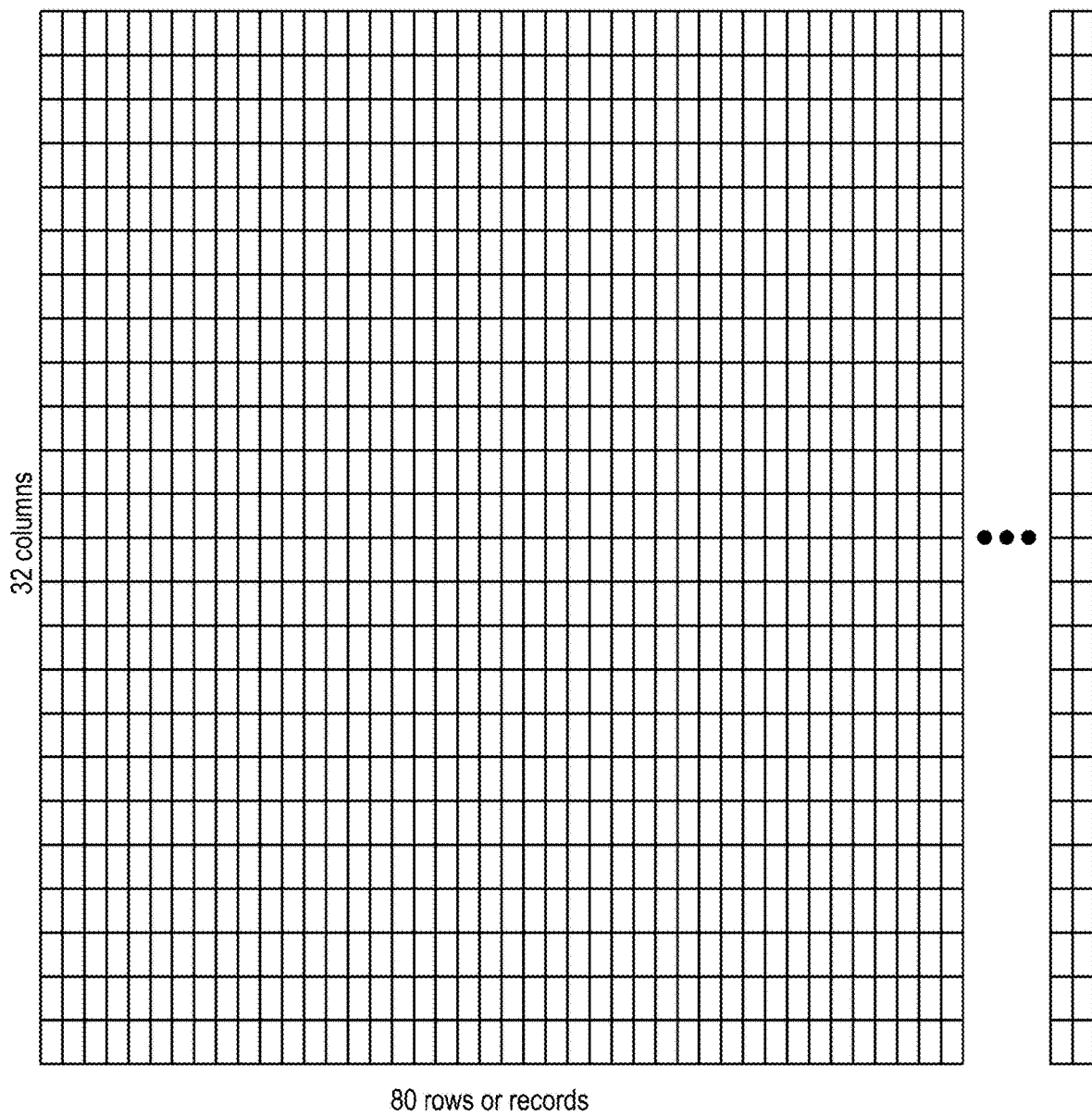

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
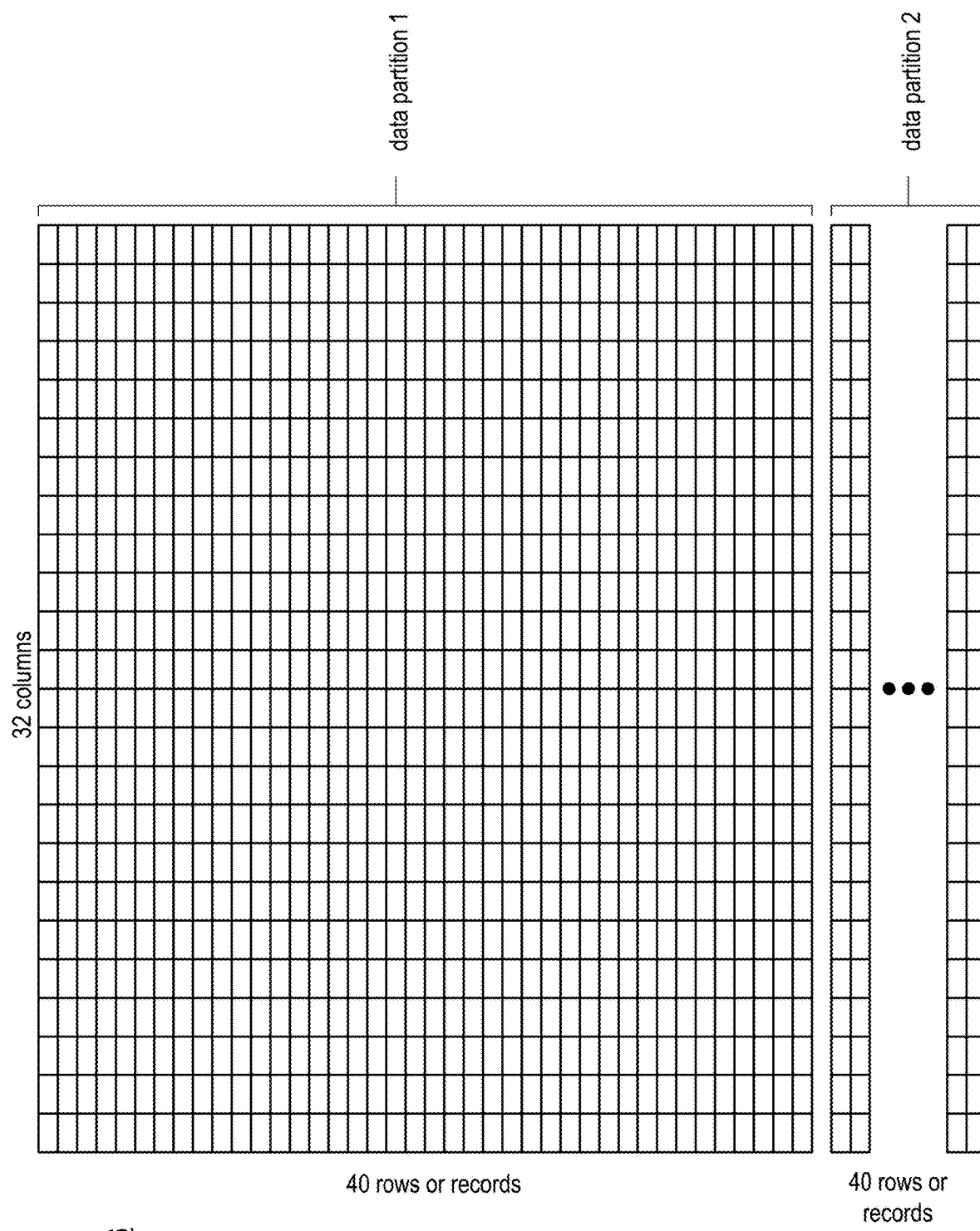

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
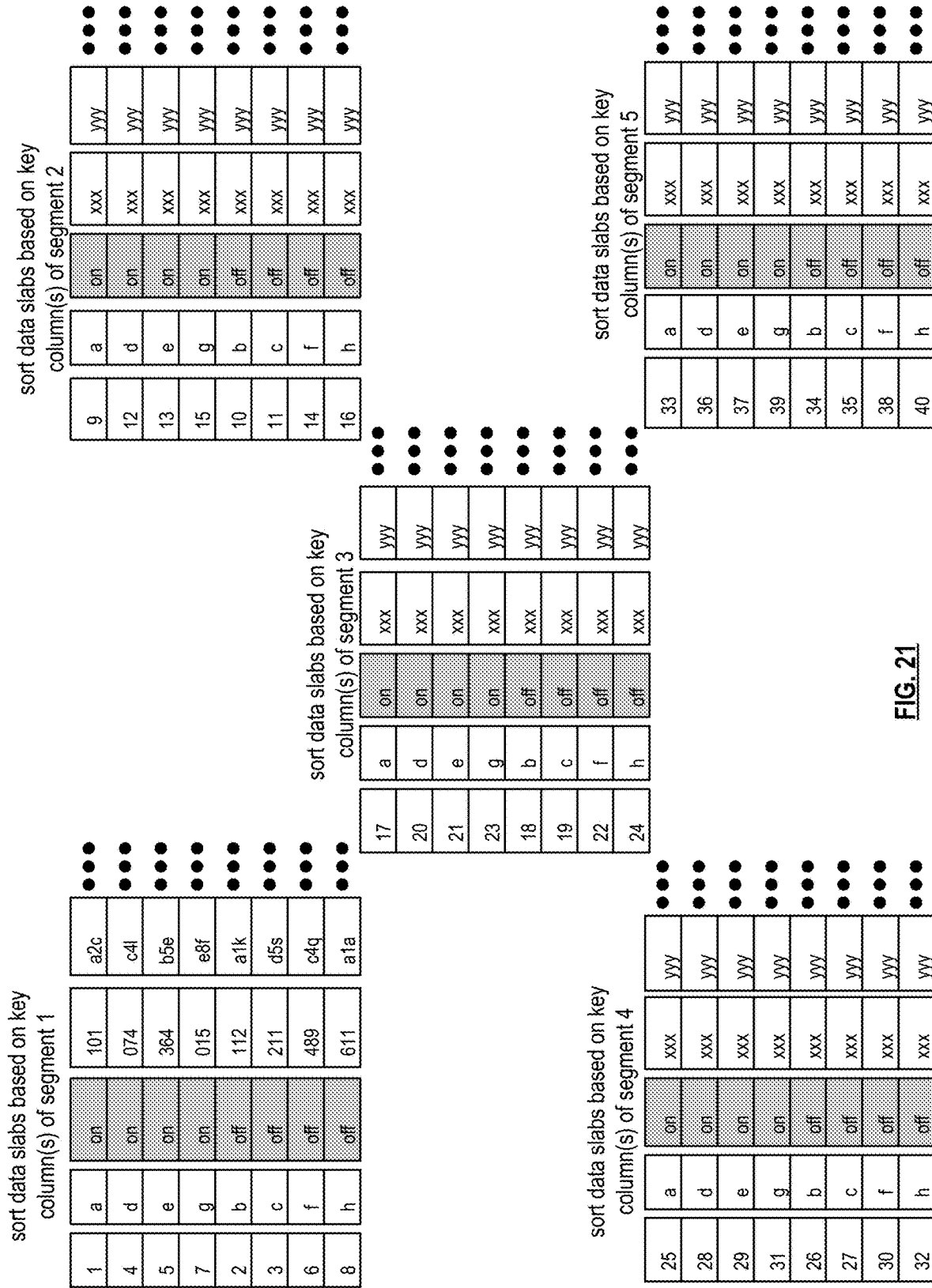

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
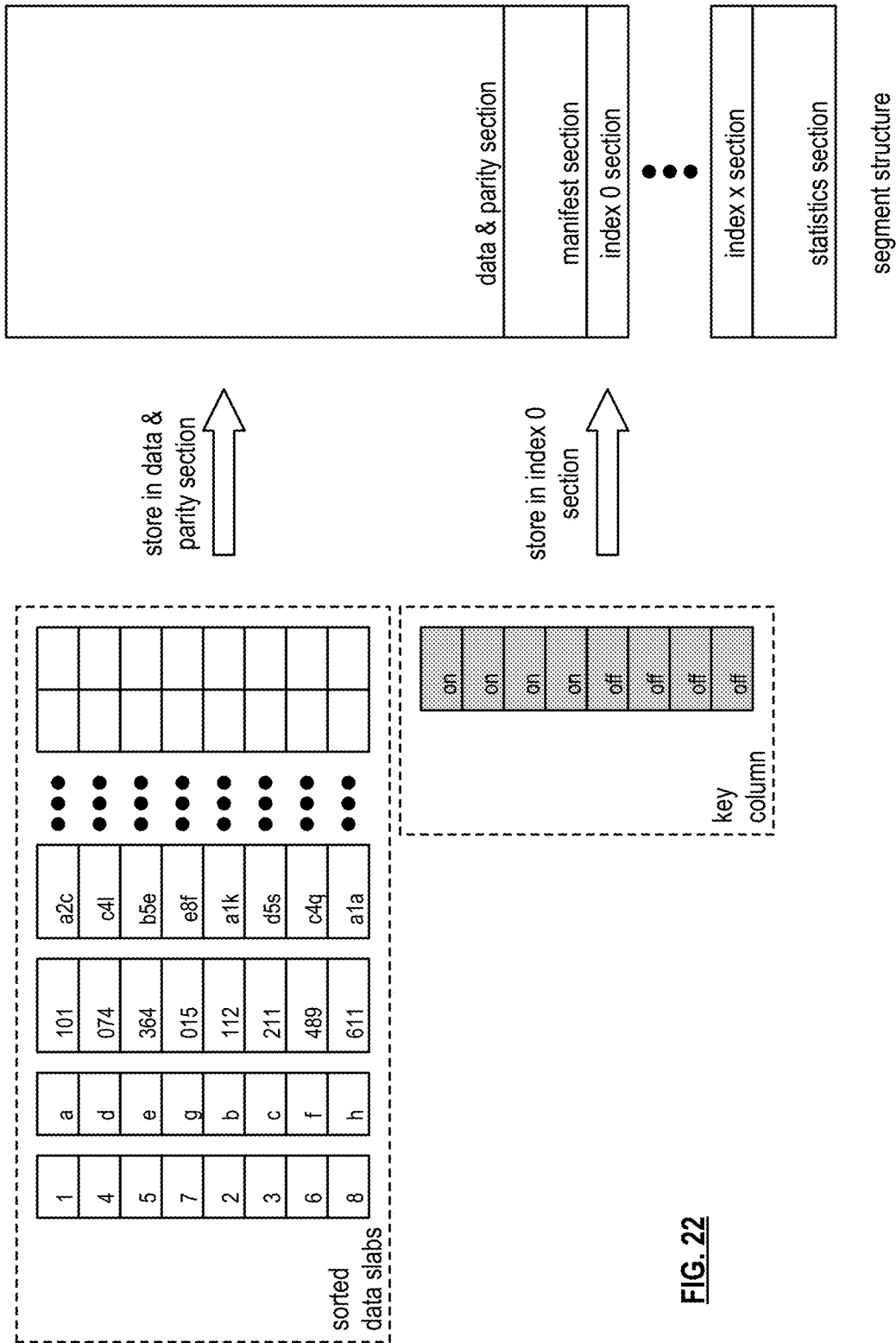

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
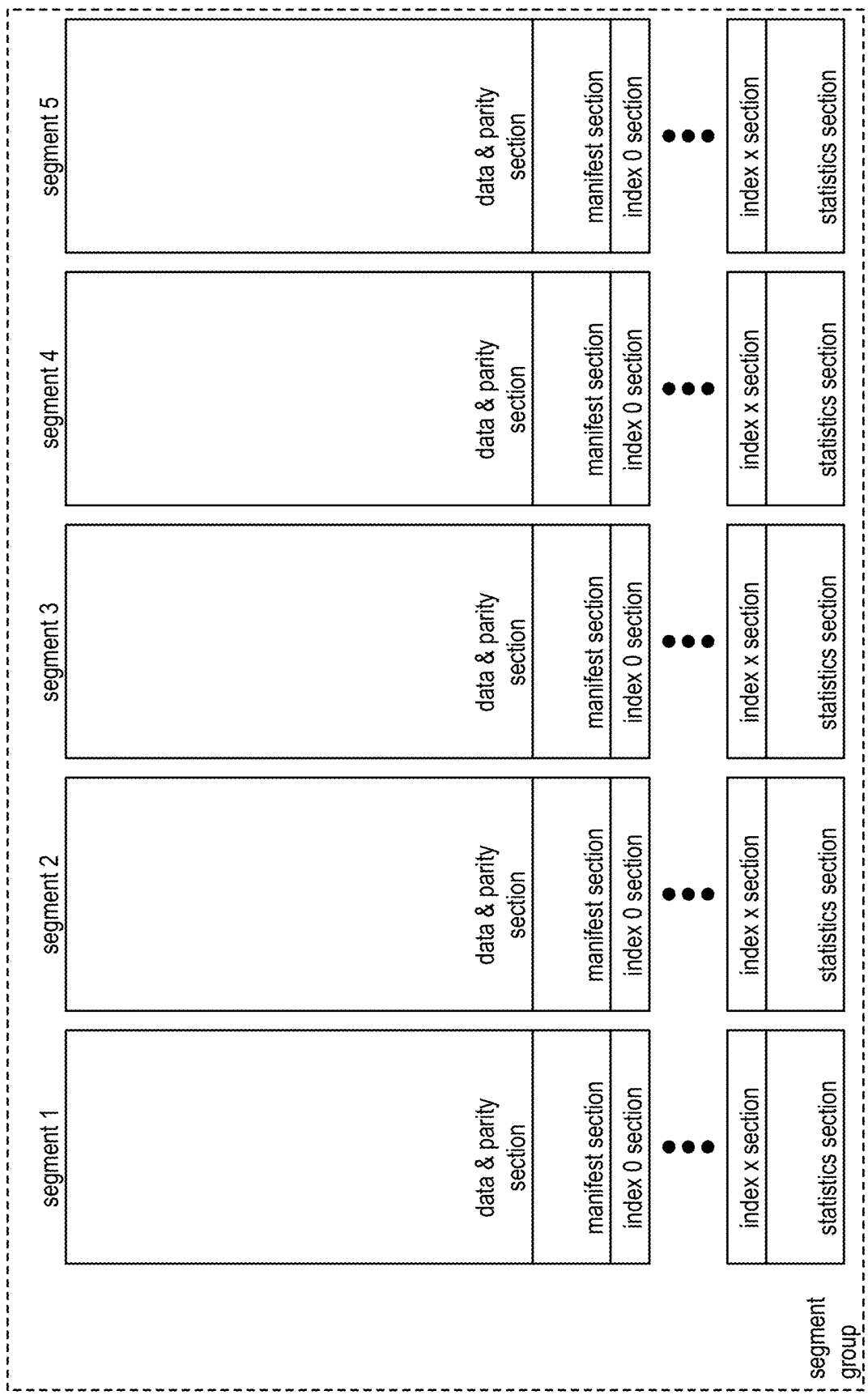

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
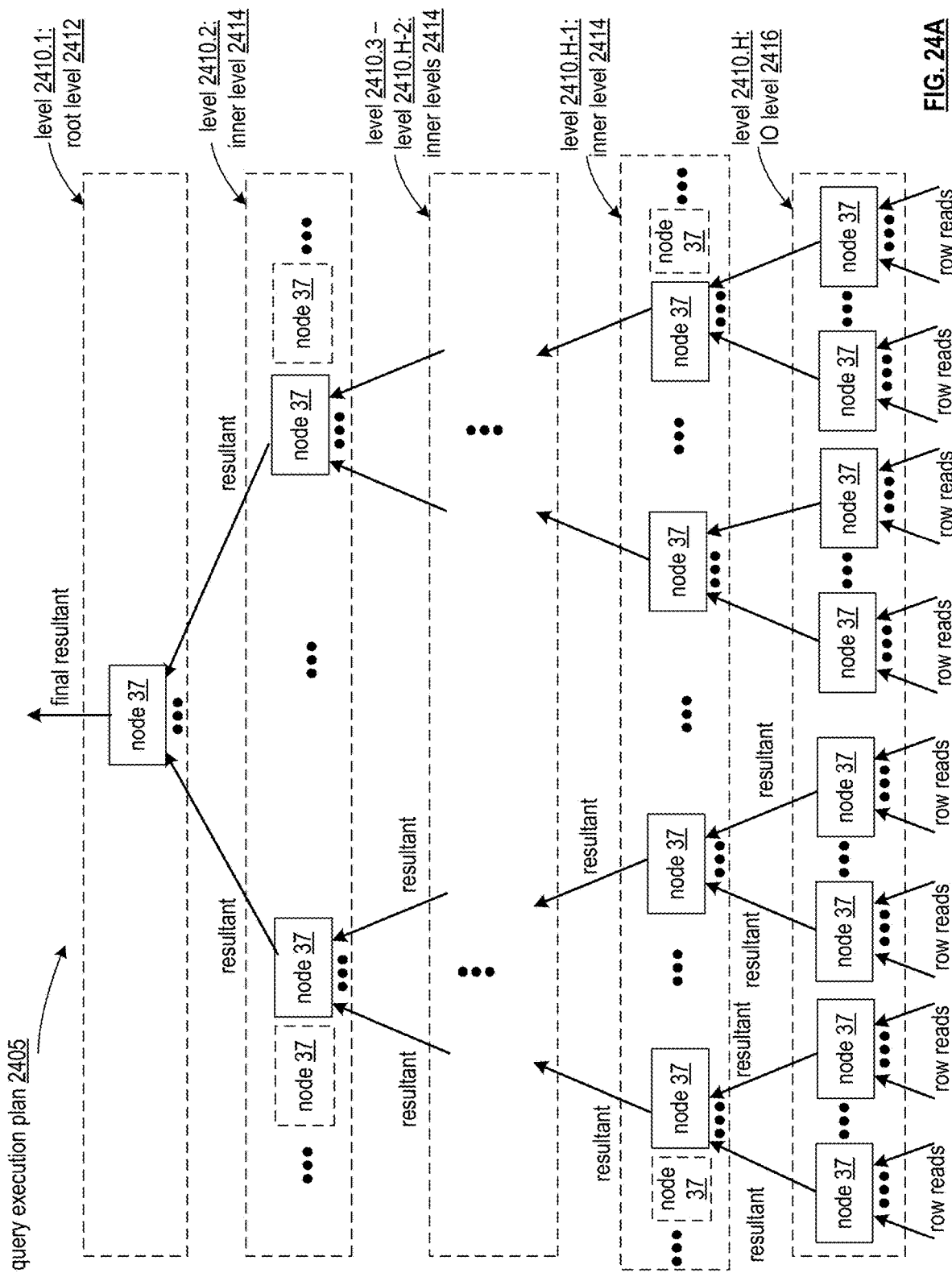
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H−1, and there are no other inner levels 2410.3-2410.H−2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
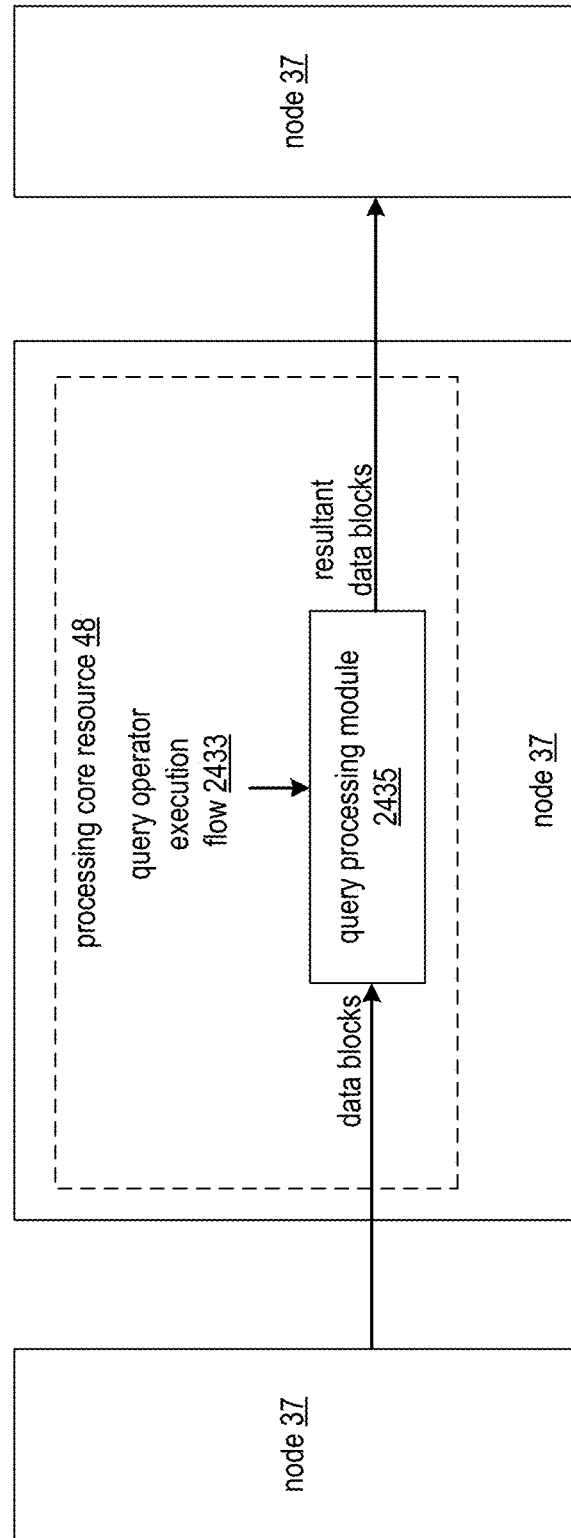
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
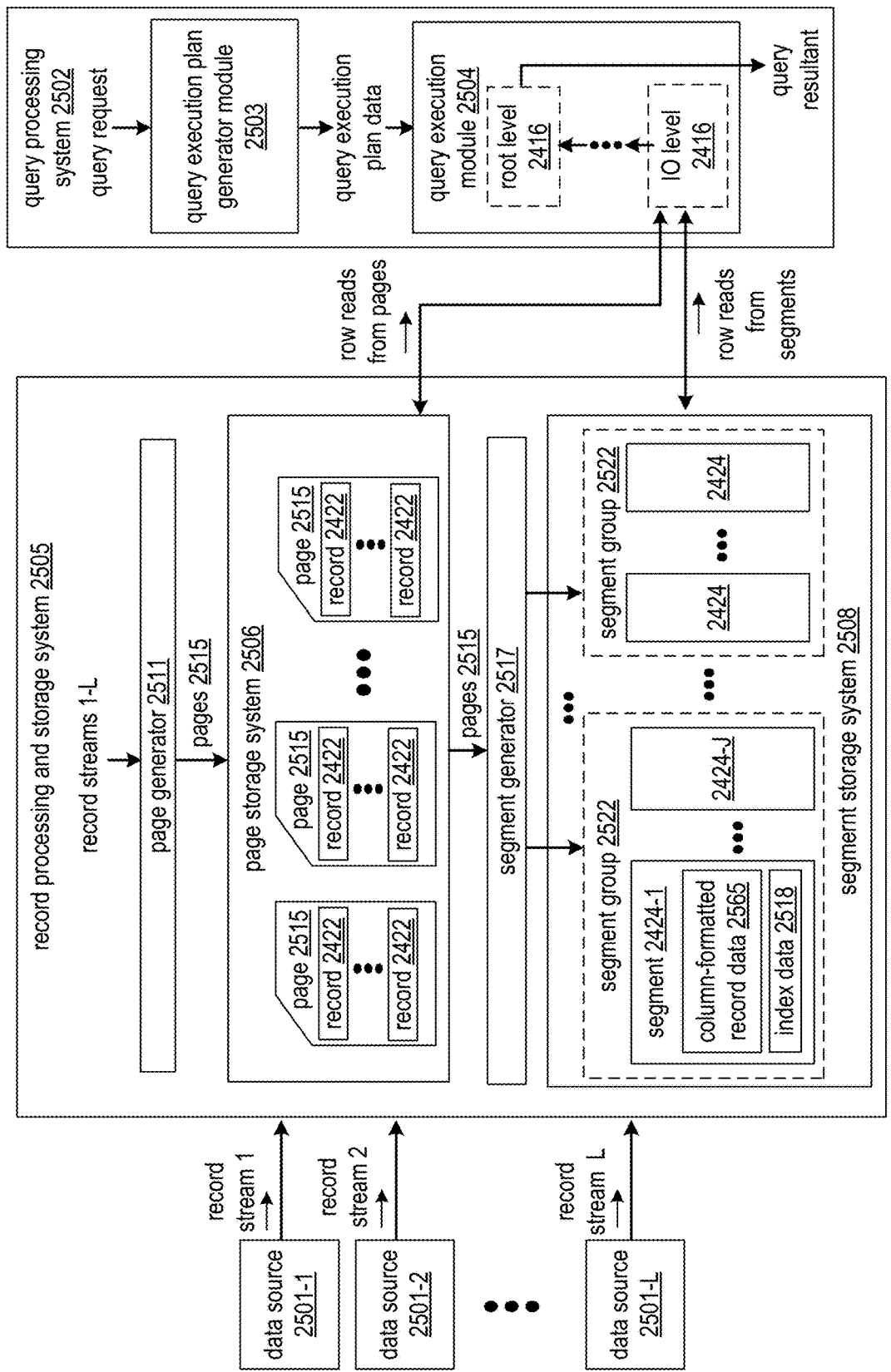
FIGS. 25A-25B are schematic block diagrams of embodiments of a database system that includes a record processing and storage system in accordance with various embodiments of the present invention.
Figure 25B:
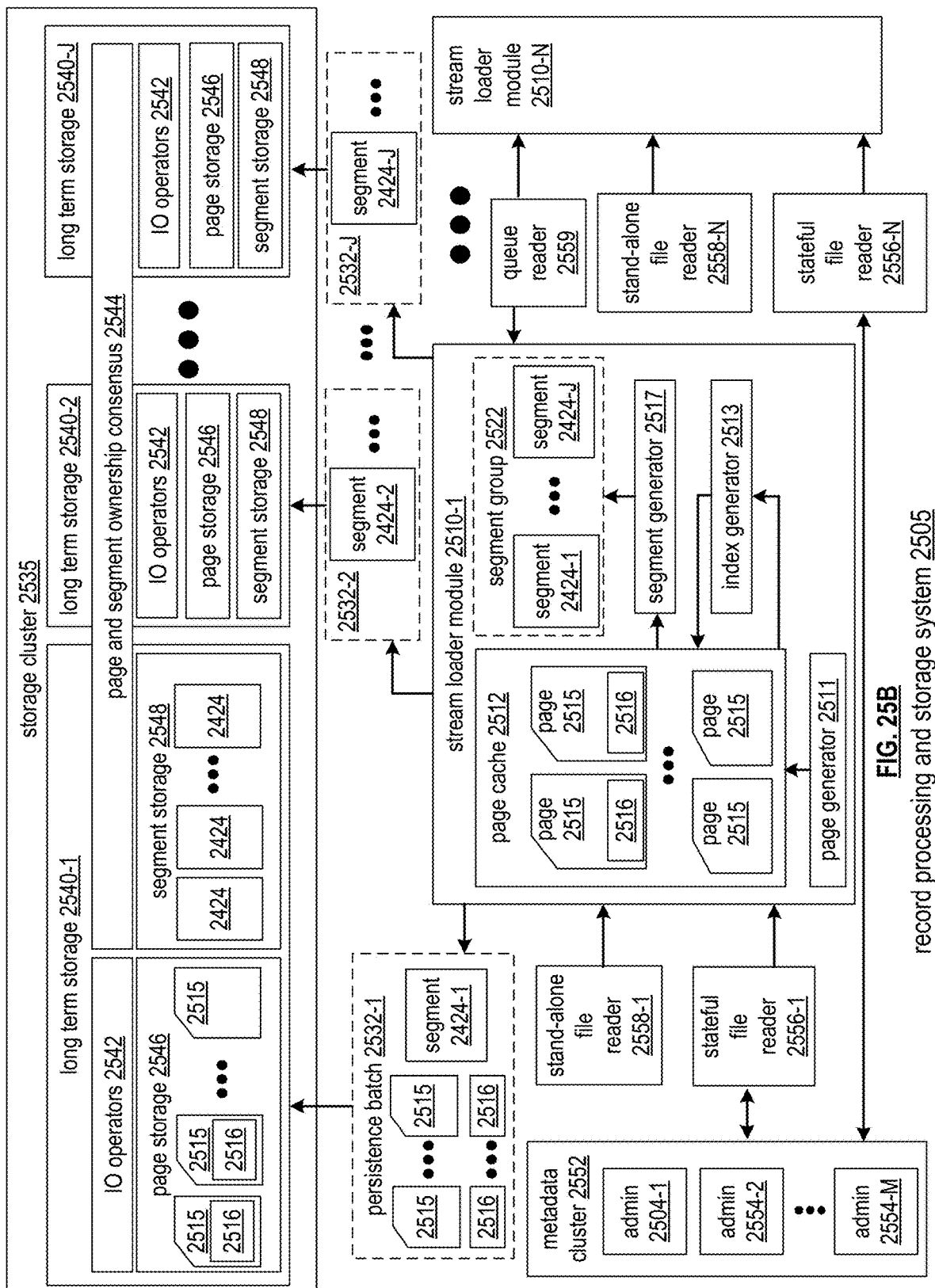
Figure 25C:
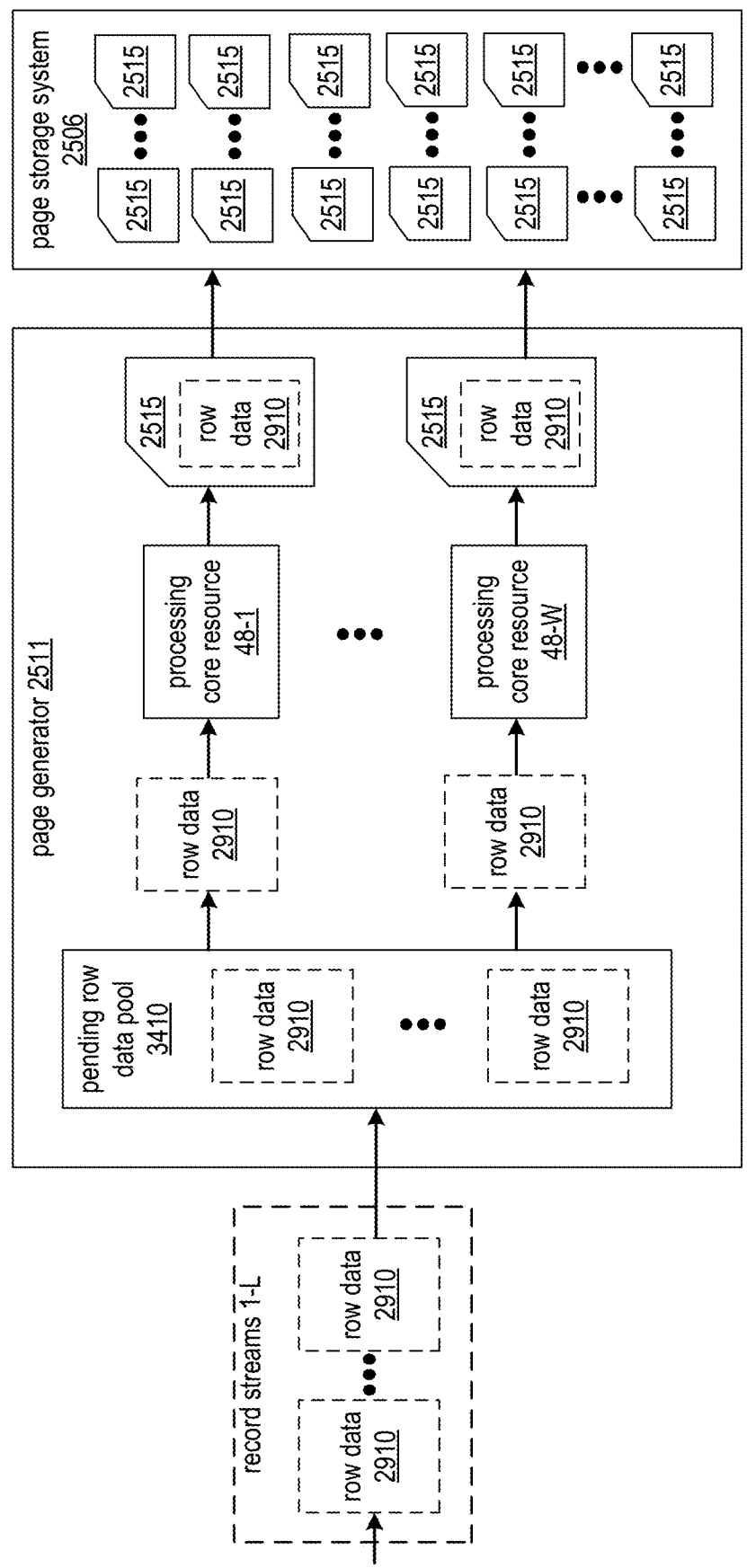
FIG. 25C is a is a schematic block diagrams of an embodiment of a page generator in accordance with various embodiments of the present invention.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
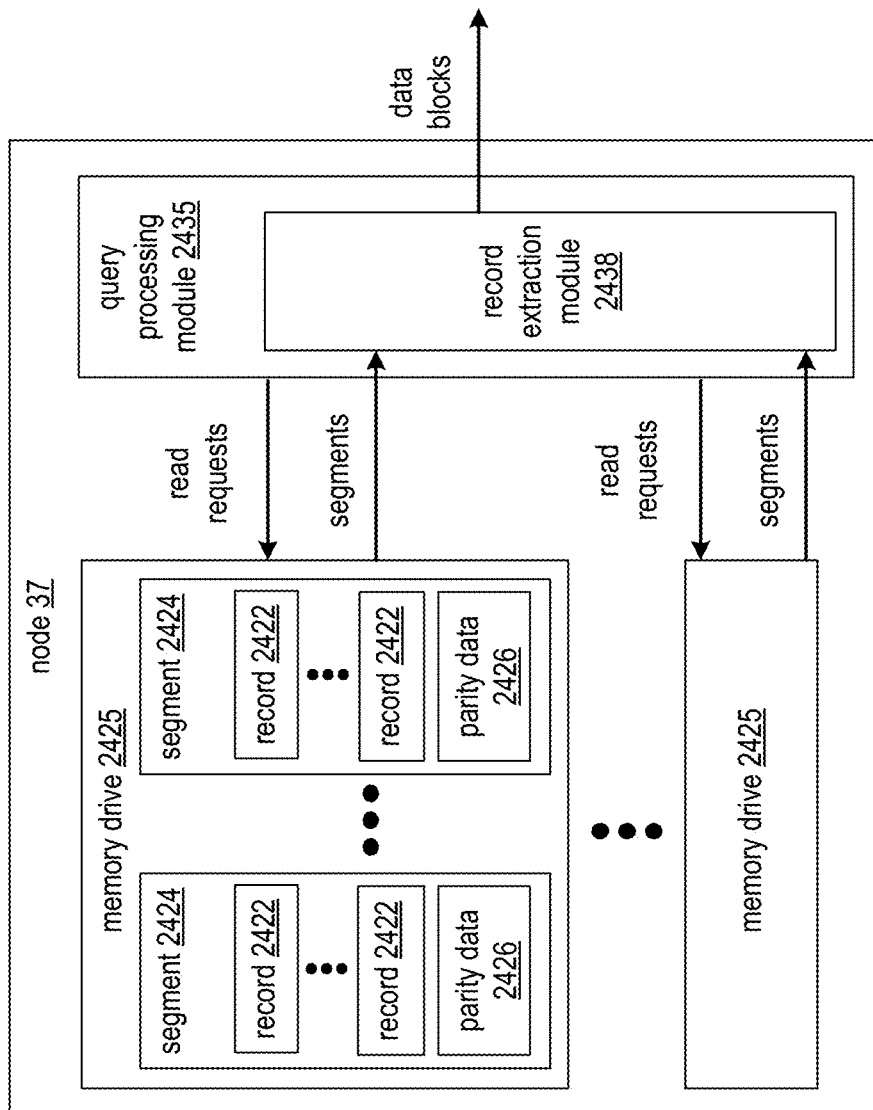
Figure 24D:
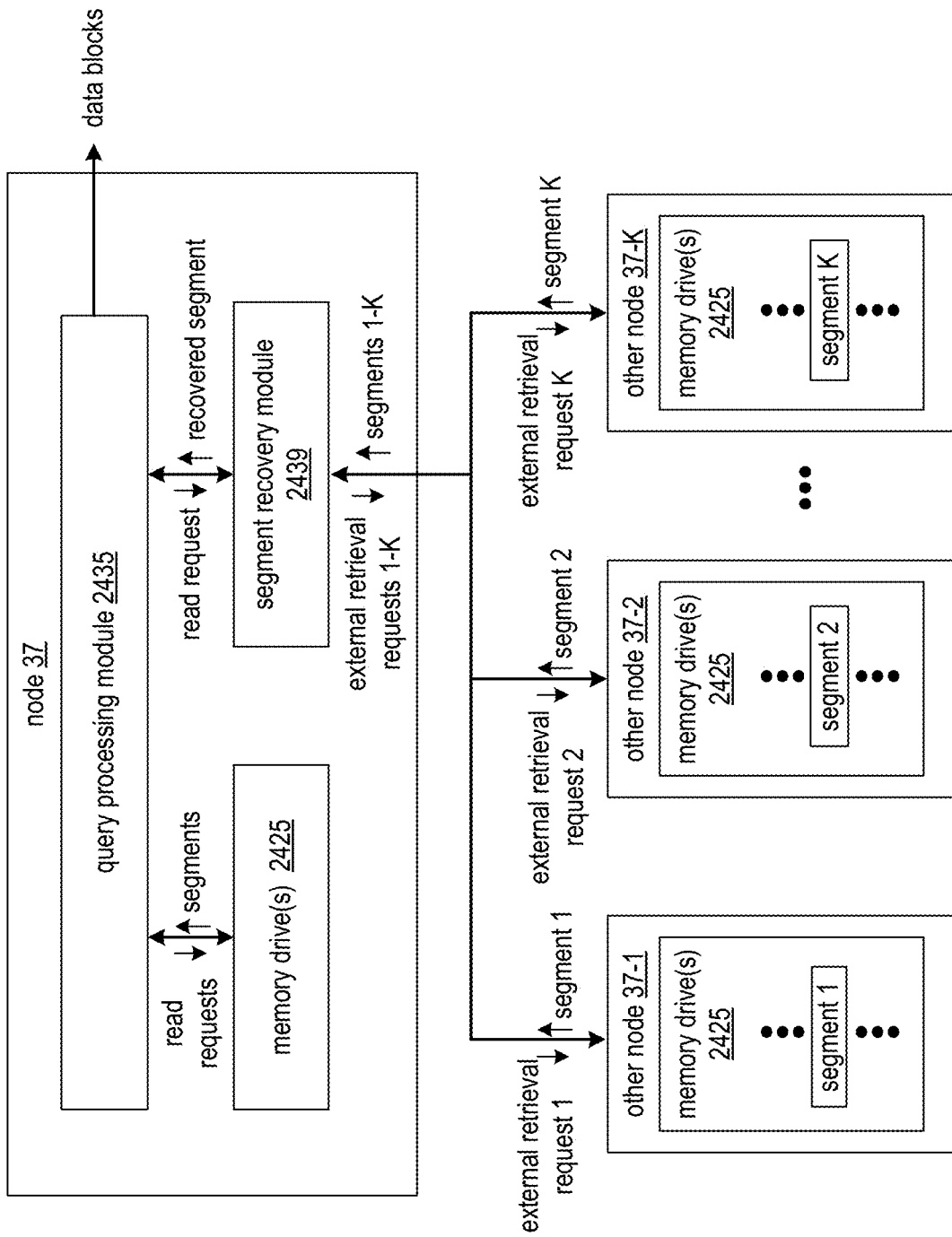

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

FIG. 25A illustrates an embodiment of a database system 10 that implements a record processing and storage system 2505. The record processing and storage system 2505 can be operable to generate and store the segments 2424 discussed previously by utilizing a segment generator 2517 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15.

For example, the segment generator 2517 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 27 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster keys are expected to be included in the total set of pages 2515 of the page storage system 2506 when the page storage system 2506 accumulates pages over longer periods of time to include a greater number of pages. In other words. delaying the grouping of rows into segments as long as possible increases the chances of having sufficient numbers of records with same and/or similar cluster keys to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2417 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources. Such embodiments are discussed in further detail in the embodiments discussed in conjunction with FIGS. 27A-28D.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at TO level 2416 to a root node at root level 2412 to generate a query resultant. The nodes at TO level 2416 can perform row reads to read records 2422 from segments 2424 as discussed previously and as illustrated in FIG. 24C. The nodes at TO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at TO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an TO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4.

The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2517 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2517, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2517, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data source 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2517; transfer of segments 2424 to the segment storage system 2508 once generated by the segment generator 2517; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of stream loader modules 2510-1-2510-N. Each stream loader module 2510 can be implemented via its own processing and/or memory resources. For example, each stream loader module 2510 can be implemented via its own computing device 18, via its own node 37, and/or via its own processing core resource 48. The plurality of stream loader modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each stream loader modules 2510 to receive one or more of the record streams 1-L received from the data sources 2501-1-2501-L as illustrated in FIG. 25A. For example, each stream loader module 2510 receives a distinct subset of the entire set of records received by the record processing and storage system 2505 at a given time.

Each stream loader module 2510 can receive records 2422 in one or more record streams via its own stateful file reader 2556 and/or stand-alone file reader 2558. Each stream loader module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given stream loader module 2510 is implemented via its own computing device 18 and/or node 37, the same computing device 18 and/or node 37 can optionally be utilized to implement the stateful file reader 2556, and/or each stand-alone file reader 2558 communicating with the given stream loader module 2510.

Each stream loader module 2510 can implement its own page generator 2511, its own index generator 2513, and/or its own segment generator 2517, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of stream loader modules 2510 as illustrated in FIG. 25B. Each page generator 2511 of FIG. 25B can process its own incoming records 2422 to generate its own corresponding pages 2515.

As pages 2515 are generated by the page generator 2511 of a stream loader module 2510, they can be stored in a page cache 2512. The page cache 2512 can be implemented utilizing memory resources of the stream loader module 2510, such as memory resources of the corresponding computing device 18. For example, the page cache 2512 of each stream loader module 2010-1-2010-N can individually or collectively implement some or all of the page storage system 2506 of FIG. 25A.

The segment generator 2517 of FIG. 25A can similarly be implemented as a plurality of segment generators 2517 of a corresponding plurality of stream loader modules 2510 as illustrated in FIG. 25B. Each segment generator 2517 of FIG. 25B can generate its own set of segments 2424-1-2424-J included in one or more segment groups 2522. The segment group 2522 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2517 of a stream loader module 2510 can access the page cache 2512 of the stream loader module 2510 to convert the pages 2515 previously generated by the page generator 2511 into segments. In some cases, each segment generator 2517 requires access to all pages 2515 generated by the segment generator 2517 since the last conversion process of pages into segments. The page cache 2512 can optionally store all pages generated by the page generator 2511 since the last conversion process, where the segment generator 2517 accesses all of these pages generated since the last conversion process to cluster records into groups and generate segments. For example, the page cache 2512 is implemented as a write-through cache to enable all previously generated pages since the last conversion process to be accessed by the segment generator 2517 once the conversion process commences.

In some cases, each stream loader module 2510 implements its segment generator 2517 upon only the set of pages 2515 that were generated by its own page generator 2511, accessible via its own page cache 2512. In such cases, the record grouping via clustering key to create segments with the same or similar cluster keys are separately performed by each segment generator 2517 independently without coordination, where this record grouping via clustering key is performed on N distinct sets of records stored in the N distinct sets of pages generated by the N distinct page generators 2511 of the N distinct stream loader modules 2510. In such cases, despite records never being shared between stream loader modules 2510 to further improve clustering, the level of clustering of the resulting segments generated independently by each stream loader module 2510 on its own data is sufficient, for example, due to the number of records in each stream loader module's 2510 set of pages 2515 for conversion being sufficiently large to attain favorable levels of clustering.

In such embodiments, each stream loader modules 2510 can independently initiate its own conversion process of pages 2515 into segments 2424 by waiting as long as possible based on its own resource utilization, such as memory availability of its page cache 2512. Different segment generators 2517 of the different stream loader modules 2510 can thus perform their own conversion of the corresponding set of pages 2515 into segments 2424 at different times, based on when each stream loader modules 2510 independently determines to initiate the conversion process, for example, based on each independently making the determination to generate segments as discussed in conjunction with FIG. 26A. Thus, as discussed herein, the conversion process of pages into segments can correspond to a single stream loader module 2510 converting all of its pages 2515 generated by its own page generator 2511 since its own last the conversion process into segments 2424, where different stream loader modules 2510 can initiate and execute this conversion process at different times and/or with different frequency.

In other cases, it is ideal for even more favorable levels of clustering to be attained via sharing of all pages for conversion across all stream loader modules 2510. In such cases, a collective decision to initiate the conversion process can be made across some or all stream loader modules 2510, for example, based on resource utilization across all stream loader modules 2510. The conversion process can include sharing of and/or access to all pages 2515 generated via the process, where each segment generator 2517 accesses records in some or all pages 2515 generated by and/or stored by some or all other stream loader modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple stream loader modules 2510. As discussed herein, the conversion process of pages into segments can optionally correspond to multiple stream loader modules 2510 converting all of their collectively generated pages 2515 since their last conversion process into segments 2424 via sharing of their generated pages 2515.

An index generator 2513 can optionally be implemented by some or all stream loader modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-x of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a stream loader module 2510 and can utilize its index generator 2513 to generate index data 2516 for a particular page 2515 in response to having query execution plan data indicating that records 2422 be read the particular page from the page cache 2512 of the stream loader module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each stream loader modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from stream loader modules 2510 to storage cluster 2535 and/or to facilitate sending of data from storage cluster 2535 to stream loader modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-z of FIG. 6 can receive pages 2515, corresponding index data 2516, and/or segments 2424 from its own set of stream loader modules 2510-1-2510-N, where the record processing and storage system 2505 of FIG. 25B can include z sets of stream loader modules 2510-1-2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the stream loader modules 2510. Alternatively, some stream loader modules can optionally share processing and/or memory resources long term storage 2540, for example, where a same computing device 18 and/or a same node 37 implements a particular long term storage 2540 and also implements a particular stream loader modules 2510.

Each stream loader module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a stream loader module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a stream loader module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2517. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a stream loader module 2510 maintains storage of pages 2515 via page cache 2512, even if they are sent to storage cluster 2535 in persistence batches 2532. This can enable the segment generator 2517 to efficiently read pages 2515 during the conversion process via reads from this local page cache 2512. This can be ideal in minimizing page movement, as pages do not need to be retrieved from long term storage 2540 for conversion into segments by stream loader modules 2510 and can instead be locally accessed via maintained storage in page cache 2512. Alternatively, a stream loader module 2510 removes pages 2515 from storage via page cache 2512 once they are determined to be successfully stored in long term storage 2540. This can be ideal in reducing the memory resources required by stream loader module 2510 to store pages, as only pages that are not yet durably stored in long term storage 2540 need be stored in page cache 2512.

Each long term storage 2540 can include its own page storage 2546 that stores received pages 2515 generated by and received from one or more stream loader modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more stream loader modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the stream loader module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a stream loader module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and segment ownership consensus 2544 can include one or more versions of ownership data, for example, that is generated via execution of a consensus protocol mediated via the set of long term storage 2540-1-2540-J. The page and segment ownership consensus 2544 can dictate that every record is owned by exactly one long term storage 2540 via access to either a page 2515 storing the record or a segment 2424 storing the record, but not both. The page and segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and segment ownership consensus 2544. For example, the long term storage 2540 can be solely responsible for durably storing the records utilized in query executions. In such embodiments, the cached and/or temporary storage of pages and/or segments of stream loader modules 2510, such as pages 2515 in page caches 2512, are not read for query executions via accesses to storage resources of stream loader modules 2510.

FIG. 25C illustrates an example embodiment of a page generator 2511. The page generator 2511 of FIG. 25C can be utilized to implement the page generator 2511 of FIG. 25A, can be utilized to implement each page generator 2511 of each stream loader module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a stream loader module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each stream loader module 2510 can have its own pending row data pool 3410. Alternatively, multiple stream loader modules 2510 can access the same row data pool 3410 that stores all incoming row data 2910, for example, by utilizing queue reader 2559.

The page generator 2511 can facilitate parallelized page generation via a plurality of processing core resources 48-1-48-W. For example, each stream loader module 2510 has its own plurality of processing core resources 48-1-48-W, where the processing core resources 48-1-48-W of a given stream loader module 2510 is implemented via the set of processing core resources 48 of one or more nodes 37 utilized to implement the given stream loader module 2510.

As another example, the plurality of processing core resources 48-1-48-W are each implemented by a corresponding one of the set of each stream loader module 2510-1-2510-N, for example, where each stream loader module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding stream loader module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Figure 25D:
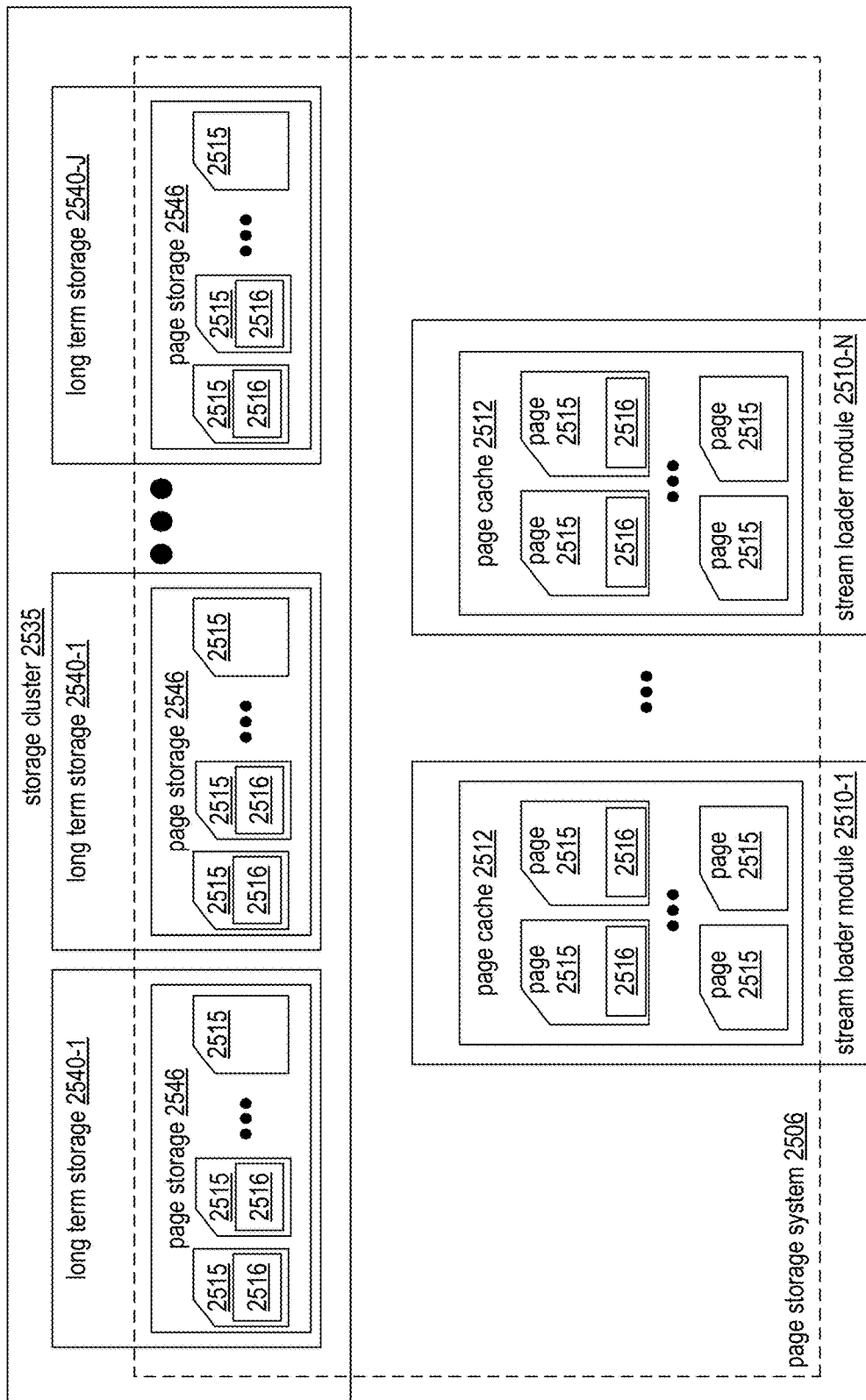
FIG. 25D is a schematic block diagrams of an embodiment of a page storage system of a record processing and storage system in accordance with various embodiments of the present invention.
Figure 25E:
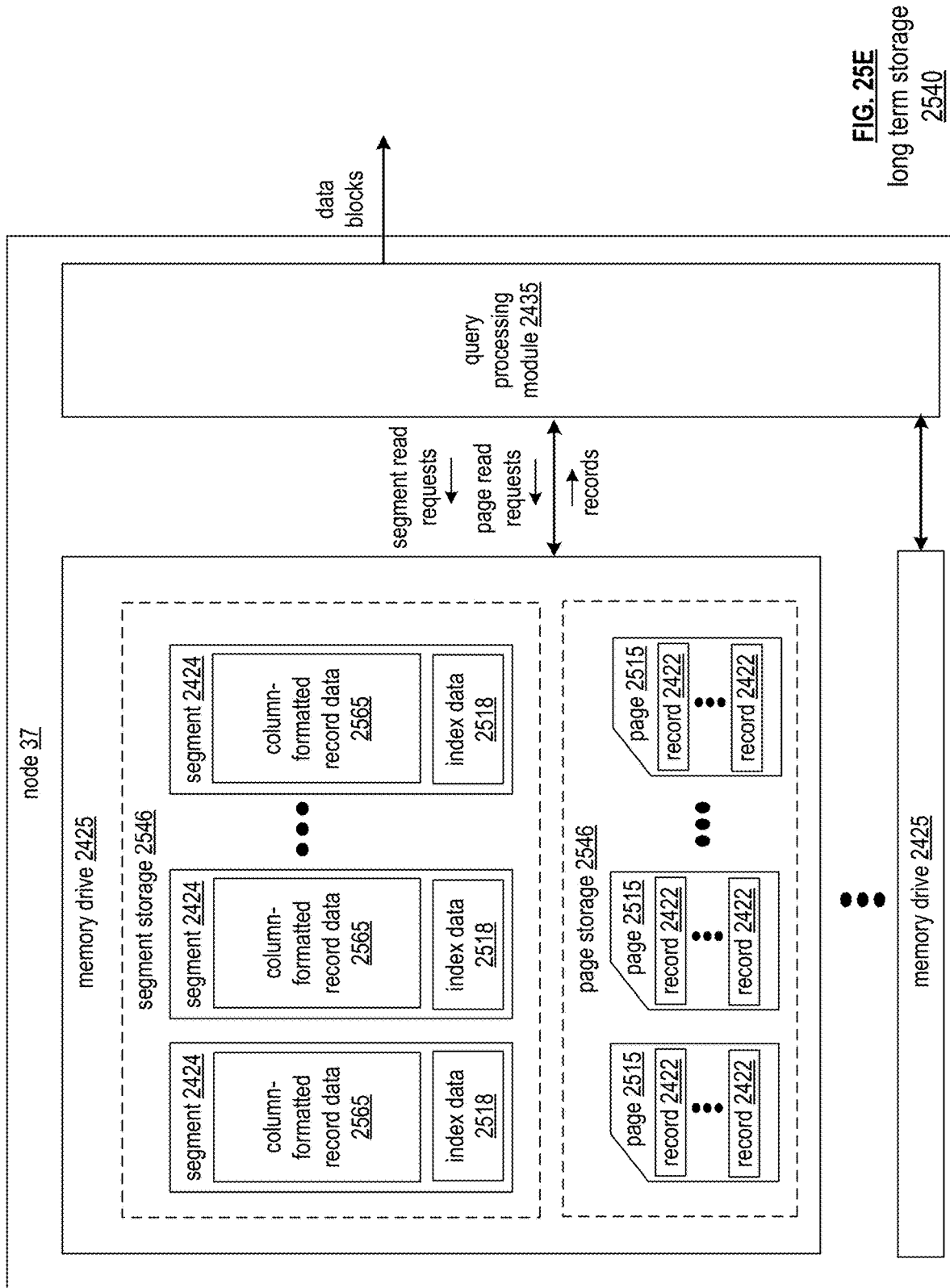
FIG. 25E is a schematic block diagrams of a node that implements a query processing module that reads records from segment storage and page storage in accordance with various embodiments of the present invention.

FIG. 25D illustrates an example embodiment of the page storage system 2505. As used herein, the page storage system 2505 can include page cache 2512 of a single stream loader module 2510; can include page caches 2512 of some or all stream loader module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-z; and/or can include any other memory resources of database system 10 that are utilized to temporarily and/or durably store pages.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the TO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the TO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Figure 26A:
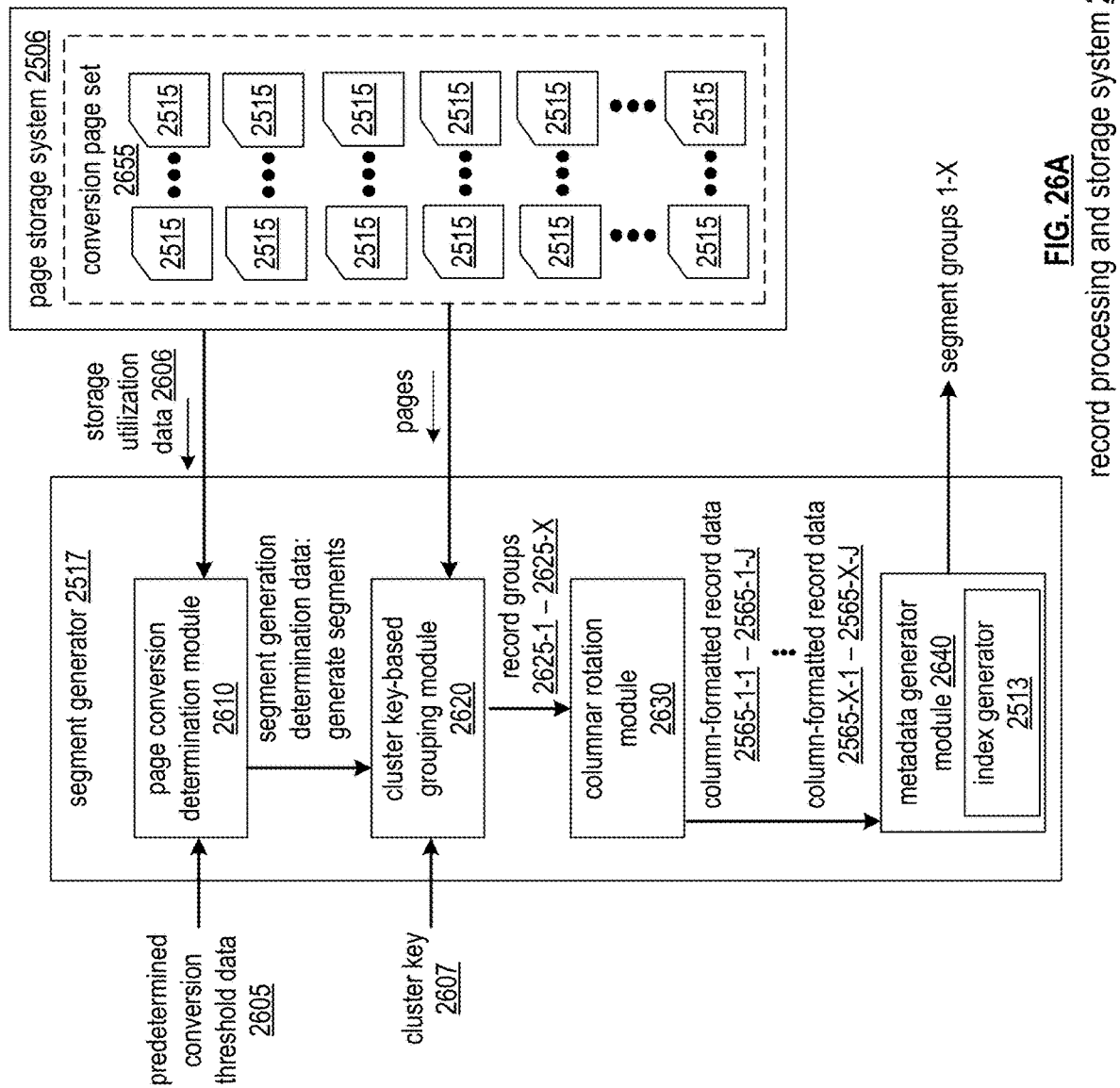
FIG. 26A is a schematic block diagram of a segment generator of a record processing and storage system in accordance with various embodiments of the present invention.

FIG. 26A illustrates an example embodiment of a segment generator 2517. The segment generator 2517 of FIG. 26A can be utilized to implement the segment generator 2517 of FIG. 25A, can be utilized to implement each segment generator 2517 of each stream loader module 2510 of FIG. 25B, and/or can be utilized to implement any embodiments of segment generator 2517 described herein.

As discussed previously, the record processing and storage system 2505 can be operable to delay the conversion of pages into segments. Rather than frequently clustering rows and converting rows into column format, movement and/or processing of rows can be minimized by delaying the clustering and conversion process required to generate segments 2424, for example, as long as possible. This delaying of the conversion process "as long as possible" can be bounded by resource availability, such as disk and/or memory capacity of the record processing and storage system 2505. In particular, the conversion process can be delayed to enable the accumulating of as many pages in the page storage system 2506 that page storage system 2506 is capable of storing.

Maximizing the delay until pages are processed as enabled by storage resources of the record processing and storage system 2505 improves the technology of database systems by improving query efficiency. In particular, delaying the decision of which rows to group together into segments as long as possible increased the chances of having many records with common cluster keys to group together, as cluster key-based groups are formed from a largest possible set of records. These more favorable levels of clustering enable queries to be performed more efficiently as discussed previously. For example, rows that need be accessed in a given query as dictated by filtering parameters of the query are more likely to be stored together, and fewer segments and/or memory locations need to be accessed.

Maximizing the delay until pages are processed as enabled by storage resources of the record processing and storage system 2505 improves the technology of database systems by improving data ingress efficiency. By placing rows directly into pages without regard for clustering as they are received, this delayed approach minimizes the number of times a row "moves" through the system, such as from disk, to memory, and/or through the processor. In particular, by delaying all clustering until segment generation for the received rows all at once, the rows are moved exactly once, to their final resting place as a segment 2424. This conserves resources of the record processing and storage system 2505, enabling higher rates of records to be received and processed for storage via data sources 2501 and thus enabling a richer, denser database to be generated over time. For example, this can enable the record processing and storage system 2505 to effectively process incoming records at a scale of terabits per second.

This delay can be accomplished via a page conversion determination module 2610 implemented by the segment generator 2517 and/or implemented via other processing resources of the record processing and storage system 2505. The page conversion determination module 2610 can be utilized to generate segment generation determination data indicating whether the conversion process of pages into segments should be commenced at a given time. For example, the page conversion determination module 2610 generates an interrupt or notification that includes the generate segment generation determination data indicating it is time to generate segments based on determining to generate segments at the given time. The page conversion determination module 2610 can otherwise trigger the commencement of converting pages into segments once it deems the conversion process appropriate, for example, based on delaying as long as possible. The segment generator 2517 can commence the conversion process accordingly in response to the segment generation determination data indicating it is time to generate segments, for example, via a cluster key-based grouping module 2620, a columnar rotation module 2630, and/or a metadata generator module 2640. The delay of converting pages into segments via the page conversion determination module 2610 and the repeating of this process over time is discussed in further detail in conjunction with the example timeline of FIG. 26B.

In some cases, the page conversion determination module 2610 optionally generates some segment generation determination data indicating it is not yet time to generate segments. In some embodiments, this information may not be communicated if it is determined that is not yet time to generate segments, where only notifications instructing the conversion process be commenced is communicated to initiate the process via cluster key-based grouping module 2620, a columnar rotation module 2630, and/or a metadata generator module 2640.

The page conversion determination module 2610 can generate segment generation determination data: in predetermined intervals; in accordance with a schedule; in response to determining a new page has been generated and stored in page storage system 2506; in response determining at least a threshold number of new pages have been generated and stored in page storage system 2506; in response to determining the storage space and/or memory utilization of page storage system 2506 has changed; in response to determining the total storage capacity of page storage system 2506 has changed; in response to determining at least one memory drive of the page storage system 2506 has failed or gone offline; in response to receiving storage utilization data from page storage system 2506; based on instruction supplied via user input, for example, via administration sub-system 15 and/or configuration sub-system 16; based on receiving a request; and/or based on another determination.

The page conversion determination module 2610 can generate its segment generation determination data based on comparing storage utilization data 2606 to predetermined conversion threshold data 2605. The storage utilization data can optionally be generated by the page storage system 2506. The record processing and storage system 2505 can indicate and/or be based on one or more storage utilization metrics indicating: an amount and/or percentage of storage resources of the page storage system 2506 that are currently being utilized to store pages 2515; an amount and/or percentage of available resources of the page storage system 2506 that are not currently being utilized to store pages 2515; a number of pages 2515 currently stored by the page storage system 2506; a data size, such as a number of bytes, of the set of pages 2515 currently stored by the page storage system 2506; an expected amount of time until storage resources of the page storage system 2506 are expected to become fully utilized for page storage based on current and/or historical data rates of record streams 1-L; current health data and/or failure data of storage resources of the page storage system 2506; an amount of time since the last conversion process was initiated and/or was completed; and/or other information regarding the storage utilization of the page storage system 2506.

In some cases, the storage utilization data 2606 can relate specifically to storage utilization of a page cache 2512 of a stream loader module 2510 of FIG. 25B, where the segment generator 2517 of FIG. 26A is implemented by the corresponding stream loader module 2510 and where the segment generator 2517 of FIG. 26A is operable to perform the conversion process only upon pages 2515 in the page cache 2512. In some cases, the storage utilization data 2606 can relate specifically to storage utilization across all page caches 2512 of all stream loader modules 2510-1-2510-N, where the page conversion determination module 2610 of FIG. 26A is implemented to dictate whether the conversion process be commenced across all corresponding stream loader modules 2510. In some cases, the storage utilization data 2606 can alternatively or include storage utilization of page storage 2546 of one or more of the long term storage 2540-1-2540-J of FIG. 25B. The storage utilization data 2606 can relate to any combination of storage resources of page storage system 2506 as discussed in conjunction with FIG. 25D that are utilized to store a particular set of pages to be converted into segments in tandem via the conversion process performed by segment generator 2517.

The storage utilization data 2606 can be sent to and/or requested by the segment generator 2517: in predefined intervals; in accordance with scheduling data; based on the page conversion determination module 2610 determining to generate the segment generation determination data; based on a determination, notification, and/or instruction that the page conversion determination module 2610 should generate the segment generation determination data; and/or based on another determination. In some cases, some or all of the page conversion determination module 2610 is implemented via processing resources and/or memory resources of the page storage system 2506, for example, to enable the page conversion determination module 2610 to monitor and/or measure the storage utilization data 2606 of its own resources included in page storage system 2506.

The predetermined conversion threshold data 2605 can indicate one or more threshold metrics or other threshold conditions that, when met by one or more corresponding metrics of the storage utilization data 2606 at a given time, trigger the commencement of the conversion process. In particular, the page conversion determination module generates the segment generation determination data indicating that segments be generated when the at least one metric of the storage utilization data 2606 meets the threshold metrics and/or conditions of the predetermined conversion threshold data 2605 and/or otherwise compares favorably to a condition for page conversion indicated by the predetermined conversion threshold data 2605. If the none of the metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, the page conversion determination module generates the segment generation determination data indicating that segments be generated only when at least a predetermined threshold number of metrics of the storage utilization data 2606 compare favorably to the corresponding threshold metrics of the predetermined conversion threshold data 2605. In such cases, if less than the predetermined threshold number of metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, there is only one metric in the storage utilization data 2606 that is compared to a corresponding metric of the predetermined conversion threshold data 2605, and the page conversion determination module generates the segment generation determination data when the metric in the storage utilization data 2606 meets or otherwise compares favorably to the corresponding metric of the predetermined conversion threshold data 2605.

As used herein, the storage utilization data 2606 compares favorably to the predetermined conversion threshold data 2605 when the conditions indicated in the predetermined conversion threshold data 2605 that dictate the conversion process be initiated are met by corresponding metrics of the storage utilization data 2606. As used herein, the storage utilization data 2606 compares unfavorably to the predetermined conversion threshold data 2605 when the conditions indicated in the predetermined conversion threshold data 2605 that dictate the conversion process be initiated are not met by corresponding metrics of the storage utilization data 2606. In some embodiments, the page conversion determination module 2610 generates the segment generation determination data indicating that segments be generated and/or otherwise indicating that the conversion process be initiated only when the storage utilization data 2606 compares favorably to the predetermined conversion threshold data 2605.

The predetermined conversion threshold data 2605 can indicate one or more conditions that trigger the conversion process such as: a total memory capacity of page storage system 2506; a threshold maximum amount and/or percentage of storage resources of the page storage system 2506 that can be utilized to store pages 2515; a threshold minimum amount and/or percentage of resources page storage system that must remain available; a threshold minimum number of pages 2515 that must be included in the set of pages for conversion; a threshold maximum number of pages 2515 that can be converted in a single conversion process; a threshold maximum and/or threshold a data size of the set of pages that can be converted in a single conversion process; a threshold minimum amount of time that storage resources of the page storage system can be expected to become fully utilized for page storage based on current and/or historical data rates of record streams 1-L; threshold requirements for health data and/or failure data of storage resources of the page storage system 2506; a threshold minimum and/or threshold maximum amount of time at which a new conversion process must commence since the last conversion process was initiated and/or was completed; and/or other information regarding the requirements and/or conditions for initiation of the conversion process.

The predetermined conversion threshold data 2605 can be received and/or configured based on user input, for example, via administrative sub-system 15 and/or via configuration sub-system 16. The predetermined conversion threshold data 2605 can alternatively or additionally be determined automatically by the record processing and storage system 2505. For example, the predetermined conversion threshold data 2605 can be determined automatically to indicate and/or be based on determining a threshold memory capacity of the page storage system 2506; based on determining a threshold amount of bytes worth of pages 2515 the page storage system 2506 can store; and/or based on determining a threshold expected and/or average amount of time that pages can be generated and stored in the page storage system 2506 by the page generator 2511 until the page storage system 2506 becomes full. Note that these thresholds can be automatically buffered to account for a threshold percentage of drive failures, a historical expected rate of drive failures, a threshold amount of additional pages data that may be stored in communication lag since the storage utilization data 2606 was sent, a threshold amount of additional pages data that may be stored in processing lag to perform some or all of the conversion process, and/or other buffering to ensure that segment generation is completed before page storage system 2506 reaches its capacity.

As another example, the predetermined conversion threshold data 2605 can be determined automatically based on determining a sufficient number of records 2422 and/or a sufficient number of pages 2515 that can achieve sufficiently favorable levels of clustering. For example, this can be based on tracking and/or measuring clustering metrics for records in previous iterations of the conversion process and/or based on analysis of the measuring clustering metrics for records in previous iterations of the process to determine and/or estimate these thresholds. The storage utilization data 2606 can also be measured and/or tracked for each of this plurality of previous conversion processes to determine average and/or estimated storage utilization metrics that rendered conversion processes with favorable levels of clustering based on the corresponding clustering metrics measured for these previous conversion processes.

The clustering metrics can be based on a total or average number and/or proportion of records in each segment that: match cluster key of at least a threshold proportion of other records in the segment, are within a threshold vector distance and/or other similarity measure from at least a threshold number of other records in the segment. The clustering metrics can alternatively or additionally be based on an average and/or total number of segments whose records have a variance and/or standard deviation of their cluster key values that compare favorably to a threshold. The clustering metrics can alternatively or additionally be determined in accordance with any other similarity metrics and/or clustering algorithms.

Once the page conversion determination module 2610 generates segment generation determination data indicating that segments be generated via the conversion process, the segment generator 2517 can initiate the process of generating stored pages into segments. This can include identifying the pages for conversion in the conversion process. For example, all pages currently stored by the page storage system 2506 and awaiting their conversion into segments 2424 at the time when segment generation determination data is generated to indicating that the conversion process commence are identified for conversion. This set of pages can constitute a conversion page set 2655, where only the set of pages identified for conversion in the conversion page set 2655 are processed by segment generator 2517 for a given conversion process. For example, the record processing and storage system 2505 may continue to receive records from data sources 2501, and rather than buffering all of these records until after this conversion process is completed, additional pages can be generated at this time for storage in page storage system 2506. However, as processing of pages into segments has already commenced, these pages may not be clustered and converted during this conversion process, and can await their conversion in the next iteration of the conversion process. As another example, the page storage system 2506 may still be storing some other pages that were previously converted into segments but were not yet deleted. These pages are similarly not included in the conversion page set 2655 because their records are already included in segments via the prior conversion.

The segment generator can implement a cluster key-based grouping module 2620 to generate a plurality of record groups 2625-1-2625-X from the plurality of records 2422 included in the conversion page set 2655. The cluster key-based grouping module 2620 can receive and/or determine a cluster key 2607, which can be automatically determined by the cluster key-based grouping module 2620, can be stored in memory, can be received from another computing device, and/or can be configured via user input. The cluster key can indicate one or more columns, such as the key column(s) of FIGS. 18-22, by which the records are to be sorted and segregated into the record groups. For example, the plurality of records 2422 included in the conversion page set 2655 are sorted and/or grouped by cluster key, where records 2422 with matching cluster keys and/or similar cluster keys are grouped together in the resulting record groups 2625-1-2625-X. The record groups 2625-1-2625-X can be a fixed size, or can be dynamic in size, for example, based on including only records that have matching and/or similar cluster keys. An example of generating the record groups 2625-1-2625-X via the cluster key-based grouping module 2620 is illustrated in FIG. 26C.

The records 2422 of each record group in the set of record groups 2625-1-2625-X generated by the cluster key-based grouping module 2620 are ultimately included in one segment 2424 of a corresponding segment group in the set of segment groups 1-X generated by the segment generator 1-X. For example, segment group 1 includes a set of segments 2424-1-2424-J that include the records 2422 from record groups 2625-1, segment group 2 includes another set of segments 2424-1-2424-J that include the records 2422 from record groups 2625-2, and so on. The identified record groups 2625-1-2625-X can be converted into segments in a same or similar fashion as discussed in conjunction with FIGS. 18-23.

The record groups are processed into segments via a columnar rotation module 2630 of the segment generator 2517. Once the plurality of record groups 2625-1-2625-X are formed, the columnar rotation module 2630 can be implemented to generate column-formatted record data 2565 for each record group 2625. For example, the records 2422 of each record group are extracted from pages 2515 as row-formatted data. In particular, the records 2422 can be received from data sources 2501 as row-formatted data and/or can be stored in pages 2515 as row-formatted data. All records 2422 in the same record group 2625 are converted into column-formatted row data 2565 in accordance with a column-based format, for example, by performing a columnar rotation of the row-formatted data of the records 2422 in the given record group 2625. The column-formatted row data 2565 generated for a given record group 2625 can be divided into a set of column-formatted row data 2565-1-2565-J, for example, where the column-formatted row data 2565 is redundancy storage error encoded by the segment generator 2517 as discussed previously, and where each column-formatted row data 2565-1-2565-J is included in a corresponding segment of a set of J segments 2424 of a segment group 2522.

The final segments can be formed from the column-formatted row data 2565 to include metadata generated via a metadata generator module 2640. The metadata generator module 2640 can be operable to generate the manifest section, statistics section, and/or the set of index sections 0-x for each segment as illustrated in FIG. 23. The metadata generator module 2640 can generate the index data 2518 for each segment 2424 by utilizing the same or different index generator 2513 of FIG. 25B, where index data 2518 generated for segments 2424 via the metadata generator module 2640 is the same as or similar to the index data 2516 generated for pages as discussed in conjunction with FIG. 25B. The column-formatted row data 2565 and its metadata generated via metadata generator module 2640 can be combined to form a final corresponding segment 2424.

Figure 26B:
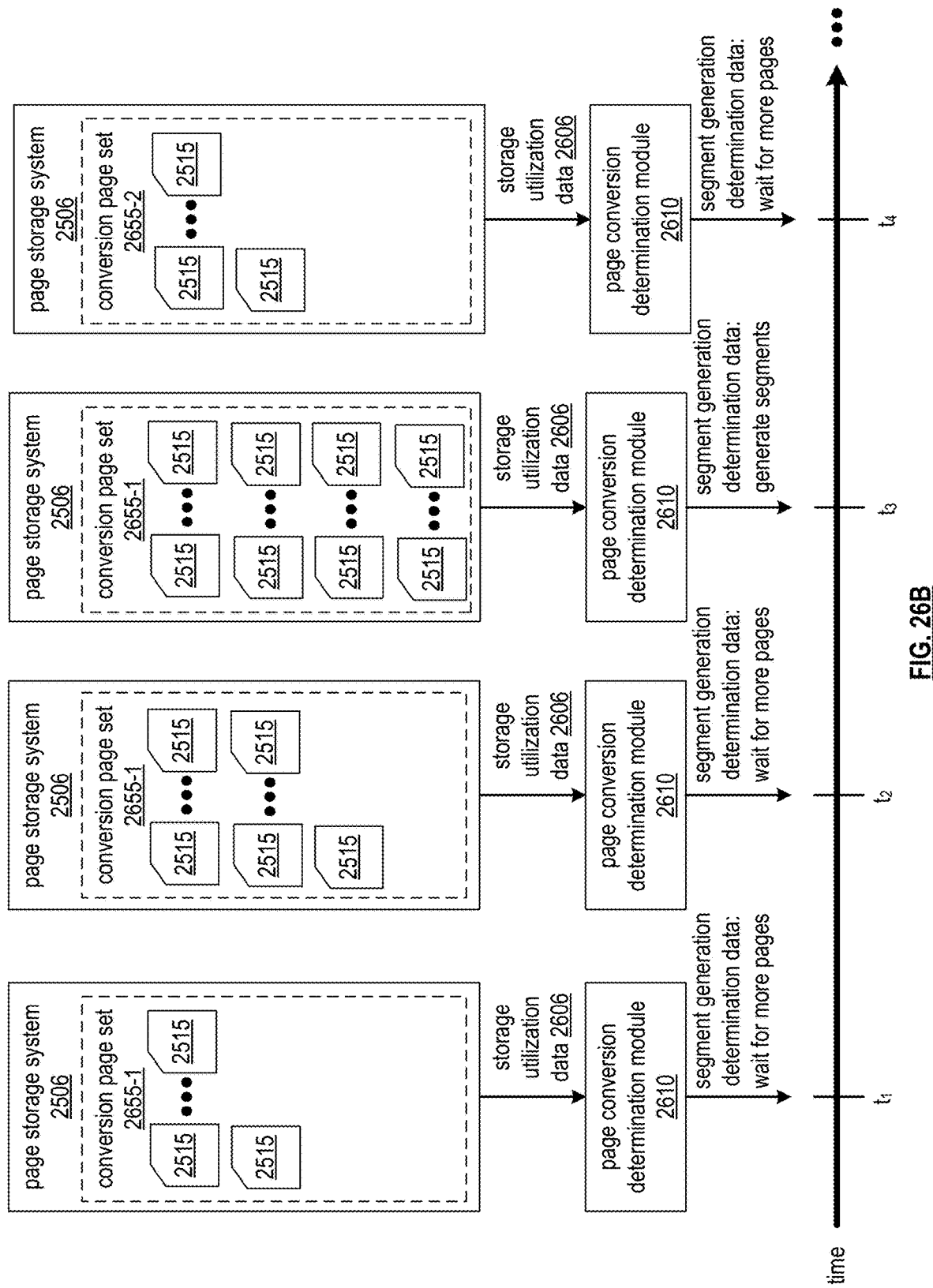
FIG. 26B is a schematic block diagram illustrating operation of a page conversion determination module over time in accordance with various embodiments of the present invention.
Figure 26C:
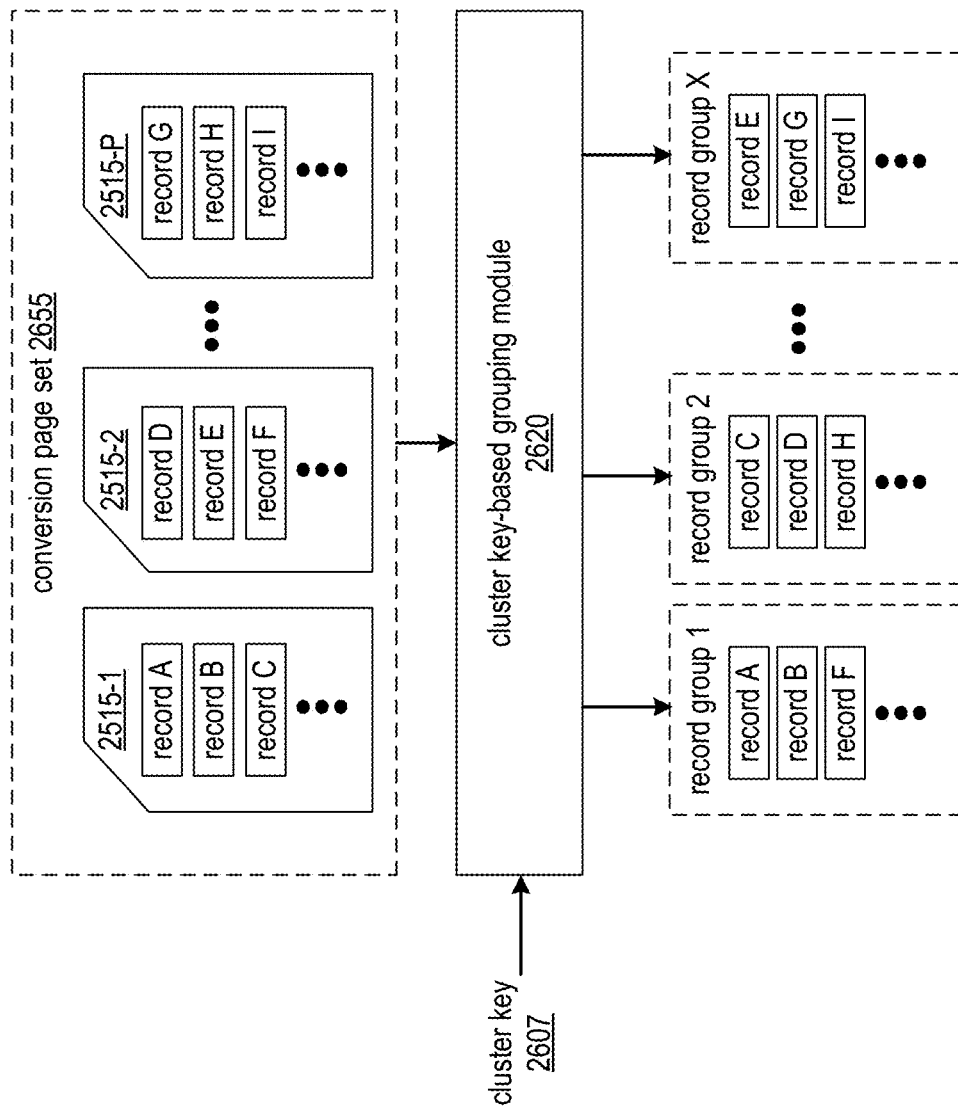
FIG. 26C is a schematic block diagram of a cluster key-based grouping module of a segment generator in accordance with various embodiments of the present invention.

FIG. 26B depicts an example timeline illustrating when the conversion process is determined to be conducted and how this process is iterated over time. The page conversion determination module 2610, and/or the determinations to delay conversion versus initiate conversion over time as illustrated in FIG. 26B, can be utilized to implement the segment generator 2517 of FIG. 26A and/or any other embodiment of the segment generator 2517 discussed herein.

First, a first conversion page set 2655-1 accumulates pages 2515 over time until the page conversion determination module 2610 determines a conversion page set 2655-1 is ready for conversion. At time $t_1$, the conversion page set 2655-1 includes a small number of pages 2515, where the storage resources of page storage system 2506 are not yet fully utilized. This small number of pages relative to the page storage capacity of page storage system 2506 renders the storage utilization data 2606 at time $t_1$ to compare unfavorably to the predetermined conversion threshold data. The segment generation determination data generated by the page conversion determination module 2610 at time $t_1$ therefore delays the conversion process, indicating to wait for more pages 2515 rather than generating segments from the current conversion page set 2655-1 at time $t_1$.

At time $t_2$, more pages 2515 have been accumulated since time $t_1$ based on additional pages having been generated by the page generator 2511 from incoming records of one or more record streams. However, the storage resources of page storage system 2506 are still not yet fully utilized at this time, causing the storage utilization data 2606 at time $t_2$ to again compare unfavorably to the predetermined conversion threshold data. The segment generation determination data generated by the page conversion determination module 2610 at time $t_2$ again delays the conversion process, indicating to wait for more pages 2515 rather than generating segments from the current conversion page set 2655-1 at time $t_2$.

At time $t_3$, even more pages 2515 have been accumulated since time $t_2$, and storage resources of page storage system 2506 are fully utilized and/or sufficiently utilized as dictated by the predetermined conversion threshold data. Thus, enough pages have been accumulated to cause storage utilization data 2606 at time $t_3$ to compare favorably to the predetermined conversion threshold data. The segment generation determination data generated by the page conversion determination module 2610 at time $t_3$ initiates the conversion process by indicating that segments be generated from the current conversion page set 2655-1 at time $t_3$.

After time $t_3$, the pages of the conversion page set 2655-1 can be flushed to other storage and/or can be removed from page storage system 2506. For example, once the segments are successfully generated from conversion page set 2655-1, the pages of conversion page set 2655-1 are deleted from page storage system 2506. The storage utilization data 2606 can indicate that more pages be accumulated for the next conversion page set 2655-2, for example, due to the storage resources of page storage system 2506 again becoming available for storing new pages once the pages of conversion page set 2655-1 are removed.

At time $t_4$, after some or all of the pages of conversion page set 2655-1 have been removed from storage by page storage system 2506, new pages have been generated and stored in page storage system 2506 for conversion in the next conversion page set 2655-2. For example, the next conversion page set 2655-2 can include some pages that were generated while the conversion process of conversion page set 2655-2 was in progress and/or while the resulting segments were being stored into segment storage system 2508. At this time, the storage resources of page storage system 2506 are not yet fully utilized at this time, causing the storage utilization data 2606 at time $t_4$ to compare unfavorably to the predetermined conversion threshold data.

At some later time after $t_4$, enough pages are accumulated in this next conversion page set 2655-2 to cause the storage utilization data 2606 at time $t_4$ to compare favorably to the predetermined conversion threshold data and to initiate another conversion process of converting the conversion page set 2655-2 into segments. This process can continue accumulating and converting subsequent conversion page sets 2655 over time.

Note that the predetermined conversion threshold data can change over time, for example, based on different user configurations, based on changes to storage capacity of the page storage system 2506, based on adding or removal of memory devices of page storage system 2506, based on failures of page storage system 2506, based on trends in clustering levels that can be attained by different numbers of pages at different times, based on changes in amount of different data stored by the resources of the page storage system 2506, based on resource assignment changes in the record processing and storage system 2505, and/or based on other determinations made over time causing the predetermined conversion threshold data to be adjusted accordingly. For example, the predetermined conversion threshold data that triggers initiation of the conversion process for conversion page set 2655-1 at time $t_3$ can be the same as or different from the predetermined conversion threshold data that eventually triggers initiation of the conversion process for conversion page set 2655-2 at some later time after $t_4$.

FIG. 26C illustrates an example embodiment of a cluster key-based grouping module 2620 implemented by segment generator 2517. This example serves to illustrate that the grouping of sets of records in pages does not necessarily correlate with the sets of records in the record groups generated by the cluster key-based grouping module 2620. In particular, in embodiments where the pages can be generated directly from sets of incoming records as they arrive without any initial clustering, the grouping of sets of records in pages may have no bearing on the record groups generated by the cluster key-based grouping module 2620 due to the timestamp and/or receipt time of various records not necessarily having a correlation with cluster key. The embodiment of cluster key-based grouping module 2620 of FIG. 26C can be utilized to implement the segment generator 2517 of FIG. 26A and/or any other embodiment of the segment generator 2517 discussed herein.

In this example, a plurality of P pages 2515-1-2515-P of conversion page set 2655 include records received from one or more sources over time up until the page conversion determination module 2610 dictated that conversion of this conversion page set 2655 commence. The plurality of records in pages 2515-1-2515-P can be considered an unordered set of pages to be clustered into record groups. Regardless of which pages these records may belong to, records are grouped into their record groups in accordance with cluster key. In this example, records of page 2515-1 are dispersed across at least record groups 1 and 2; records of page 2515-2 are dispersed across at least record groups 1, 2, and X, and records of page 2515-P are dispersed across at least record groups 2 and X.

The value of X can be: predetermined prior to clustering, can be the same or different for different conversion page sets 2655; can be determined based on a predetermined minimum and/or maximum number of records that are included per record group; can be determined based on a predetermined minimum and/or maximum data size per record group; can be determined based on each record group having a predetermined level of clustering, for example, in accordance with at least one clustering metric, and/or can be determined based on other information. In some cases, different record groups of the set of record groups 1-X can include different numbers of records, for example, based on maximizing a clustering metric across each record group.

For example, all records with a matching cluster key, such as having one or more columns corresponding to the cluster key with matching values, can be included in a same record group. As another example, a set of records having similar cluster keys can all be included in a same record group. As another example, if the value of the cluster key can be represented as a continuous variable, numeric variable, or other variable with an inherent ordering with respect to a cluster key domain, the cluster key domain can be subdivided into a plurality of discrete intervals. In such cases, a given record group, or a given set of record groups, can include records with cluster keys having values in the same discrete interval of the cluster key domain. As another example, a record group has cluster key values that are within a predefined distance from, or otherwise compare favorably to, an average cluster key value of cluster keys within the record group. In such cases, a Euclidian distance metric, another vector distance metric, and/or any other similarity and/or distance metric can be utilized to measure distance between cluster key values of the record group. In some cases, a clustering algorithm and/or an unsupervised machine learning model can be utilized to form record groups 1-X.

In various embodiments, a record processing and storage system includes at least one processor and memory. The memory stores operational instructions that, when executed by the at least one processor, cause the record processing and storage system to receive a plurality of records and generate plurality of pages that include the plurality of records in accordance with a row-based format. The execution of the operational instructions further causes the record processing and storage system to store the plurality of pages via a page storage system. The execution of the operational instructions further causes the record processing and storage system to generate segment generation determination data based on storage utilization data of the page storage system. The execution of the operational instructions further causes the record processing and storage system to generate a plurality of segments from the plurality of pages that include the plurality of records in a column-based format based on the segment generation determination data indicating segments be generated. The execution of the operational instructions further causes the record processing and storage system to store the plurality of segments via a segment storage system.

Figure 26D:
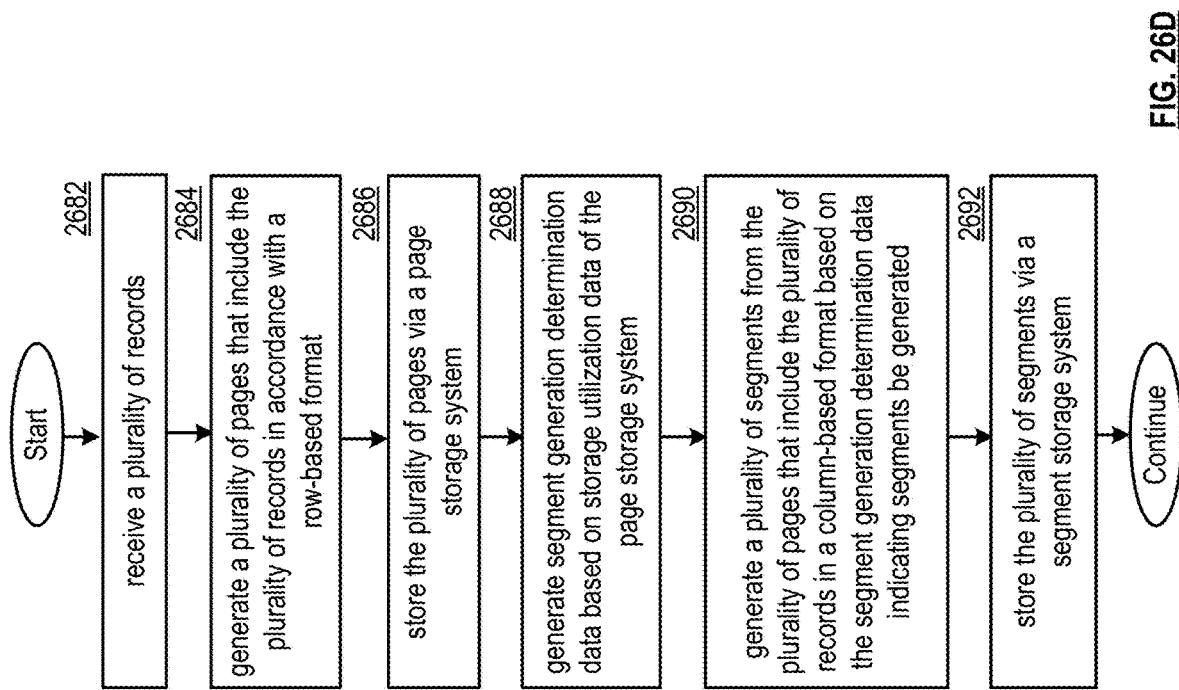
FIG. 26D is a logic diagram illustrating a method of generating segments in accordance with various embodiments of the present invention.

FIG. 26D illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26D. Some or all of the method of FIG. 26D can be performed by the page generator 2511, the page storage system 2506, the segment generator 2517, and/or the segment storage system 2508 of FIG. 25A. Some or all of the method of FIG. 26D can be performed by one or more stream loader modules 2510 of FIG. 25B, independently or in conjunction. Some or all of the method of FIG. 26D can be performed by the page conversion determination module 2610, the cluster key-based grouping module 2620, the columnar rotation module 2630, and/or the metadata generator module 2640 of FIG. 26A. Some or all of the steps of FIG. 26A can optionally be performed by any other processing module of the database system 10. Some or all of the steps of FIG. 26D can be performed to implement some or all of the functionality of the record processing and storage system 2505 of FIG. 25A and/or FIG. 25B. Some or all of the steps of FIG. 26D can be performed to implement some or all of the functionality of the segment generator 2517 of FIG. 26A. Some or all steps of FIG. 26D can be performed by database system 10 in accordance with other embodiments of the database system 10 and/or nodes 37 discussed herein.

Step 2682 includes receiving a plurality of records. For example, the plurality of records is received in one or more record streams from one or more data sources 2501. Step 2684 includes generating a plurality of pages that include the plurality of records in accordance with a row-based format. For example, step 2684 is performed by utilizing an embodiment of page generator 2511 discussed herein. In some cases, no clustering or sorting is performed, and/or the rows included in pages is based on the order in which they are received. Step 2686 includes storing the plurality of pages via a page storage system, such as page cache 2512 of one or more stream loader modules 2510 and/or page storage 2546 of one or more long term storage 2540.

Step 2688 includes generating segment generation determination data based on storage utilization data, such as storage utilization data 2606, of the page storage system. For example, the segment generation determination data is generated by the page conversion determination module 2610. Step 2690 includes generating a plurality of segments from the plurality of pages that include the plurality of records in a column-based format based on the segment generation determination data indicating segments be generated. For example, the plurality of segments is generated via the cluster key-based grouping module 2620, the columnar rotation module 2630, and/or the metadata generator module 2640. Step 2692 includes storing the plurality of segments via a segment storage system, such as segment storage 2548 of one or more long term storage 2540.

In various embodiments, the segment generation determination data indicates segments be generated based on the storage utilization data comparing favorably to predetermined conversion threshold data, such as predetermined conversion threshold data 2605. In various embodiments, the predetermined conversion threshold data indicates a threshold data size. The storage utilization data indicates a data size of the plurality of pages, and the segment generation determination data indicates segments be generated based on the data size of the plurality of pages meeting, exceeding, and/or otherwise comparing favorably to the threshold data size. In various embodiments, the predetermined conversion threshold data indicates a threshold minimum amount of available storage resources. The storage utilization data indicates an amount of available storage resources of the page storage system due to storage of the plurality of pages, and the segment generation determination data indicates segments be generated based on the amount of available storage resources meeting, falling below, and/or otherwise comparing favorably to the threshold minimum amount of available storage resources. In various embodiments, the segment generation determination data is generated based on an elapsed amount of time since a previous plurality of segments was generated from a previous plurality of pages.

In various embodiments, the method includes performing a plurality of previous record storage conversions. Each of the plurality of previous record storage conversions includes generating a previous plurality of segments from a previously generated plurality of pages. The method further includes generating record conversion tracking data based on the plurality of previous record storage conversions. The method further includes generating the predetermined conversion threshold data automatically based on the record conversion tracking data. In various embodiments, the record conversion tracking data includes each of a plurality of clustering metrics determined based on generating each previous plurality of segments from each previously generated plurality of pages, and/or or each of a plurality of previous storage utilization data determined based on generating each previous plurality of segments from each previously generated plurality of pages.

In various embodiments, the segment generation determination data is generated at a first time, and the storage utilization data corresponds to storage capacity of the page storage system at the first time. The method further includes generating other segment generation determination data at previous time prior to the first time based on previous storage utilization data corresponding to storage capacity of the page storage system at the previous time. The other segment generation determination data indicates segments not yet be generated based on the previous storage utilization data comparing unfavorably to the predetermined conversion threshold data.

In various embodiments, prior to the previous time, the method includes receiving a first subset of the plurality of records, generating a first subset of the plurality of pages to include the first subset of the plurality of records, and storing the first subset of the plurality of pages via the page storage system. The previous storage utilization data is based on a first amount of storage resources utilized to store the first subset of the plurality of pages. Prior to the first time the method can further include receiving a second subset of the plurality of records, where the second subset of the plurality of records and the first subset of the plurality of records are mutually exclusive and collectively exhaustive. A second subset of the plurality of pages is generated to include the second subset of the plurality of records. The second subset of the plurality of pages is stored via the page storage system. The storage utilization data is based on a second amount of storage resources utilized to store the first subset of the plurality of pages and the second subset of the plurality of pages.

In various embodiments, the method includes facilitating execution of a first query by reading at least one of the plurality of pages to access a set of the plurality of records during a first temporal period prior to generating a plurality of segments from the plurality of pages. The method includes facilitating execution of a second query by reading at least one of the plurality of segments to access the set of the plurality of records during a second temporal period after generating the plurality of segments from the plurality of pages. For example, the first query and second query are executed by utilizing and/or communicating with the query processing system 2502.

In various embodiments, the method further includes receiving a second plurality of records after generating the plurality of segments from the plurality of pages. A second plurality of pages that include the second plurality of records in accordance with the row-based format are generated, and the second plurality of pages are stored via the page storage system. Facilitating execution of the second query further includes reading at least one of the second plurality of pages to access at least one record of the second plurality of records, and wherein a query resultant of the query is based on the set of the plurality of records and is further based on the at least one record of the second plurality of records.

In various embodiments, the record processing and storage system includes a plurality of nodes that each include a set of memory drives. One of the plurality of nodes is included in the page storage system and stores the at least one of the second plurality of pages via its set of memory drives. The one of the plurality of nodes is further included in the segment storage system and further stores the at least one of the plurality of segments via its set of memory drives. Facilitating execution of the second query includes reading of the at least one of the second plurality of pages by the one of the plurality of nodes and further includes reading of the at least one of the plurality of segments by the one of the plurality of nodes.

In various embodiments, the plurality of records is received in a plurality of record streams generated by a corresponding plurality of data sources, and at least one of the plurality of pages is generated to include records from different ones of the record streams. In various embodiments, the plurality of records is received as formatted row data, and the plurality of pages are generated to include plurality of records in accordance with the formatted row data. In various embodiments, the method includes removing the plurality of pages from storage via the page storage system based on the storage of the plurality of segments via the segment storage system.

In various embodiments, generating a plurality of segments from the plurality of pages includes segregating the plurality of records into a plurality of record groups in accordance with a cluster key of the plurality of records, generating a set of column-formatted row data for each of the plurality of record groups, and generating segment metadata for each column-formatted row data. Generating the plurality of segments from the plurality of pages further includes generating plurality of segment groups that includes the plurality of segments. Each segment group includes a set of segments generated from a corresponding set of column-formatted row data, and each segment in a segment group includes one column-formatted row data from the corresponding set of column-formatted row data and further includes segment metadata generated for the one column-formatted row data.

In various embodiments a first plurality of sets of records of the plurality of records are each included in a corresponding one of the plurality of pages. The first plurality of sets of records are mutually exclusive and collectively exhaustive with respect to the plurality of records. A second plurality of sets of records of the plurality of records are each included in a corresponding one of the plurality of segments. The second plurality of sets of records are mutually exclusive and collectively exhaustive with respect to the plurality of records of records.

In various embodiments, a first page of the plurality of pages includes a first record and a second record, and a second page of the plurality of pages includes a third record and a fourth record. A first segment of the plurality of segments includes the first record and the third record, and a second segment of the plurality of segments includes the second record and the fourth record.

In various embodiments, a non-transitory computer readable storage medium includes at least one memory section that stores operational instructions that, when executed by a processing module that includes a processor and a memory, cause the processing module to: receive a plurality of records; generate a plurality of pages that include the plurality of records in accordance with a row-based format; store the plurality of pages via a page storage system; generate segment generation determination data based on storage utilization data of the page storage system; generate a plurality of segments from the plurality of pages that include the plurality of records in a column-based format based on the segment generation determination data indicating segments be generated; and store the plurality of segments via a segment storage system.

FIGS. 27A-27D illustrate embodiments of a record processing and storage system 2505 that stores pages 2515 in accordance with a row-based format that accounts for variable-length fields of its rows. The record processing and storage system 2505 discussed in conjunction with FIGS. 27A-27D can be utilized to implement the record processing and storage system 2505 of FIG. 25A and/or any of the embodiments of the record processing and storage system 2505 discussed herein.

As discussed previously in conjunction with FIGS. 25A-26D, data movement for bytes received from the data sources 2501 is ideally minimized for performance and efficiency reasons. To further reduce processing of incoming records in generating pages 2515, data sources can be required to send their records a format that closely matches how the records be stored in pages 2515. In particular, as row traversals are more easily executed on fixed-size rows to reduce the complexity of advancing row by row and/or jumping to a particular row, the pages 2515 ideally store rows as fixed-length row data. However, as incoming rows can include one or more fields with variable-length data types, such as variable-length strings, the formatted row data in pages must account for this variable-length data while maintaining traversal across rows in a fixed-length fashion.

FIGS. 27A-27D present a solution to this problem via receipt and storage of formatted row data 2710 that has a fixed length section and a variable length section. In the fixed length section, aligned with where the variable length field values for each row would be included, a fixed-length offset value into the associated variable length section, such as a 32 bit offset, is instead included. In particular, the variable-length data of several rows can be separated entirely from the fixed-length data of these rows in the formatted row data 2710. On offset value indicating the location of a given row's variable-length data can be included as an additional fixed-length field within the fixed-length data for the row in the formatted row data 2710. Storing pages as this formatted row data 2710 enables easy traversals between rows, even when the rows include variable-length data, as traversal requires simple multiplication or addition as a function of fixed row length and/or fixed field length.

This improves the technology of database systems by increasing efficiency of row reads for rows stored in pages. This increased efficiency of row reads further enables the improvements to the technology of database systems presented the delay of the conversion process discussed in FIGS. 26A-26D, as simpler row reads for rows in pages enables query execution upon rows pending conversion into segments to be performed efficiently. This increased efficiency of row reads also improves the efficiency of the conversion process itself, as rows can more easily be accessed and clustered into record groups for conversion into segment groups by segment generator 2517 via these more efficient reads of the rows.

Furthermore, rather than requiring that incoming rows be reformatted in this manner after being received from a source, data sources can be required to pre-format their batches of rows as formatted row data 2710. The record processing and storage system 2505 can receive the record streams 1-L as from data sources 1-L as batches of formatted row data 2710 in accordance with the formatting discussed above, and can utilize page generator 2511 to place this formatted row data 2710 directly into pages 2515. Receiving the row data from data sources as the formatted row data 2710 to be included in pages 2515 improvements to the technology of database systems by reducing the processing and data movement required to generate pages from incoming records, enabling resources to be preserved for other functionality of the record processing and storage system 2505 and/or enabling higher data rates of incoming records to be received and processed for storage.

Figure 27A:
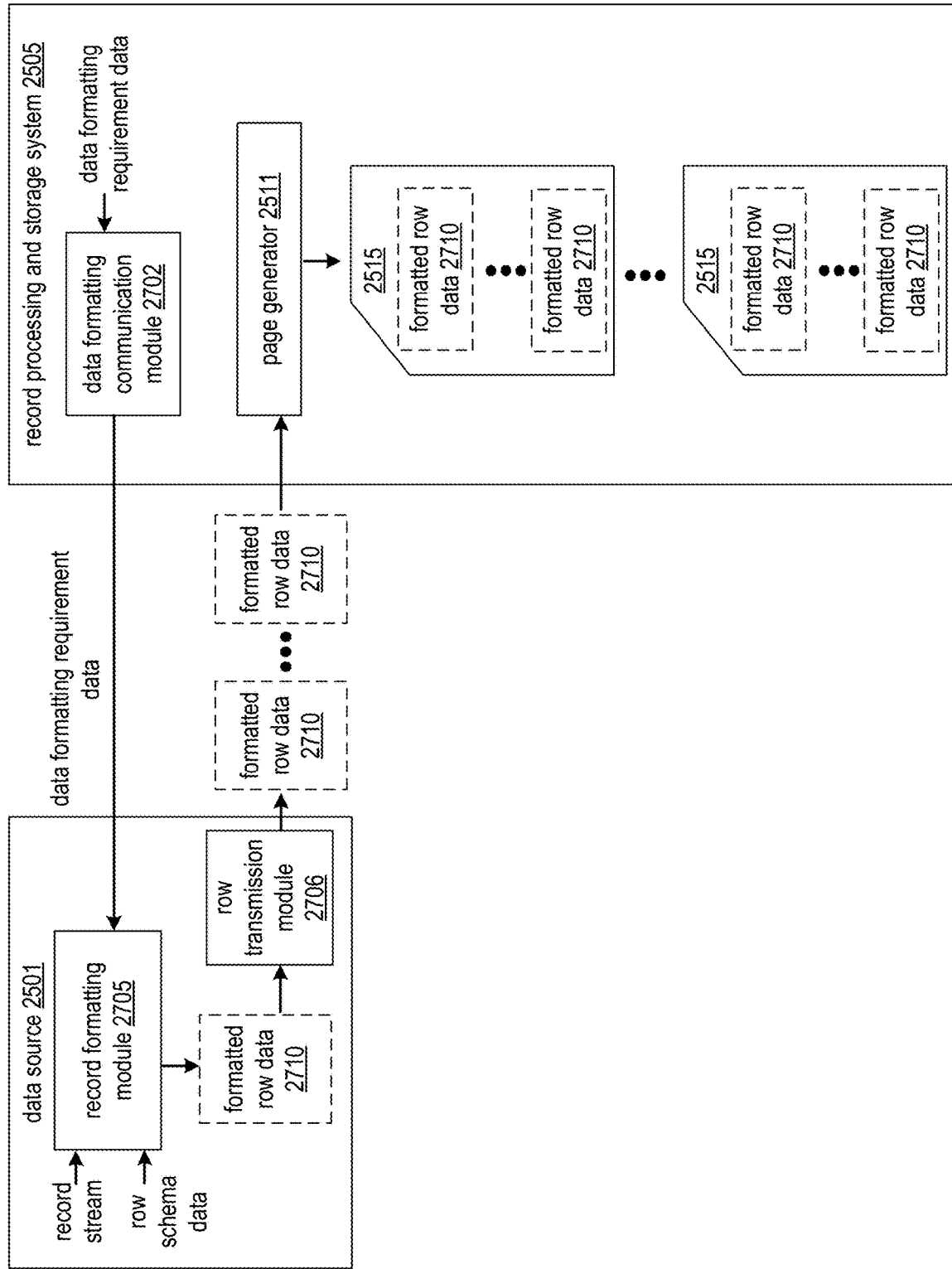
FIG. 27A is a schematic block diagram illustrating a record processing and storage system that receives formatted row data from a data source in accordance with various embodiments of the present invention.

FIG. 27A illustrates an embodiment of such a record processing and storage system 2505 that receives records from a particular sources as a stream of formatted row data 2710 received over time. The formatted row data 2710 can be utilized to implement the row data 2910 of FIG. 25C and/or can include the row data 2910 of FIG. 25C in accordance with a particular format. Each formatted row data 2710 can include a plurality of records 2422 in accordance with this particular format. An embodiment of the particular format of formatted row data 2710 is discussed in further detail in conjunction with FIG. 27B.

The page generator 2511 can receive formatted row data 2710 from one or more data sources 2501, and can generate a given page 2515 directly from one or more formatted row data 2710 received from one or more data sources 2501. For example, the page generator 2511 can generate pages to include formatted row data 2710 as discussed in conjunction with FIG. 25C. In some cases, the formatted row data 2710 received from data sources 2501 is unaltered and/or is only slightly modified for its inclusion in a given page 2515.

To ensure incoming record streams are received as formatted row data 2710, the record processing and storage system 2505 can optionally implement a data formatting communication module 2702. The data formatting communication module 2702 can determine and send data formatting requirement data to one or more data sources 2501 that send record streams to the record processing and storage system 2505. The data formatting requirement data can indicate rules and/or instructions regarding how to generate the formatted row data 2710 from given records. The data formatting requirement data can be determined by the data formatting communication module 2702 via user input, via configuration of the database system 10, via retrieval from memory, and/or via another determination.

One or more data sources 2501 can implement a record formatting module 2705 to generate formatted row data 2710 from a corresponding record stream to be sent to the record processing and storage system 2505 based on the data formatting requirement data. For example, the record formatting module 2705 utilizes the data formatting requirement data received from the record processing and storage system 2505 as illustrated in FIG. 27A. In some cases, the data formatting requirement data can include application data corresponding to the record formatting module 2705 for download and/or installation by one or more data sources 2501. When the application data is executed by at least one processing module of a data source 2501, it can cause the data source 2501 to implement some or all of the functionality of the record formatting module 2705 described herein. Alternatively, the data sources 2501 can otherwise receive and/or determine the data formatting requirement data via other communication with the database system 10, via downloading the data formatting requirement data from a server associated with the database system 10, via accessing the data formatting requirement data from its own memory and/or from other memory, and/or via another determination.

The record formatting module 2705 can optionally generate formatted row data 2710 further based on row schema data that indicates the schema of the records in its record stream. The row schema data can indicate a set and/or ordering of fields of each record, for example, in accordance with a plurality of columns of a corresponding relational database table. The row schema data can indicate a data type and/or data length of each field. The row schema data can indicate whether each field includes fixed-length data and/or variable-length data.

The data source can generate formatted row data 2710 over time from sets of rows in the record stream in accordance with the data formatting requirement data and/or the row schema data. As formatted row data 2710 is generated, it can be transmitted by the data source to the record processing and storage system 2505 for storage via a row transmission module 2706 of the data source 2501. The row transmission module 2706 can be implemented as a communication interface and/or transmitter operable to send the formatted row data, for example, one at a time, to the record processing and storage system 2505 via a wired and/or wireless communication network.

Figure 27B:
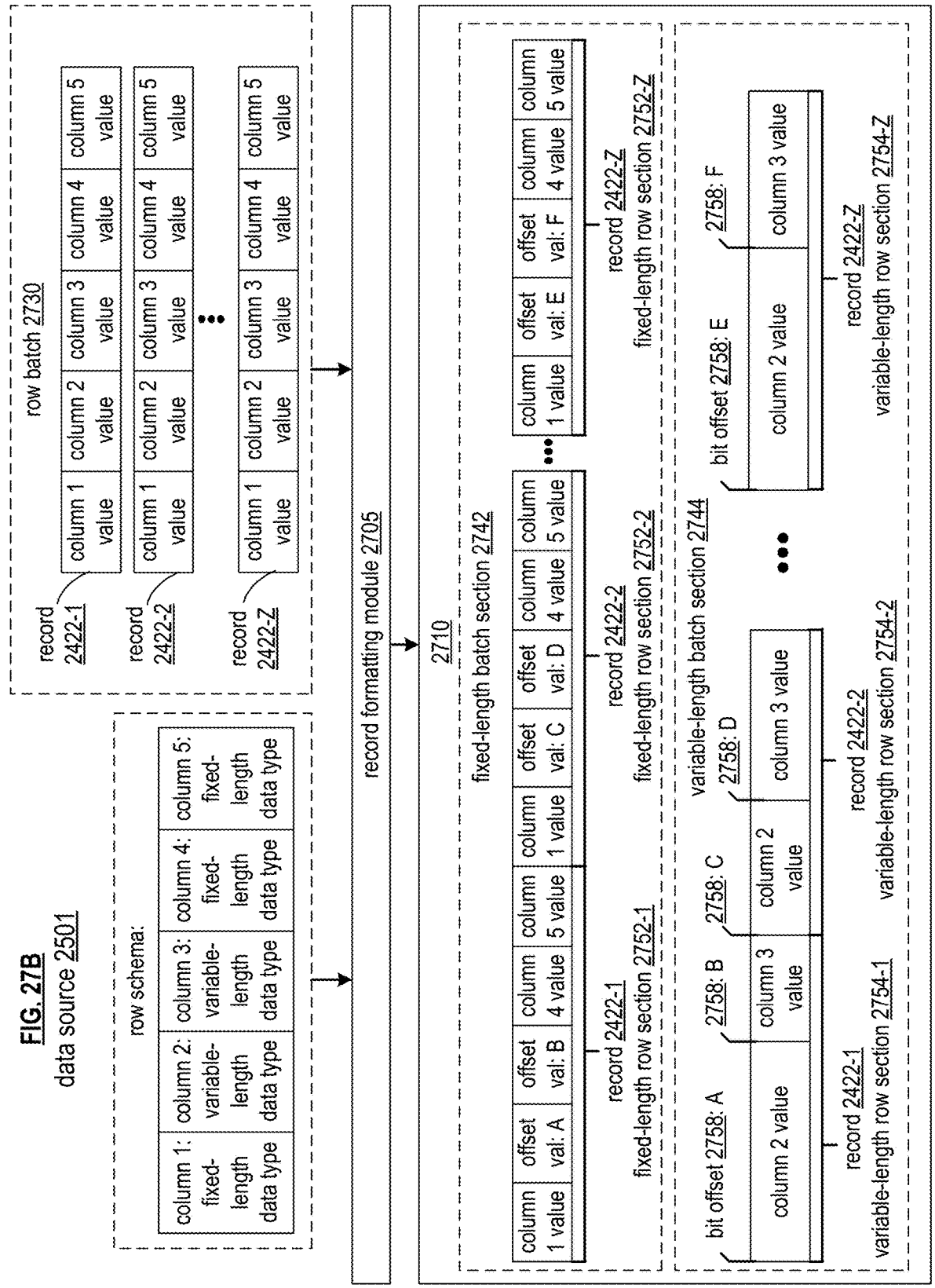
FIG. 27B is a schematic block diagram illustrating a record formatting module of a data source in accordance with various embodiments of the present invention.

FIG. 27B illustrates an example embodiment of generating formatted row data 2710 via record formatting module 2705 from a given set of rows of the record stream based on data formatting requirement data and/or the row schema data. The record formatting module 2705 and formatted row data 2710 of FIG. 27B can be utilized to implement the record formatting module 2705 and formatted row data 2710 of FIG. 27A, and/or to implement any embodiments of the record formatting module 2705 and/or formatted row data 2710 discussed herein.

As illustrated in FIG. 27B, a given set of records 2422-1-2422-Z to be included in a particular formatted row data 2710 generated by the record formatting module 2705 can be included in a row batch 2730. For example, the row batch 2730 is a set of sequential records of the record stream. In some cases, different formatted row data 2710 can include a same number or different number of rows. In some cases, all row batches utilized to generate all formatted row data 2710 include the same number of records.

In this example, as indicated by the row schema illustrated in FIG. 27B, each record 2422 includes five fields, corresponding to five columns of a database table. Column 1 is of a particular fixed-length data type, column 2 is of a particular variable-length data type, column 3 is of a particular variable-length data type, column 4 is of a particular fixed-length data type, and column 5 is of a particular variable-length data type. Note that because column 2 and column 3 have variable length values, the records 2422-1-2422-Z can have varying lengths. Note that other embodiments can have any row schema with any number of columns that include any combination of fixed-length and variable-length data types.

The record formatting module 2705 generates formatted row data 2710 from the row batch 2730 to include a fixed-length batch section 2742 and a variable-length batch section 2744. The fixed-length batch section 2742 can be separate from the variable-length batch section 2744. For example, the entire variable-length batch section 2744 can be appended and/or concatenated after the entire fixed-length batch section 2742 in the formatted row data 2710.

The fixed-length batch section includes a plurality of fixed-length row sections 2752-1-2752-Z, where each fixed-length row section 2752 corresponds to one of the records 2422 of the row batch 2730. The fixed-length row sections 2752-1-2752-Z can be appended and/or concatenated, for example, one at a time in the fixed-length batch section 2742. The variable-length batch section 2744 can include a plurality of variable-length row sections 2754-1-2754-Z, where each variable-length row section 2754 corresponds to one of the records 2422 of the row batch 2730. The variable-length row sections 2754-1-2754-Z can be appended and/or concatenated, for example, one at a time in the variable-length batch section 2744.

Each fixed-length row sections 2752 can include fixed-length values for each of the set of columns of the record, in accordance with row schema. The original values of a given record 2422's columns with fixed-length data are included in the corresponding fixed-length row section 2752. However, rather than including original values of a record 2422's columns with variable-length data, fixed-length offset values are instead generated and included in the in the corresponding fixed-length row section 2752. Note that different fixed-length data values of different fixed-length fields of a given record can have the same or different fixed-lengths. However, a given fixed-length field has corresponding data values of the same, known length in any record 2422. Therefore, the data length of each fixed-length row section 2752-1-2752-Z is identical and known, despite the corresponding records 2422-1-2422-Z having different data lengths due to also having variable-length variables.

Each of the variable-length row sections 2754 store the original values of any variable-length columns the corresponding record 2422. Note that because the variable-length row sections 2754-1-2754-Z can be of differing, unknown lengths due to including the variable-length values of variable length fields of the records 2422 in row batch 2730 that may have different lengths for different records.

The fixed-length offset value for a given column of a fixed-length row section 2752 of a given record 2422 can indicate a location of the corresponding, original value of the given column in the variable-length batch section 2744. As depicted in FIG. 27B, fixed-length offset value for a particular column in fixed-length row section 2752 for a given record 2422 includes the value of a corresponding bit offset 2758 of the original value for the particular column for the given record 2422. Each offset values can indicate and/or be implemented as a bit offset, a pointer value, other fixed-length information indicating the location of the original value of the corresponding column of the corresponding record 2422 in the variable-length batch section 2744. For example, the variable-length batch section 2744 can be generated first from the variable-length fields of the records 2422 in row batch 2730, and each offset values can be tracked as a corresponding original value is appended to the variable-length batch section 2744. These offset values are then utilized to populate the corresponding fixed-length value of the corresponding columns for each corresponding fixed-length row section 2752.

In this example, fixed-length values are included in each fixed-length row section 2752 for each of the five columns of the rows of row batch 2730. The original values of columns 1, 2, and 5 of a given record 2422 are included in the corresponding fixed-length row section 2752 because they are fixed-length data types. Fixed-length offset values are generated and included for columns 2 and 3, for example, serving as fixed-length placeholders for the original values of columns 2 and 3 and further indicating the locations of the original values columns 2 and 3 in the variable-length batch section 2744. The original values of columns 2 and 3 of a given record 2422 are thus included in the corresponding variable-length row section 2754. As illustrated, the fixed-length batch section includes: a fixed-length offset value of A for column 2 of record 2422-1; a fixed-length offset value of B for column 3 of record 2422-1; a fixed-length offset value of C for column 2 of record 2422-2; a fixed-length offset value of D for column 3 of record 2422-2; a fixed-length offset value of E for column 2 of record 2422-Z, and a fixed-length offset value of F for column 2 of record 2422-Z. These fixed-length offset values A, B, C, D, E, and F are the values of corresponding bit offsets 2758 to the location of the respective original values in the variable length batch section 2744.

The offset values A, B, C, D, E, and F of FIG. 27B are strictly increasing in value, at varying distances apart. In some cases, the offset values denote bit offsets with respect the entire formatted row data 2710, where offset value A is a non-zero bit offset to the start of the variable-length batch section 2744 within the formatted row data 2710. In some cases, as the start of the variable-length batch section 2744 is deterministic, for example, based on the number of rows Z and based on the fixed-length of each value for each column stored in fixed-length row section 2752, the offset values instead can denote bit offsets with respect to only variable-length batch section 2744, for example, where value of offset value A is zero. In some cases, the offset values can alternatively or additionally indicate a length of the original data and/or can otherwise denoting both the start and the end of the original data in the variable-length batch section 2744.

The record formatting module 2705 is implemented by a data source 2501 for generating formatted row data 2710 that is transmitted to the record processing and storage system 2505 in some embodiments, as depicted in FIG. 27A. In other embodiments, the record formatting module 2705 of FIG. 27B can be implemented by the record processing and storage system 2505. For example, the record processing and storage system 2505 can receive row data 2910 from one or more data sources 2501 in accordance with a different format, and the page generator 2511 can implement its own record formatting module 2705 to first generate the formatted row data 2710 from the incoming row data 2910. The page generator 2511 can then generate pages 2515 to include this formatted row data 2710 as discussed previously.

Figure 27C:
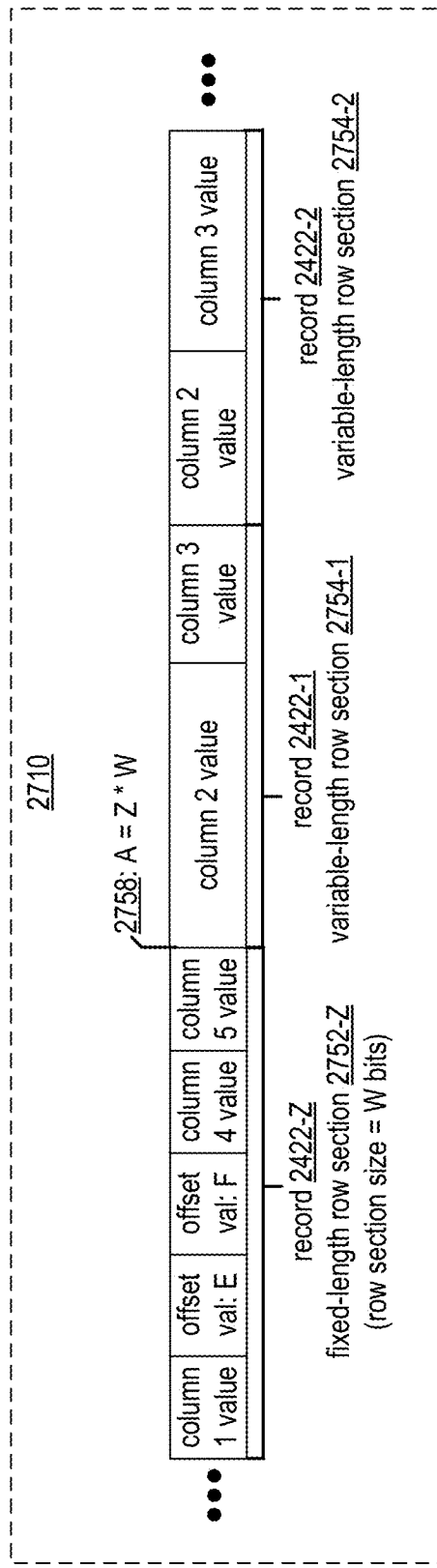
FIG. 27C is a schematic block diagram illustrating an embodiment of formatted row data in accordance with various embodiments of the present invention.

FIG. 27C illustrates how the entire variable-length batch section 2744 can be appended after the entire fixed-length batch section 2742 in the formatted row data 2710. In particular, the first variable-length row section 2754-1 can be appended after the last fixed-length row section 2752-Z. As illustrated, the first offset value A, denoting the location of the first variable-length value for a first record 2422 in the variable-length batch section 2744, can denote the start of the variable-length batch section 2744, and can be stored in the corresponding fixed-length row section 2752 for the corresponding record 2422 in the fixed-length batch section 2742. In cases where the offset values denote offsets with respect to the entire formatted row data 2710, the value of A is equal to or based on product of a row section size W, denoting the length of each fixed-length row section 2752, and the total number of records Z. Each next subsequent offset value is based on the length of each prior original value, for example, where B is equal to or based on the sum of A and the length of the original value of column 2 of record 2422-1, where C is equal to or based on the sum of B and the length of the original value of column 3 of record 2422-1, and so on.

Figure 27D:
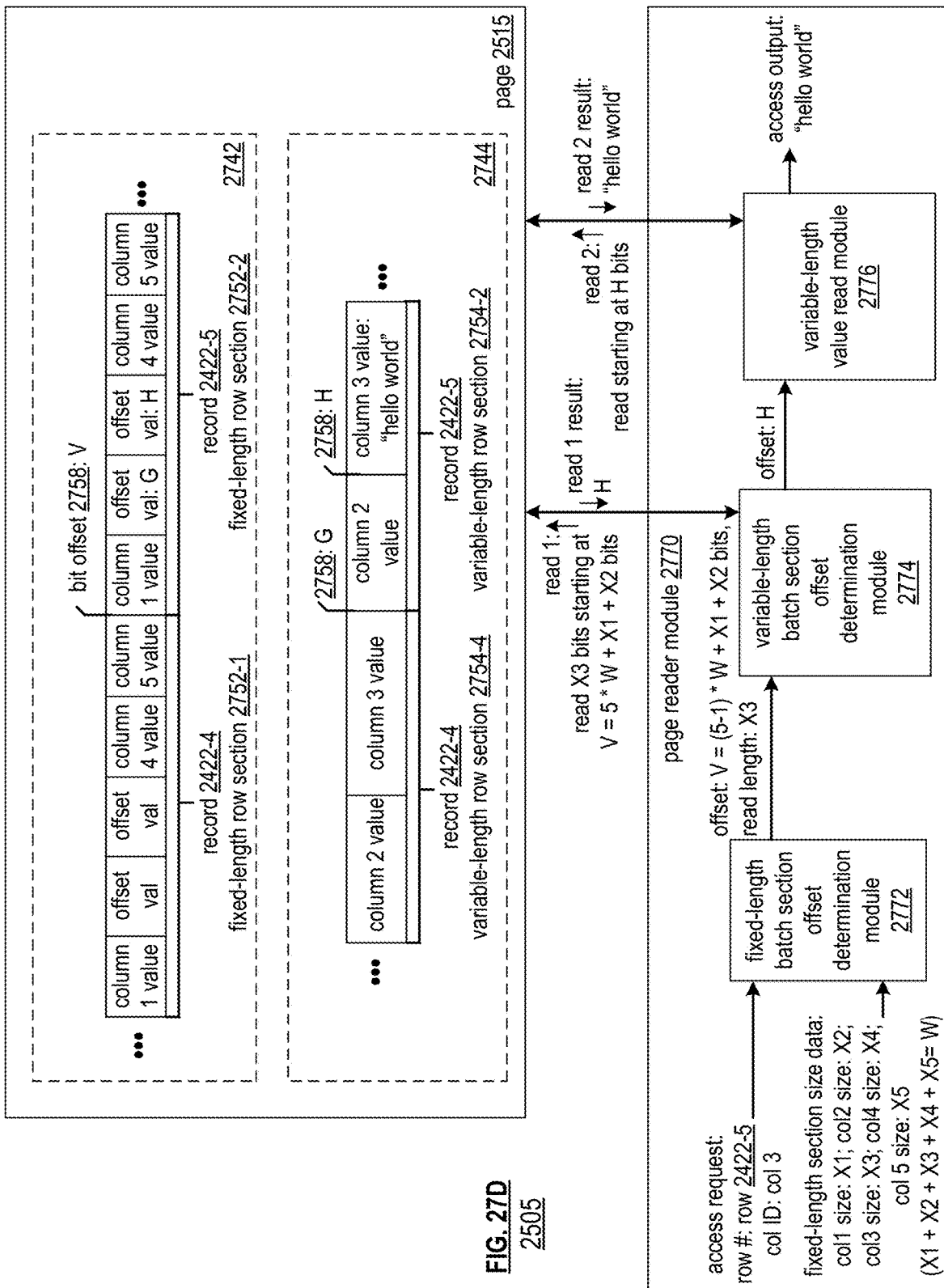
FIG. 27D is a schematic block diagram illustrating an embodiment of a record processing and storage system that implements a page reader module in accordance with various embodiments of the present invention.

FIG. 27D illustrates an embodiment of a record processing and storage system 2505 that implements a page reader module 2770. The page reader module 2770 can be implemented to leverage the known length of fixed-length row sections 2752 to iterate over and/or jump to particular fixed-length row sections 2752. This enables page reader module 2770 to easily read one or more original column values of any given records.

The page reader module 2770 can be implemented to enable any reading of records and/or particular record fields as necessary by the database system. For example, the page reader module 2770 can be implemented when pages are read for query executions by query processing system 2502, such as by a particular node accessing its page storage 2546 in conjunction with its execution of a query at IO level 2416 as illustrated in FIG. 25E. As another example, the page reader module 2770 can be implemented when pages are read by cluster key-based grouping module 2620 to generate record groups during the conversion process performed by segment generator 2517 as illustrated in FIG. 26A.

The original values of a fixed-length field of a given record is read directly from the fixed-length row section 2752 of the given record. The original values of a variable-length field of a given record is read by first reading the offset value stored as a fixed-length placeholder for the variable-length field in the fixed-length row section 2752 of the given record, and by second reading the original value of the variable-length field from the variable-length section, starting from the offset value read from the fixed-length row section 2752 of the given record.

In the example illustrated in FIG. 27D, the page reader module 2770 determines to access column 3 of a particular record 2422-5 in the formatted row data 2710 of the given page 2515. This can be determined based on receiving an access request denoting the row number, such as a number in accordance with the ordering of rows, and/or denoting the column identifier for the column to be read.

The page reader module 2770 can further determine fixed-length section size data denoting the size of each column. In this example, the sizes of the columns 1-5 in each fixed-length row data are X1, X2, X3, X4, and X5, respectively. The total length of each fixed-length row data is equal to a value W, which is equal to or based on the sum of these fixed-length column sizes X1, X2, X3, X4, and X5. In some cases, this is determined based on receiving and/or determining the row schema data of FIG. 26C from a corresponding data source 2501, based on known length of offset values stored in fixed-length row data in accordance with the data formatting requirement data, and/or based on other predetermined information.

A fixed-length batch section offset determination module 2772 can determine the location of the requested column in the fixed-length batch section 2742 based on the requested row number and column identifier, and/or further based on the determine fixed-length section size data. In this example, the fixed-length batch section offset determination module 2772 determines to read from a bit offset 2758 with value V, where V is equal to or based on computing (5-1)*W+X1+X2. In particular, (5-1)*W jumps to the beginning of the fifth row's fixed-length row section 2572-5 in the fixed-length batch section 2472, and further adding X1+X2 jumps to the third column value of the fixed-length row section 2572-5. A read length of X3 can be utilized to read only the fixed-length value of column 3 of fixed-length row section 2572-5 based on the known length of column 3's placeholder offset value.

These read parameters determined by fixed-length batch section offset determination module 2772 can be utilized by a variable-length batch section offset determination module 2774 performed as a first read to the page 2515, denoted read 1. In this example, the offset value stored for column 3 of fixed-length row section 2572-5 is the value H, and thus read 1 returns the value H based on reading the data starting at bit offset V for length X3. In cases where the value being read corresponds to a fixed-length field, the read by page reader module 2770 can end here, as the corresponding reads to column values of particular fixed-length row section 2752 renders the original value for fixed-length fields of the corresponding record. However, as this example illustrates reading the value of a variable-length field, the page reader module 2770 must next read the original value from the variable-length batch section 2744.

In particular, a variable-length value read module 2776 can utilize the offset value read in read 1 to facilitate a second read, denoted read 2, to the page 2515. In this example, the variable-length data type of column 3 is a variable-length string, and the particular string value for column 3 of record 2422-5 is "hello world." The value "hello world" is thus returned by performing read 2 based on reading the data starting at bit offset H. In some cases, the read length of read 2 is determined based on reading the value H in read 1, where the offset values in the fixed-length row section 2752 include read length data in addition to the bit offset value. In other cases, the variable-length row section can include header data or other known data pattern indicating the start and/or end of a given value to segregate the given values and denote ends to reads of given values, where read 2 is ended once reaching the known data pattern denoting the start of the next value. The read length can otherwise be determined from the bit offset value read from the fixed-length row section 2752 and/or from other information included in formatted row data 2710. The value "hello world" returned by read 2 can be utilized as access output of the requested read of column 3 of record 2422-5.

Figure 27E:
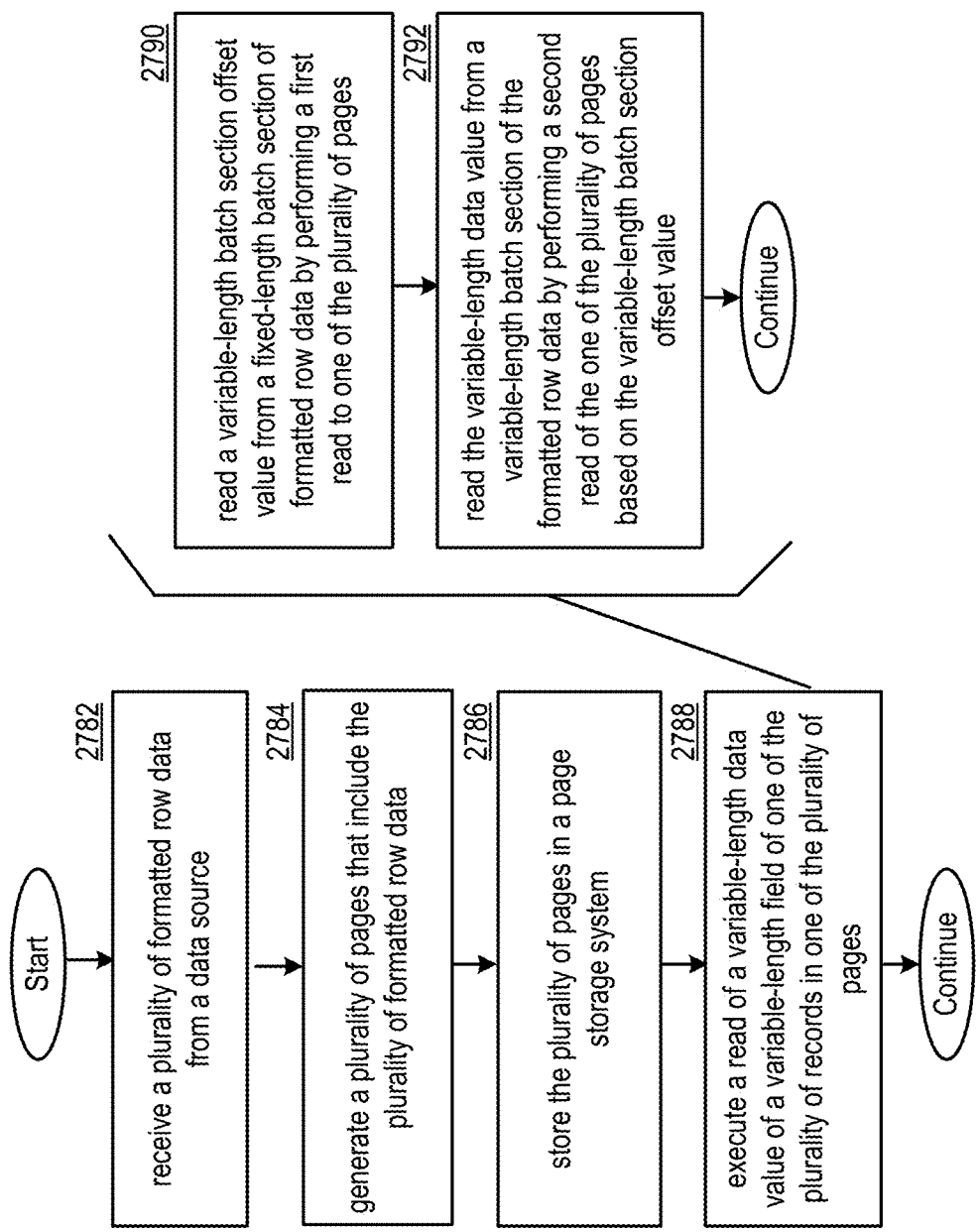
FIG. 27E is a logic diagram illustrating a method of reading records from pages with formatted row data in accordance with various embodiments of the present invention.

FIG. 27E illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27E. Some or all of the method of FIG. 27E can be performed by the page generator 2511 and/or the page storage system 2506 of FIG. 25A. Some or all of the method of FIG. 27E can be performed by one or more stream loader modules 2510 of FIG. 25B, independently or in conjunction. Some or all of the method of FIG. 27E can be performed by the page reader module 2770, for example, by applying the fixed-length batch section offset determination module 2772, by applying the variable-length batch section offset determination module 2774, and/or by applying the variable-length value read module 2776. Some or all of the steps of FIG. 27E can optionally be performed by any other processing module of the database system 10. Some or all of the steps of FIG. 27E can optionally be performed by one or more data sources 2501, for example, by utilizing the record formatting module 2705, and/or can be performed via communication with one or more data sources 2501. Some or all of the steps of FIG. 27E can be performed to implement some or all of the functionality of the record processing and storage system 2505 of FIG. 25A and/or FIG. 25B. Some or all of the steps of FIG. 27E can be performed to implement some or all of the functionality of the page reader module of FIG. 27D. Some or all steps of FIG. 27E can be performed by database system 10 in accordance with other embodiments of the database system 10 and/or nodes 37 discussed herein.

Step 2782 includes receiving a plurality of formatted row data from a data source. For example, the plurality of formatted row data from the data source in accordance with data formatting requirements. In some cases, the method can include sending data formatting requirements to the data source. For example, the formatted row data can be formatted in accordance with some or all of the features discussed in conjunction with FIG. 27B and/or FIG. 27C.

A given formatted row data can include a fixed-length batch section that includes a plurality of fixed-length row sections corresponding to a plurality of records of the formatted row data. The plurality of fixed-length row sections can be separate from each other, for example, where the each of the plurality of fixed-length row sections are appended and/or concatenated in sequence. Each of the plurality of fixed-length row sections can include at least one fixed-length data value of a corresponding one of the plurality of records for at least one fixed-length field. Each of the plurality of fixed-length row sections can include at least one fixed-length offset value for at least one variable-length field of the corresponding one of the plurality of records.

A given formatted row data can additionally include a variable-length batch section. The variable-length batch section can be separate from the fixed-length batch section, for example, where the variable-length batch section is appended to and/or concatenated with the fixed-length batch section. The variable-length batch section can include a plurality of variable-length row sections corresponding to the plurality of records of the formatted row data. The plurality of variable-length row sections can be separate from each other, for example, where each of the plurality of variable-length row sections are appended and/or concatenated in sequence. Each of the plurality of variable-length row sections can include at least one variable-length data value of a corresponding one of the plurality of records for at least one variable-length field. The fixed-length offset value for the corresponding one of the plurality of records can indicates an offset of the at least one variable-length data value in the formatted row data.

Step 2784 includes generating a plurality of pages that include the plurality of formatted row data. For example, each formatted row data can be unmodified or only slightly modified for its inclusion in a page. Step 2786 includes storing the plurality of pages in a page storage system.

Step 2788 includes executing a read of a variable-length data value of a variable-length field of one of the plurality of records in one of the plurality of pages. For example, the method can include executing several reads of variable-length data values of one or more variable-length field of one or more of the plurality of records in one or more of the plurality of pages. The method can optionally include executing one or more reads of fixed-length data values of one or more fixed-length fields of one or more of the plurality of records in one or more of the plurality of pages.

Performing step 2788 can include performing step 2790 and/or step 2792. Step 2790 includes reading a variable-length batch section offset value from a fixed-length batch section of formatted row data by performing a first read to one of the plurality of pages. In some cases, the method can include determining a fixed-length batch section offset value to access the fixed-length offset value for the variable-length field in one of the plurality of fixed-length row sections corresponding to the one of the plurality of records, and the first read can be performed based on this determined fixed-length batch section offset value. Step 2792 includes reading the variable-length data value from a variable-length batch section of the formatted row data by performing a second read of the one of the plurality of pages based on the variable-length batch section offset value.

FIGS. 28A-28C illustrate a particular embodiment of the formatted row data 2710 of FIGS. 27A-27D that handles variable-length data that is compressed for storage by record storage and processing system 2505. In particular, the formatted row data 2710 can be implemented to accommodate data fields that will be compressed, such as variable length strings that will be dictionary encoded. Some or all of the features of formatted row data 2710 of FIGS. 28A-28C can be utilized to implement some or all of the embodiments of formatted row data 2710 discussed in conjunction with FIGS. 27A-27D. The record processing and storage system 2505 of FIGS. 28A-28C can be utilized to implement the record processing and storage system 2505 of FIG. 25A and/or any other embodiments of the record processing and storage system 2505 described herein.

Consider a case where a row scheme includes some variable-length fields that will be compressed and other variable-length fields that will not be compressed. If the formatted row data 2710 as presented in FIGS. 27A-27D was converted into pages 2515 in its given form, the compression of data in variable-length fields would be unideal. In particular, if record processing and storage system 2505 re-wrote the variable length batch section 2744 to remove the full values that were compressed. This would involve a high level of data shifting, which would involve more data movement than ideal and would consume processing resources of the record storage and processing system 2505. If this data movement were to be avoided to enable directly placing the formatted row data 2710 into pages 2515 as discussed previously, the record processing and storage system 2505 would thus need to continued storing the full values, rendering the compression of these values redundant.

The embodiment of record formatting module 2705 and corresponding formatted row data 2710 present a solution to this problem. Rather than including the values of variable-length fields that will be compressed in the variable-length batch section, this data can be included in a separate, temporary variable-length batch section. Once these values are compressed, the entire temporary variable-length batch section can be simply pruned off after compression, where no rewrites are required and where all offsets are preserved. This further improves the technology of database systems by enabling compression of variable-length fields, while minimizing data movement required to generate pages from incoming formatted row data.

This mechanism of generating formatted row data 2710 is illustrated in FIG. 28A. The record formatting module 2705 can apply some or all of the functionality discussed in conjunction with FIG. 27B to generate the formatted row data 2710. However, the record formatting module 2705 of FIG. 28A is further operable to separately store variable-length data that will be compressed, such as variable length strings that will be dictionary encoded. For example, the data formatting requirement data utilized by the record formatting module 2705 can indicate types data and/or particular fields that will be compressed, and can indicate types data and/or particular fields that will not be compressed. For example, this information regarding fields to be compressed can be determined and sent to the data source that implements the record formatting module 2705 as illustrated in FIG. 27A.

In this example, the row schema again indicates that columns 1, 4, and 5 are fixed-length data types, and that columns 2 and 3 are variable-length data types. The row schema additionally indicates that column 3 is denoted as a variable-length field that will be compressed by the record processing and storage system 2505, while column 2 is denoted as a variable-length field that will not be compressed by the record processing and storage system 2505.

Note that a different number of columns that include different numbers of variable-length field that will be compressed and/or variable-length field that will not be compressed can be utilized for row schemas of other embodiments.

The formatted row data 2710 again includes a same or similar fixed-length row section 2742 as described in conjunction with FIG. 27B, and/or includes a same or similar variable-length row section 2744 as described in conjunction with FIG. 27B. The formatted row data 2710 further includes a temporary variable-length batch section 2848 that stores values of variable length that will be compressed. In cases where all variable-length data is to be compressed, the formatted row data 2710 optionally does not include the variable-length batch section 2744, and only includes the fixed-length batch section 2742 and the temporary variable-length batch section 2848.

The variable-length batch section 2744 is generated in a same or similar fashion as described in conjunction with FIG. 27B. However, each variable-length row section 2754 only includes values for the corresponding record that correspond to one or more variable-length fields that will not be compressed. In this case, the variable-length batch section 2744 only includes values for column 2 of the records 2422-1-2422-Z based on column 2 being the only variable-length fields that will not be compressed. Note that multiple fields variable-length fields that will not be compressed can be included in each variable-length row section 2754, for example, as illustrated in FIG. 27B.

The temporary variable-length batch section 2848 can be generated in a same or similar fashion as the variable-length batch section 2744 to include a plurality of variable-length row sections 2882-1-2882-Z. However, each variable-length row section 2882 instead includes only values for the corresponding record that correspond to one or more variable-length fields that will be compressed. In this case, the variable-length batch section 2744 only includes values for column 3 of the records 2422-1-2422-Z based on column 3 being the only variable-length fields that will be compressed. In particular, the variable-length row section 2882-1 corresponds to record 2422-1 and includes the value R based on the column 3 value of record 2422-1 including the value R; the variable-length row section 2882-2 corresponds to record 2422-2 and includes the value S based on the column 3 value of record 2422-1 including the value S; and the variable-length row section 2882-1 corresponds to record 2422 and includes the value T based on the column 3 value of record 2422-1 including the value T. The depicted R, S, and T can represent any variable-length data value in accordance with the variable-length data type of column 3. For example, R, S, and T each represent different variable-length strings of the same or different length. Note that multiple fields variable-length fields that will be compressed can be included in each variable-length row section 2882, for example, in a same or similar fashion as the variable-length row sections 2754 of FIG. 27B.

The fixed-length batch section 2742 is generated in a same or similar fashion as described in conjunction with FIG. 27B. However, the offset values stored as the fixed-length values of column 3 in the fixed-length row sections 2752-1-2752-Z indicate a bit offset into the temporary variable-length batch section 2848. Note that the bit offsets B, D, and F are offsets into the temporary variable-length batch section 2848, which is appended after the variable-length batch section 2744. The bit offsets B, D, and F can therefore be strictly greater than the bit offsets A, C, and E. The values of bit offsets A, B, C, D, E, and F of FIGS. 28A-28C can otherwise have a different ordering than the values of bit offsets A, B, C, D, E, and F of FIGS. 27B-27D based on the separation of the temporary variable-length batch section 2848, which is appended after, or otherwise is separate from, the variable-length batch section 2744. The values of bit offsets A, B, C, D, E, and F of FIGS. 28A-28C can otherwise be different from the values of bit offsets A, B, C, D, E, and F of FIGS. 27B-27D.

FIG. 28B illustrates how the entire temporary variable-length batch section 2848 can be appended after the entire fixed-length batch section 2742 and the entire variable-length batch section 2744 in the formatted row data 2710. In particular, the first variable-length row section 2882-1 can be appended after the last variable-length row section 2754-Z. As illustrated, the offset value B, denoting the location of the first temporary variable-length value for a first record 2422 in the temporary variable-length batch section 2848, can denote the start of the temporary variable-length batch section 2848, and can be stored in the corresponding fixed-length row section 2752 for the corresponding record 2422 in the fixed-length batch section 2742. In cases where the offset values denote offsets with respect to the entire formatted row data 2710, the value of B is equal to or based on a total size of the entire fixed-length batch section 2742 plus a total size of the entire variable-length batch section 2744. Each next subsequent offset value is based on the length of each prior original value, for example, where D is equal to or based on the sum of B and the length of the original value of column 3 of record 2422-1.

FIG. 28C illustrates an embodiment of a record processing and storage system 2505 that implements a dictionary encoding module 2850 to facilitate compression of the values in the temporary variable-length batch section 2848 via dictionary encoding in a dictionary 2870. In some cases, the dictionary encoding module 2850 can be implemented by the page generator 2511 and/or can be applied to incoming formatted row data 2710 before being stored in a given page. In other cases, the dictionary encoding module 2850 can be implemented by the page generator 2511 and/or can be applied to formatted row data 2710 after being stored in a given page.

Dictionary 2870 can be implemented as a map data structure stored by one or more memory devices of record processing and storage system 2505, where each entry to dictionary 2870 stores a given full value of one or more variable-length fields, such as a variable-length string, mapped to a unique key value. The corresponding key value can be a fixed-length data type, and can be stored instead of the full value of one or more variable-length fields for the record while stored as a page 2515 and/or a segment 2424. The dictionary 2870 can be utilized to enable reading of the original full values of the compressed fields via the corresponding key. In particular, the corresponding key can be read from a given record via access to the corresponding page 2515 and/or segment 2424, and the full value can then be retrieved from the dictionary 2870 based on this key. In other embodiments, other compression mechanisms can be applied to the values in the temporary variable-length batch section 2848.

For a given formatted row data 2710, the dictionary encoding module 2850 can generate new entries to dictionary 2870 via a dictionary key generator module 2855. Each entry can have a key value assigned to the corresponding full value for compression. In this example, an entry is generated for value R to include a key value U; an entry is generated for value S to include a key value V, and an entry is generated for value T to include a key value W, and these entries are included in dictionary 2870 for use in subsequent reads of the records via reading these keys in record reads to pages 2515 and/or segments 2424.

The values to be compressed via these dictionary entries can be first read from the formatted row data 2710 by utilizing a reader module 2872, which can be implemented utilizing some or all of the functionality of page reader module 2770 of FIG. 27D, even if the formatted row data 2710 is not yet included in a page 2515. For example, value R is read by first determining a first offset to read third column of the first record 2422-1 via fixed-length batch section offset determination module 2772; by next determining a second offset to read the corresponding variable-length data via a first read to the formatted row data via variable-length batch section offset determination module 2774 based on the first offset, where the second offset is read as the value E; and/or by finally determining the original value of the third column of the first record 2422-1 via variable-length value read module 2776 by applying the value E that was returned via the first read to next read the value R from the temporary variable-length batch section 2848 via a second read. The same process can similarly be applied to read the other variable-length values of the temporary variable-length batch section 2848 including value S and value T.

Once the keys for the new dictionary entries are determined by dictionary encoding module 2850, a page reformatting module 2860 can be implemented to modify the formatted row data 2710. In particular, the offset values into the temporary variable-length batch section 2848 that are stored as the fixed-length values for the corresponding columns in the fixed-length row section 2752 can be replaced with the corresponding key values. In this example, the offset value of B included as the placeholder for column 3 in the fixed-length row section 2752-1 is replaced with the key value U based on U being denoted as the key value to the value R in the dictionary 2870 and based on the value R being the value for column 3 of the corresponding record 2422-1. The offset value of D included as the placeholder for column 3 in the fixed-length row section 2752-2 is similarly replaced with the key value V, and the offset value of F included as the placeholder for column 3 in the fixed-length row section 2752-2 is similarly replaced with the key value W.

When pages 2515 are later read, for example, by page reader module 2770, these compressed values can be recovered. For example, the fixed-length batch section offset determination module 2772 can be first utilized to determine the offset for the given column of the given record to be read. Next, the key value can be returned via a read to the page 2515 at this determined offset. Finally, this read key value can be utilized to retrieve the corresponding value from dictionary 2870.

The replacement of these offset values can be facilitated by simply overwriting the existing values with the key values. In particular, the offset values can be configured to have a same fixed-data length as the key values, for example, as dictated by the data formatting requirement data, to enable simple overwriting of these values without necessitating any shifting of the other data in formatted row data 2710. The offset where each overwrite occurs can be determined via the fixed-length batch section offset determination module 2772 by applying the given column of the given record to be overwritten, and the write from this offset can be facilitated via a write to the formatted row data accordingly. No additional data movement is required to facilitate these replacements, and all other offsets to the variable-length batch section 2744 are maintained and do not need to be updated. This can be advantageous if the formatted row data 2710 is already stored in a page 2515. and is accessed via reads to the page 2515.

The page reformatting module 2860 can further facilitate the removal of the temporary-length batch section 2848 once the new entries are generated and stored in dictionary 2870, as this information is no longer necessary to facilitate reads of the corresponding values. As these values are all appended in a same section, the section can be simply pruned-off, for example, where an end offset value of the formatted row data 2710 and/or of a corresponding page 2515 can be adjusted to indicate the end of this data as the end of variable-length batch section 2744. Other data, such as other formatted row data 2710 and/or other page 2515 can optionally be subsequently written to the location of the prior temporary variable-length batch section 2848.

FIG. 28D illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28D. Some or all of the method of FIG. 28D can be performed by the page generator 2511 and/or the page storage system 2506 of FIG. 25A. Some or all of the method of FIG. 28D can be performed by one or more stream loader modules 2510 of FIG. 25B, independently or in conjunction. Some or all of the method of FIG. 28D can be performed by the dictionary encoding module 2850 of FIG. 28C, for example, by applying the reader module 2872, by applying the dictionary key generator module 2855, and/or by applying the page reformatting module 2860. Some or all of the steps of FIG. 28D can optionally be performed by any other processing module of the database system 10. Some or all of the steps of FIG. 28D can optionally be performed by one or more data sources 2501, for example, by utilizing the record formatting module 2705, and/or can be performed via communication with one or more data sources 2501. Some or all of the steps of FIG. 28D can be performed to implement some or all of the functionality of the record processing and storage system 2505 of FIG. 25A and/or FIG. 25B. Some or all of the steps of FIG. 28D can be performed to implement some or all of the functionality of the dictionary encoding module of FIG. 28C. Some or all steps of FIG. 27E can be performed by database system 10 in accordance with other embodiments of the database system 10 and/or nodes 37 discussed herein.

Step 2884 includes receiving a plurality of formatted row data from the data source. For example, the plurality of formatted row data from the data source in accordance with data formatting requirements. In some cases, the method can include sending data formatting requirements to the data source. For example, the formatted row data can be formatted in accordance with some or all of the features discussed in conjunction with FIG. 28A and/or FIG. 28B.

A given formatted row data can include a fixed-length batch section that includes a plurality of fixed-length row sections corresponding to a plurality of records of the formatted row data. The plurality of fixed-length row sections can be separate from each other, for example, where each of the plurality of fixed-length row sections are appended and/or concatenated in sequence. Each of the plurality of fixed-length row sections can include at least one fixed-length data value of a corresponding one of the plurality of records for at least one fixed-length field. Each of the plurality of fixed-length row sections can include at least one fixed-length offset value for at least one variable-length field of the corresponding one of the plurality of records. Fixed-length offset values for some variable-length field can be offsets into a temporary variable-length batch section, and/or some fixed-length offset values for other variable-length fields be offsets into another variable-length batch section.

A given formatted row data can additionally include a temporary variable-length batch section. The temporary variable-length batch section can be separate from the fixed-length batch section, for example, where the temporary variable-length batch section is appended to and/or concatenated with the fixed-length batch section and/or is appended to and/or concatenated with another variable-length batch section. The variable-length batch section can include a plurality of variable-length row sections corresponding to the plurality of records of the formatted row data. The plurality of variable-length row sections can be separate from each other, for example, where each of the plurality of variable-length row sections are appended and/or concatenated in sequence. Each of the plurality of variable-length row sections can include at least one variable-length data value of a corresponding one of the plurality of records for at least one variable-length field. At least one fixed-length offset value for the corresponding one of the plurality of records can indicate an offset of the at least one variable-length data value in the temporary variable-length batch section of the formatted row data.

Step 2886 includes storing, in a compressed data format, a plurality of variable-length data values included in a temporary variable-length batch section of each of the plurality of formatted row data. For example, the plurality of variable-length data values can first be read from the temporary variable-length batch section by first reading the corresponding fixed-length offset values from the fixed-length batch section and second reading the plurality of variable-length data values by utilizing the fixed-length offset values. The storing the plurality of variable-length data values in the compressed data format can include dictionary encoding the plurality of variable-length data values. The plurality of variable-length data values can be stored in a dictionary data structure implemented via a map data structure. The dictionary data structure can include a plurality of entries for the plurality of variable-length data values with corresponding key values.

Step 2888 includes generating a plurality of modified formatted row data from the plurality of formatted row data. Generating each modified formatted row data of the plurality from a corresponding one of the plurality of formatted row data can include performing step 2892 and/or step 2894.

Step 2892 includes replacing each of a plurality fixed-length offset values into the temporary variable-length batch section with each of a plurality of key values utilized to access each corresponding one of the plurality of variable-length data value in the compressed data format. For example, each key value can be mapped to a corresponding variable-length data value in the dictionary data structure. The key values can have a same, fixed data length as the fixed-length offset values. Other fixed-length offset values into another variable-length batch section can be maintained, and these other offset values can remain consistent based on no data shifting being necessary to replace the fixed-length offset value with the key values. Step 2894 includes truncating each formatted row data to remove inclusion of the temporary variable-length batch section. For example, an end offset of the formatted row data is modified to end prior to the temporary variable-length batch section, the temporary variable-length batch section is over-written by other data, and/or the temporary variable-length batch section is otherwise removed from the formatted row data.

After performing step 2886, step 2890 is performed. Step 2890 includes storing the plurality of modified formatted row data as a plurality of pages in a page storage system. For example, a plurality of pages can be generated from the plurality of modified formatted row data and can be stored accordingly. In some cases, the method further includes generating a plurality of pages from the plurality of modified formatted row data before modification in step 2888, and further includes storing the plurality of pages in the page storage system before modification in step 2888. In such cases, the stored formatted row data in the plurality of pages can be accessed and modified in performing step 2888. In some cases, the plurality of modified formatted row data in the plurality of pages is not moved and/or maintains some or all of its same storage location in the page storage system.

FIGS. 29A-29D illustrate embodiments of a record processing and storage system 2505 that enables record schema updates to be applied by data sources 2501 over time, while ensuring the record schema updates are backwards compatible to enable compatibility with all previously received and stored records. The record processing and storage system 2505 of FIGS. 29A-29D can be utilized to implement the record processing and storage system 2505 of FIG. 25A and/or any other embodiment of the record processing and storage system 2505 described herein. The data source 2501 of FIGS. 29A-29D can be utilized to implement the one or more data sources 2501 of FIG. 25A and/or any other embodiment of data sources 2501 described herein.

Over time, end users, such as users associated with particular data sources 2501, may wish to change their row schema. For example, users may wish to update their schema relatively frequently to as they find new features they want to extract and/or utilize, for example, in implementing data analytics and/or machine learning algorithms upon the data. As the conversion of pages into segments can be delayed for hours or days as discussed previously, these changes may be desired even when data being loaded and prior to being converted into segments for long term storage. Approaches such as flushing the pending data with the older schema is not ideal, as this approach can lead to the flushed records not being included in a conversion page set 2655, which can render segments with less-favorably clustering levels due to being generated with fewer records than they otherwise would be.

FIGS. 29A-29D present a solution to this problem by utilizing schema update restriction data to restrict the set of possible schema modifications to include only those that are backwards compatible. Over time, all schema updates that are received from data sources can adhere to these requirements, which can ensure that it is possible to upgrade a given page 2515 to a new schema in all cases. During segment generation, all pages 2515 of the conversion page set 2655 at all versions of the schema are included, enabling the clustering of records into record groups to be performed across multiple schemas. If necessary, is upgraded to the most recent schema, where the generated set of segments include all records from all pages 2515 records in accordance with the most recent schema.

This improves database systems by improving the level of clustering that can be attained, as different records with different schema versions can be grouped in the same segment based on their cluster keys. As discussed previously, improved levels of clustering attain more efficient query executions. This further improves database systems by enabling more frequent updates to schema to enhance flexibility and customization by end users. Finally, as the schemas can be updated even if data of the previous schema has not yet been stored as segments in long term storage, this further improves database systems by ensuring the delayed conversion of pages into segments isn't interrupted by schema updates, which improves levels of clustering and reduces data movement, which both improve database efficiency as discussed previously.

As illustrated in FIGS. 29A and 29B, the page generator 2511 can receive row data 2910 from one or more data sources 2501, and can generate a given page 2515 directly from one or more formatted row data 2710 received from one or more data sources 2501. For example, the page generator 2511 can generate pages to include row data 2910 as discussed in conjunction with FIG. 25C. In some cases, the row data 2910 received from data sources 2501 is unaltered and/or is only slightly modified for its inclusion in a given page 2515. In some cases, the row data 2910 can be formatted in accordance with some or all of the features of formatted row data 2710 of FIGS. 27A-27D and/or FIGS. 28A-28C.

Different row data 2910 can be generated in accordance with different schemas over time, for example, for the same types of records and/or for records intended for the same database table. To ensure differing schemas of row data 2910 are backwards compatible, the record processing and storage system 2505 can optionally implement a schema update restriction communication module 2902. The schema update restriction communication module 2902 can determine and send schema update restriction data to one or more data sources 2501 that send record streams to the record processing and storage system 2505. The schema update restriction data can indicate rules and/or instructions regarding which schema updates are allowed and/or which schema updates are not allowed. The schema update restriction data can be determined by the schema update restriction communication module 2902 via user input, via configuration of the database system 10, via retrieval from memory, and/or via another determination.

As illustrated in FIGS. 29A-29B, a data source 2501 can send row data 2910 over time via row transmission module 2706. The data source 2501 can utilize a row data generator module 2905 to apply a given row schema 2915 to records 2422 to generate this row data 2910 in accordance with the given row schema 2915. The row data 2910 can be formatted in accordance with some or all of the features of formatted row data 2710 of FIGS. 27A-27D and/or FIGS. 28A-28C, for example, where the row data generator module 2905 is implemented utilizing the record formatting module 2705 of FIGS. 27A-27D and/or FIGS. 28A-28C. Alternatively, the row data generator module 2905 can generate row data 2910 in accordance with any other format, for example, where one or more records 2422 are included in row data 2910 in accordance with a row-based format. In particular, each record can include values for each of a set of columns dictated the row schema 2915. The value of each column can be in accordance with a particular data type dictated by the row schema. A given row schema 2915 can have some or all features of the embodiments of the row schema discussed in conjunction with FIGS. 27A-27D and/or FIGS. 28A-28C.

For example, a first row schema 2915.$i$ is utilized to generate a first plurality of row data 2910 in a first time frame $t_1$, as illustrated in FIG. 29A. The set of pages 2515 generated by page generator 2511 from this first plurality of row data 2910 therefore include records in accordance with this first row schema 2915.1, and is denoted as the schema 2915.1 page set. Note that row schema 2915.*i* can be an original row schema and/or an updated row schema from a previous row schema 2915.*i*−1.

A different row schema 2915.*i*+1 is utilized to generate a second plurality of row data 2910 in a second time frame $t_2$ that is after time frame $t_1$, as illustrated in FIG. 29B. The set of pages 2515 generated by page generator 2511 from this second plurality of row data 2910 therefore include records in accordance with this second row schema 2915.*i*+1, and is denoted as the schema 2915.2 page set. The second row schema 2915.*i*+1 can be guaranteed to be backwards compatible with the first row schema 2915.*i* based on the schema update module 2906 restricting use of new schemas that are not backwards compatible with the first row schema 2915.*i*.

The data source 2501 can facilitate changes of row schema 2915, such as the update from row schema 2915.*i* to row schema 2915.*i*+1 of FIGS. 29A-29B, by implementing a schema update module 2906. The schema update module 2906 can facilitate schema updates while ensuring that each updated row schema 2915 is in accordance with schema update restriction data. For example, the schema update module 2906 utilizes the schema update restriction data received from the record processing and storage system 2505 as illustrated in FIG. 29A. In some cases, the schema update restriction data can include application data corresponding to the schema update module 2906 for download and/or installation by one or more data sources 2501. When this application data is executed by at least one processing module of a data source 2501, it can cause the data source 2501 to implement some or all of the functionality of the schema update module 2906 described herein. Alternatively, the data sources 2501 can otherwise receive and/or determine the schema update restriction data via other communication with the database system 10, via downloading the schema update restriction data from a server associated with the database system 10, via accessing the schema update restriction data from its own memory and/or from other memory, and/or via another determination.

FIG. 29C illustrates an embodiment of the schema update module 2906 of FIGS. 29A and 29B. An allowed schema transform set generator module 2955 can generate allowed schema transform set data 2956 based on the schema update restriction data and/or based on one or more previous row schemas 2915.1-2515.*i*−1 of a previous schema set 2945, for example, stored by and retrieved from at least one memory of the schema update module 2906 and/or accessible by data source 2501. The allowed schema transform set data can indicate a set of possible transforms and/or types of updates to the most recent schema data 2915.*i*−1 that are backwards compatible with all of the previous row schema data 2515.1-2515.*i*−1, as required by the schema update restriction data.

For example, the set of possible transforms: can allow deletion of columns; can allow adding of new columns but require that any new columns have a designated a default value that can be applied to old schemas; can allow data modifications such as arithmetic transforms to values in particular columns, such as changes to the unit represented by the values, that do not change the data type of the columns; can disallow changes to data types of any columns; and/or allow any other backwards compatible schema transforms that can be applied to any records 2422 under any of the previous row schema data 2515.1-2515.*i*−1.

The previous row schemas 2915.1-2515.*i*−1 can indicate all previous row schemas for the incoming record stream and/or for a corresponding database table. In some cases, the previous row schemas 2915.1-2515.*i*−1 only indicates the previous row schemas since the last conversion process of pages into segments, where the schema update restriction data only enforces backwards compatibility for records stored in pages prior to conversion into segments, and resets with each conversion process by the record processing and storage system 2505. Instructions regarding which previous row schemas are utilized can be included in the schema update restriction data received from the record processing and storage system 2505. In some cases, the schema update restriction data is sent to the data source 2501 in response to performing each conversion process to indicate the previous row schemas 2915.1-2515.*i*−1 be reset by the data source 2501 to include only the row schema 2915.*i*−1 that is currently being utilized to generate rows.

A proposed schema input module 2942 can be configured to receive and/or generate proposed row schemas 2915 over time. For example, at least one computing device can implement the data source 2501, and can include a display device 2940 of the least one computing device can display a graphical user interface 2941 that prompts the user to enter a proposed schema update via user input by an end user. As another example, the proposed schema input module 2942 can utilize a communication interface to communicate with another computing device, such as at least one client device associated with at least one end user, via a wired and/or wireless communication connection. In such cases, an end user can enter their proposed schema update to their own computing device via user input, and this computing device can send the inputted proposed schema update to the schema update module 2906 for receipt via the communication interface of the proposed schema input module 2942.

A proposed schema adherence determination module 2965 can generate schema update adherence data 2966 by comparing the proposed row schema 2915.*i* received from or generated by the proposed schema input module 2942. The schema update adherence data 2966 can indicate the proposed row schema 2915.*i* adheres to the allowed schema transform set data 2956 when the proposed row schema 2915.*i* compares favorably to the allowed schema transform set data 2956. The schema update adherence data 2966 can indicate the proposed row schema 2915.*i* does not adhere to the allowed schema transform set data 2956 when the proposed row schema 2915.*i* compares unfavorably to the allowed schema transform set data 2956. For example, the proposed row schema 2915.*i* compares favorably to the allowed schema transform set data 2956 when the proposed row schema 2915.*i* including only updates indicated as allowed by the allowed schema transform set data 2956 and/or when the proposed row schema 2915.*i* does not include any updates indicated as disallowed by the allowed schema transform set data 2956.

When the schema update adherence data 2966 indicates adherence, a proposed schema implementation module 2975 can be utilized to facilitate implementation of the proposed row schema 2915.*i* as a new row schema 2915.*i*. For example, the row data generator module 2905 is currently generating row data 2910 from the record stream in accordance with the most recent row schema 2915.*i*−1. The proposed schema implementation module 2975 can send the new row schema 2915.*i* to the row data generator module 2905 and/or instructions to the row data generator module 2905 that cause the row data generator module 2905 to begin generating subsequent row data 2910 from the record stream in accordance with the new row schema 2915.*i*. The new row schema 2915.*i* can also be added to the previous schema set 2945, where any subsequently proposed schemas 2915 must be backwards compatible with the new row schema 2915.*i* in addition to the previous row schema 2915.1-2515.*i*−1.

When the schema update adherence data 2966 indicates non-adherence, the proposed row schema 2915.*i* is not implemented as a new row schema. A schema rejection communication module 2972 can generate a notification for display by the graphical user interface 2941 indicating the proposed row schema 2915.*i* does not adhere to the schema update restriction data based on the previous row schemas 2915.1-2515.*i*−1. The schema rejection communication module 2972 can further trigger the proposed schema input module 2942 to generate a new prompt for another proposed row schema for display by the graphical user interface 2941 to enable the end user to enter another proposed schema update.

This process depicted in FIG. 29C can continue for any proposed schema updates entered and/or received via the proposed schema input module 2942 over time, where accepted row schemas that adhere to the schema update restriction data based on the previous row schemas are implemented for generation of subsequent row data 2910 and included as additional previous row schemas.

Note that while the schema update module 2906 is illustrated as being implemented by one or more data sources 2501, the schema update module 2906 can alternatively or additionally be implemented by the record processing and storage system 2505. For example, as row data 2910 is received under a new schema, and/or as proposed schemas are received from data sources 2501, the schema update module 2906 can be applied in a similar fashion to enable the record processing and storage system 2505 to determine whether the new schema adheres to the allowed set of schema updates based on the previous schemas for this data. If the record processing and storage system 2505 generates schema update adherence data 2966 indicating that the received updated schema adheres, the record processing and storage system 2505 can accept and convert the corresponding new row data 2910 into pages and/or can send a notification to the corresponding data source 2501 indicating the new schema is accepted. If the record processing and storage system 2505 generates schema update adherence data 2966 indicating that the received updated schema does not adhere, the record processing and storage system 2505 can reject and/or not convert the corresponding new row data 2910 into pages and/or can send a notification to the indicating the new schema is rejected.

FIG. 29D illustrates an embodiment of a segment generator 2517 that implements a page schema upgrade module 2920 prior to converting the pages into segments. The segment generator 2517 of FIG. 29D can be utilized to implement the segment generator 2517 of FIG. 26A and/or to implement any other embodiments of the segment generator 2517 described herein.

The segment generator 2517 can implement the page schema upgrade module 2920 to update the schema in all pages 2515 of the conversion page set 2555 to the most recent schema prior to their conversion into segments. In particular, to minimize data movement, the page schema upgrade module 2920 can optionally be implemented only after the page conversion determination module 2610 determines to initiate the conversion process in the segment generation determination data as discussed previously. Once the set of pages 2515 are all upgraded to be in accordance with the most recent, their records 2422 can be converted into segments 2424 as discussed previously. In particular, the records of the upgraded pages can be clustered into record groups 1-X, which can be converted into segments groups via the columnar rotation module 2630 and optionally, while not depicted in FIG. 29D, the metadata generator module 2640.

In this example, a set of R different row schemas were applied to incoming pages of a particular record stream since the last conversion process. For example, to ensure the page schema upgrade module 2920 can appropriately upgrade all pages via backwards compatible transforms, each of the row schemas 2915.*i* in the set of row schemas row schemas 2915.2-2515.R were determined to be backwards compatible with the previous row schemas 2915.1-2515.*i*−1 by the schema upgrade module 2906 before being implemented by the row data generator module 2905 as discussed in conjunction with FIG. 29C. For example, the backwards compatible transforms applied to the pages can correspond to one or more transforms of the allowed schema transform set data 2956 that were included in corresponding updated row schema 2915.

The page schema upgrade module 2920 can be operable to implement a plurality of schema transform modules 2922.1-2922.R to enable conversion of each of a set of pages 1-R under each of a set of schemas 2915.1-2915.R to the most recent schema 2915.R. Applying a schema transform modules 2922 to a set of pages can include applying the backward compatible changes of each subsequent schema to the schema of the set of pages to ultimately render the set of pages as being upgraded to the most recent row schema 2915.R. Applying each schema transform modules 2922.*i* can include applying updates included in schemas 2915.*i*+1-R, such as adding one or more new columns with specified default values, removing one or more columns, and/or applying a data transform to the value of data in a given column, where the data type of the column is not changed. For example, schema transform module 2922.1 is applied to page set 1 to apply all of the backwards compatible changes of schemas 2-R to pages under schema 1, while schema transform module 2922.R−1 is applied to page set R−1 to apply only backwards compatible changes of schema R to pages under schema R−1. The page set R does not undergo any changes, as it is already under the most recent schema.

In some cases, the data source sends the backwards compatible transforms utilized to update each of their row schemas from a previous row schema to a next row schema, and the page schema upgrade module 2920 applies these backwards compatible transforms to pages under the previous row schema to upgrade these pages to the next row schema. In some cases the backwards compatible transforms of a particular update correspond to a particular subset of the possible transforms in the allowed schema transform set data 2956. The backwards compatible transforms can alternatively be determined by the schema upgrade module 2920 based on each of the row schemas 1-R, for example, where data dictating each of the row schemas 1-R are received from the data source 2501 and/or are determined from the row data 2910 of each row schema 1-R.

For example, applying schema transform module 2522.2 to page set 2 includes: first upgrading page set 2 from row schema 2915.2 to row schema 2915.3 based on the backwards compatible transforms of allowed schema transform set data 2956 that were included in updating row schema 2915.2 to row schema 2915.3; next upgrading page set 2 from row schema 2915.3 to row schema 2915.4 based on the backwards compatible transforms of allowed schema transform set data 2956 that were included in updating row schema 2915.3 to row schema 2915.4; and so on until finally upgrading page set 2 from row schema 2915.R−1 to row schema 2915.R based on the backwards compatible transforms of allowed schema transform set data 2956 that were included in updating row schema 2915.R−1 to row schema 2915.R. Alternatively, the process can be simplified where a set of backwards compatible transforms are determined and applied all at once.

FIG. 29E illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29E. Some or all of the method of FIG. 29E can be performed by the page generator 2511, the page storage system 2506, the segment generator 2517, and/or the segment storage system 2508 of FIG. 25A. Some or all of the method of FIG. 29E can be performed by one or more stream loader modules 2510 of FIG. 25B, independently or in conjunction. Some or all of the method of FIG. 29E can be performed by the page conversion determination module 2610, the cluster key-based grouping module 2620, the columnar rotation module 2630, and/or the metadata generator module 2640 of FIG. 26A. Some or all of the method of FIG. 29E can be performed by the page schema upgrade module 2920, the cluster key-based grouping module 2620, and/or the columnar rotation module 2630 of FIG. 29D. Some or all of the steps of FIG. 29E can optionally be performed by any other processing module of the database system 10. Some or all of the steps of FIG. 29E can optionally be performed by one or more data sources 2501 and/or can be performed via communication with one or more data sources 2501. Some or all of the steps of FIG. 29E can be performed to implement some or all of the functionality of the record processing and storage system 2505 of FIG. 25A and/or FIG. 25B. Some or all of the steps of FIG. 29E can be performed to implement some or all of the functionality of the segment generator 2517 of FIG. 29D. Some or all steps of FIG. 29E can be performed by database system 10 in accordance with other embodiments of the database system 10 and/or nodes 37 discussed herein.

Step 2982 includes receiving a first plurality of records from the data source in accordance with a first schema. For example, the first plurality of records is received as a plurality of row data 2910 in accordance with the first schema. Step 2984 includes generating a first plurality of pages that include the first plurality of records in accordance with the first schema. For example, the first plurality of pages includes the plurality of records in accordance with a row-based format. The first plurality of pages can be stored in the page storage system 2506.

Step 2986 includes receiving a set of subsequent pluralities of records from the data source corresponds to a plurality of sequential schema updates. For example, the set of subsequent pluralities of records are received after receiving the first plurality of records. Each subsequent plurality of records in the set of subsequent pluralities of records can be received strictly after previous pluralities of records in the set of subsequent pluralities of records, in accordance with a sequential ordering. Each subsequent plurality of records in the set of subsequent pluralities of records can be in accordance with or otherwise correspond to one of a plurality of sequential schema updates from the first schema and from previous ones of the plurality of sequential schema updates, for example, in accordance with the sequential ordering. For example each of the plurality of sequential schema updates can be based on at least one backwards compatible transform from the first schema and from previous ones of the plurality of sequential schema updates. The at least one backwards compatible transform can be in accordance with the schema update restriction data, for example where all of the plurality of sequential schema updates are guaranteed to be in accordance with the schema update restriction data. In some cases, the method includes determining and/or sending the schema update restriction data to the data source. In some cases, the set of subsequent pluralities of records includes exactly one subsequent plurality of records in accordance with exactly one schema update from the first schema. In other cases, the set of subsequent pluralities of records includes multiple pluralities of records in accordance with multiple, sequential schema updates from the first schema and from previous schema updates in the sequence.

Step 2988 includes generating a set of subsequent pluralities of pages from the set of subsequent pluralities of records. Each subsequent plurality of pages of the set of subsequent pluralities of pages can include a corresponding subsequent plurality of records the set of subsequent pluralities of records. Each subsequent plurality of pages of the set of subsequent pluralities of pages can correspond to ones of the plurality of sequential schema updates. The subsequent pluralities of pages can include their plurality of records in accordance with a row-based format. The subsequent pluralities of pages can be stored in the page storage system 2506.

Step 2990 includes determining a most-recent schema update of the plurality of sequential schema updates, and step 2992 includes generating an upgraded plurality of pages from the first plurality of pages and the set of subsequent pluralities of pages in accordance with the most-recent schema update based on applying backwards compatible transforms of the plurality of sequential schema updates. For example, steps 2990 and 2992 can be performed based on determining to initiate a conversion process of a conversion page set that includes the first plurality of pages and the set of subsequent pluralities of pages. The backwards compatible transforms applied to the first plurality of pages and the set of subsequent pluralities of pages to generate the upgraded plurality of pages can be the same as and/or can be based on the at least one backwards compatible transform of each sequential schema update from the first schema and from previous ones of the plurality of sequential schema updates. The backwards compatible transforms can be performed to generate the upgraded plurality of pages based on the set of subsequent pluralities of records received from the data source being accordance with the schema update restriction data.

Step 2994 includes generating a plurality of segments from upgraded plurality of pages. For example, the plurality of segments can be generated from the upgraded plurality of pages to include the plurality of records in a column-based format. Each segment can include all records in accordance with the most-recent schema update in the column-based format. Generating the plurality of segments can include performing a plurality of record groupings based on cluster key of the plurality of records, where each of a plurality of segments groups are generated to include records in one of the plurality of record groupings. In some embodiments, a segment can include some records from the first plurality of records and can further include some records from one or more subsequent pluralities of records.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a record processing and storage system, comprising:
   receiving a plurality of records;
   generating a plurality of pages that include the plurality of records in accordance with a row-based format;
   storing the plurality of pages via a page storage system;
   generating segment generation determination data based on storage utilization data of the page storage system;
   generating a plurality of segments from the plurality of pages that include the plurality of records in a column-based format based on the segment generation determination data indicating segments be generated; and
   storing the plurality of segments via a segment storage system.

2. The method of claim 1, wherein the segment generation determination data indicates segments be generated based on the storage utilization data comparing favorably to predetermined conversion threshold data.

3. The method of claim 2, wherein the predetermined conversion threshold data indicates a threshold data size, wherein the storage utilization data indicates a data size of the plurality of pages, and wherein the segment generation determination data indicates segments be generated based on the data size of the plurality of pages comparing favorably to the threshold data size.

4. The method of claim 2, wherein the predetermined conversion threshold data indicates a threshold minimum amount of available storage resources, wherein the storage utilization data indicates an amount of available storage resources of the page storage system due to storage of the plurality of pages, and wherein the segment generation determination data indicates segments be generated based on the amount of available storage resources comparing favorably to the threshold minimum amount of available storage resources.

5. The method of claim 2, further comprising:
   performing a plurality of previous record storage conversions, wherein each of the plurality of previous record storage conversions includes generating a previous plurality of segments from a previously generated plurality of pages;
   generating record conversion tracking data based on the plurality of previous record storage conversions; and
   generating the predetermined conversion threshold data automatically based on the record conversion tracking data.

6. The method of claim 5, wherein the record conversion tracking data includes at least one of: each of a plurality of clustering metrics determined based on generating each previous plurality of segments from each previously generated plurality of pages, or each of a plurality of previous storage utilization data determined based on generating each previous plurality of segments from each previously generated plurality of pages.

7. The method of claim 2, wherein the segment generation determination data is generated at a first time, and wherein the storage utilization data corresponds to storage capacity of the page storage system at the first time, further comprising:
   generating other segment generation determination data at previous time prior to the first time based on previous storage utilization data corresponding to storage capacity of the page storage system at the previous time, wherein the other segment generation determination data indicates segments not yet be generated based on the previous storage utilization data comparing unfavorably to the predetermined conversion threshold data.

8. The method of claim 7, further comprising:
   prior to the previous time:
      receiving a first subset of the plurality of records;
      generating a first subset of the plurality of pages to include the first subset of the plurality of records; and
      storing the first subset of the plurality of pages via the page storage system;
   wherein the previous storage utilization data is based on a first amount of storage resources utilized to store the first subset of the plurality of pages;
   prior to the first time:
      receiving a second subset of the plurality of records, wherein the second subset of the plurality of records and the first subset of the plurality of records are mutually exclusive and collectively exhaustive;

generating a second subset of the plurality of pages to include the second subset of the plurality of records; and storing the second subset of the plurality of pages via the page storage system;

wherein the storage utilization data is based on a second amount of storage resources utilized to store the first subset of the plurality of pages and the second subset of the plurality of pages.

9. The method of claim 1, wherein the segment generation determination data is further generated based on an elapsed amount of time since a previous plurality of segments was generated from a previous plurality of pages.

10. The method of claim 1, further comprising:

facilitating execution of a first query by reading at least one of the plurality of pages to access a set of the plurality of records during a first temporal period prior to generating a plurality of segments from the plurality of pages; and facilitating execution of a second query by reading at least one of the plurality of segments to access the set of the plurality of records during a second temporal period after generating the plurality of segments from the plurality of pages.

11. The method of claim 10, further comprising:

receiving a second plurality of records after generating the plurality of segments from the plurality of pages;

generating a second plurality of pages that include the second plurality of records in accordance with the row-based format; and storing the second plurality of pages via the page storage system;

wherein facilitating execution of the second query further includes reading at least one of the second plurality of pages to access at least one record of the second plurality of records, and wherein a query resultant of the query is based on the set of the plurality of records and is further based on the at least one record of the second plurality of records.

12. The method of claim 11, wherein the record processing and storage system includes a plurality of nodes that each include a set of memory drives, wherein one of the plurality of nodes is included in the page storage system and stores the at least one of the second plurality of pages via its set of memory drives, wherein the one of the plurality of nodes is further included in the segment storage system and further stores the at least one of the plurality of segments via its set of memory drives, and wherein facilitating execution of the second query includes reading of the at least one of the second plurality of pages by the one of the plurality of nodes and further includes reading of the at least one of the plurality of segments by the one of the plurality of nodes.

13. The method of claim 1, wherein the plurality of records is received in a plurality of record streams generated by a corresponding plurality of data sources, and wherein at least one of the plurality of pages is generated to include records from different ones of the record streams.

14. The method of claim 1, wherein the plurality of records is received as formatted row data, and wherein the plurality of pages is generated to include plurality of records in accordance with the formatted row data.

15. The method of claim 1, wherein generating a plurality of segments from the plurality of pages includes:

segregating the plurality of records into a plurality of record groups in accordance with a cluster key of the plurality of records;

generating a set of column-formatted row data for each of the plurality of record groups;

generating segment metadata for each column-formatted row data; and generating plurality of segment groups that includes the plurality of segments, wherein each segment group includes a set of segments generated from a corresponding set of column-formatted row data, and wherein each segment in a segment group includes one column-formatted row data from the corresponding set of column-formatted row data and further includes segment metadata generated for the one column-formatted row data.

16. The method of claim 1, wherein a first plurality of sets of records of the plurality of records are each included in a corresponding one of the plurality of pages, wherein the first plurality of sets of records are mutually exclusive and collectively exhaustive with respect to the plurality of records; and wherein a second plurality of sets of records of the plurality of records are each included in a corresponding one of the plurality of segments, and wherein the second plurality of sets of records are mutually exclusive and collectively exhaustive with respect to the plurality of records of records.

17. The method of claim 1, wherein a first page of the plurality of pages includes a first record and a second record, and wherein a second page of the plurality of pages includes a third record and a fourth record; and wherein a first segment of the plurality of segments includes the first record and the third record, and wherein a second segment of the plurality of segments includes the second record and the fourth record.

18. The method of claim 1, further comprising:

removing the plurality of pages from storage via the page storage system based on the storage of the plurality of segments via the segment storage system.

19. A record processing and storage system comprises:

at least one processor; and a memory that stores operational instructions that, when executed by the at least one processor, cause the record processing and storage system to:

receive a plurality of records;

generate a plurality of pages that include the plurality of records in accordance with a row-based format;

store the plurality of pages via a page storage system;

generate segment generation determination data based on storage utilization data of the page storage system;

generate a plurality of segments from the plurality of pages that include the plurality of records in a column-based format based on the segment generation determination data indicating segments be generated; and store the plurality of segments via a segment storage system.

20. A non-transitory computer readable storage medium comprises:

at least one memory section that stores operational instructions that, when executed by a processing module that includes a processor and a memory, causes the processing module to:

receiving a plurality of records;

generating a plurality of pages that include the plurality of records in accordance with a row-based format;

storing the plurality of pages via a page storage system;

generating segment generation determination data based on storage utilization data of the page storage system;

generating a plurality of segments from the plurality of pages that include the plurality of records in a column-based format based on the segment generation determination data indicating segments be generated; and storing the plurality of segments via a segment storage system.

* * * * *